United States Patent
Iwamura et al.

(10) Patent No.: US 11,499,789 B2
(45) Date of Patent: Nov. 15, 2022

(54) HEAT UTILIZATION SYSTEM, AND HEAT GENERATING DEVICE

(71) Applicant: CLEAN PLANET INC., Tokyo (JP)

(72) Inventors: Yasuhiro Iwamura, Sendai (JP); Takehiko Ito, Tokyo (JP); Jirota Kasagi, Sendai (JP); Hideki Yoshino, Tokyo (JP); Shotaro Hirano, Tokyo (JP); Masahide Ise, Tokyo (JP); Tetsuharu Ibaraki, Tokyo (JP)

(73) Assignee: CLEAN PLANET INC., Tokyo (JP)

( * ) Notice: Subject to any disclaimer, the term of this patent is extended or adjusted under 35 U.S.C. 154(b) by 0 days.

(21) Appl. No.: 17/311,512

(22) PCT Filed: Dec. 11, 2019

(86) PCT No.: PCT/JP2019/048396
§ 371 (c)(1),
(2) Date: Jun. 7, 2021

(87) PCT Pub. No.: WO2020/122098
PCT Pub. Date: Jun. 18, 2020

(65) Prior Publication Data
US 2022/0034599 A1    Feb. 3, 2022

(30) Foreign Application Priority Data
Dec. 11, 2018    (JP) .............................. JP2018-232055

(51) Int. Cl.
*F24V 30/00*    (2018.01)
*F28D 20/00*    (2006.01)
(Continued)

(52) U.S. Cl.
CPC .............. *F28D 20/003* (2013.01); *F01K 3/00* (2013.01); *F01K 3/188* (2013.01); *F24V 30/00* (2018.05);
(Continued)

(58) Field of Classification Search
CPC ........ F01K 3/188; F28D 20/003; F17C 11/00; F17C 11/005
See application file for complete search history.

(56) References Cited

U.S. PATENT DOCUMENTS 6,337,146 B1    1/2002  Sogabe et al.
2004/0079090 A1 *  4/2004  Tsuji ........................ C09K 5/16
                                                                62/7
(Continued)

FOREIGN PATENT DOCUMENTS

EP         3521730 A4 *  5/2020  ............... C01B 3/00
JP         S62266366 A    11/1987
(Continued)

OTHER PUBLICATIONS

A. Kitamura, et.al, Brief summary of latest experimental results with a mass-flow calorimetry system for anomalous heat effect of nano-composite metals under D(H)-gas charging, Current Science, vol. 108, No. 4, p. 589-593, 2015.
(Continued)

*Primary Examiner* — Gregory A Wilson
(74) *Attorney, Agent, or Firm* — Muncy, Geissler, Olds & Lowe, P.C.

(57) ABSTRACT

Provided are a novel heat utilization system and heat generating device that utilize an inexpensive, clean, and safe heat energy source. A heat utilization system 10 includes a heat-generating element 14 configured to generate heat by occluding and discharging hydrogen, a sealed container 15 having a first chamber 21 and a second chamber 22 partitioned by the heat-generating element 14, and a temperature adjustment unit 16 configured to adjust a temperature of the heat-generating element 14. The first chamber 21 and the second chamber 22 have different hydrogen pressures. The heat-generating element 14 includes a support element 61 made of at least one of a porous body, a hydrogen permeable film, and a proton conductor, and a multilayer film 62 supported by the support element 61. The multilayer film 62 has a first layer 71 made of a hydrogen storage metal or a hydrogen storage alloy and having a thickness of less than 1000 nm and a second layer 72 made of a hydrogen a (Continued)

hydrogen storage metal different from that of the first layer, a hydrogen storage alloy different from that of the first layer, or ceramics and having a thickness of less than 1000 nm.

33 Claims, 44 Drawing Sheets

(51) Int. Cl.
*F01K 3/00* (2006.01)
*F01K 3/18* (2006.01)

(52) U.S. Cl.
CPC ............... *F28D 2020/0004* (2013.01); *F28D 2020/0069* (2013.01); *F28D 2020/0078* (2013.01)

(56) References Cited

U.S. PATENT DOCUMENTS

| | | |
|---|---|---|
| 2016/0155518 A1 | 6/2016 | Mizuno |
| 2018/0306468 A1 | 10/2018 | Iwamura et al. |
| 2019/0257551 A1 | 8/2019 | Iwamura et al. |

FOREIGN PATENT DOCUMENTS

| | | | |
|---|---|---|---|
| JP | 2004077200 A | 3/2004 | |
| JP | 2004083966 A | 3/2004 | |
| JP | 2012510050 A * | 4/2012 | |
| JP | 2013533455 A | 8/2013 | |
| JP | 2017110835 A | 6/2017 | |
| JP | 2018155708 A | 10/2018 | |
| WO | 0077266 A1 | 12/2000 | |
| WO | 2015008859 A2 | 1/2015 | |
| WO | WO-2015008859 A2 * | 1/2015 | ............... G21B 1/17 |
| WO | 2018062115 A1 | 4/2018 | |
| WO | WO-2018062115 A1 * | 4/2018 | ............... C01B 3/00 |
| WO | 2018230447 A1 | 12/2018 | |

OTHER PUBLICATIONS

The office action of the corresponding AU application No. 2019397742 dated Feb. 28, 2022.

Office Action of the corresponding KR application No. 10-2021-7021313 dated May 12, 2022 and English machine translation thereof.

* cited by examiner

HEAT UTILIZATION SYSTEM, AND HEAT GENERATING DEVICE

TECHNICAL FIELD

The present invention relates to a heat utilization system and a heat generating device.

BACKGROUND ART

In recent years, a heat generation phenomenon in which heat is generated by occluding and discharging hydrogen using a hydrogen storage metal or the like is reported (see, for example, Non-Patent Literature 1). Hydrogen can be generated from water and is thus inexhaustible and inexpensive as a resource, and does not generate a greenhouse gas such as carbon dioxide and is thus clean energy. Unlike a nuclear fission reaction, the heat generation phenomenon using the hydrogen storage metal or the like is safe since there is no chain reaction. Heat generated by occluding and discharging hydrogen can be utilized as it is, and can be further utilized by being converted into electric power. Therefore, the heat is expected as an effective heat energy source.

CITATION LIST

Non-Patent Literature

Non-Patent Literature 1: A. Kitamura. et.al "Brief summary of latest experimental results with a mass-flow calorimetry system for anomalous heat effect of nano-composite metals under D (H)-gas charging" CURRENT SCIENCE, VOL. 108, NO. 4, p.589-593, 2015

SUMMARY OF INVENTION

Technical Problem

However, a heat energy source is still mainly obtained from thermal power generation or nuclear power generation. Therefore, from the viewpoint of environmental problems and energy problems, there is a demand for a novel heat utilization system and heat generating device that utilize an inexpensive, clean, and safe heat energy source and that have not been disclosed in the related art.

Therefore, an object of the invention is to provide a novel heat utilization system and heat generating device that utilize an inexpensive, clean, and safe heat energy source.

Solution to Problem

A heat utilization system according to the invention includes a heat-generating element configured to generate heat by occluding and discharging hydrogen, a sealed container having a first chamber and a second chamber partitioned by the heat-generating element, a temperature adjustment unit configured to adjust a temperature of the heat-generating element, and a heat utilization device configured to utilize a heat medium heated by the heat generated by a heat-generating element. The first chamber and the second chamber have different hydrogen pressures. The heat-generating element includes a support element made of at least one of a porous body, a hydrogen permeable film, and a proton conductor, and a multilayer film supported by the support element. The multilayer film has a first layer made of a hydrogen storage metal or a hydrogen storage alloy and having a thickness of less than 1000 nm and a second layer made of a hydrogen storage metal different from that of the first layer, a hydrogen storage alloy different from that of the first layer, or ceramics and having a thickness of less than 1000 nm.

Another heat utilization system according to the invention includes a heat-generating element configured to generate heat by occluding and discharging hydrogen, a sealed container accommodating the heat-generating element, a gas introduction unit configured to introduce a hydrogen-based gas into the sealed container, a gas discharge unit configured to discharge the hydrogen-based gas inside the sealed container to an outside of the sealed container, a temperature sensor configured to detect a temperature of the heat-generating element, a heat generating cell provided in the gas introduction unit and including a heater configured to heat the heat-generating element by heating the hydrogen-based gas circulating through the gas introduction unit, and a control unit configured to adjust the temperature of the heat-generating element by controlling the heater based on the temperature detected by the temperature sensor. The sealed container has a first chamber and a second chamber partitioned by the heat-generating element. The first chamber and the second chamber have different hydrogen pressures. The heat-generating element includes a support element made of at least one of a porous body, a hydrogen permeable film, and a proton conductor, and a multilayer film supported by the support element. The multilayer film has a first layer made of a hydrogen storage metal or a hydrogen storage alloy and having a thickness of less than 1000 nm and a second layer made of a hydrogen storage metal different from that of the first layer, a hydrogen storage alloy different from that of the first layer, or ceramics and having a thickness of less than 1000 nm.

A heat generating device according to the invention includes a heat-generating element configured to generate heat by occluding and discharging hydrogen, a sealed container having a first chamber and a second chamber partitioned by the heat-generating element, and a temperature adjustment unit configured to adjust a temperature of the heat-generating element. The first chamber and the second chamber have different hydrogen pressures. The heat-generating element includes a support element made of at least one of a porous body, a hydrogen permeable film, and a proton conductor, and a multilayer film supported by the support element. The multilayer film has a first layer made of a hydrogen storage metal or a hydrogen storage alloy and having a thickness of less than 1000 nm and a second layer made of a hydrogen storage metal different from that of the first layer, a hydrogen storage alloy different from that of the first layer, or ceramics and having a thickness of less than 1000 nm.

Advantageous Effects of Invention

According to the invention, since the heat-generating element that generates heat by occluding and discharging hydrogen is utilized as a heat energy source, inexpensive, clean, and safe energy can be supplied.

DESCRIPTION OF EMBODIMENTS

First Embodiment

Figure 1:
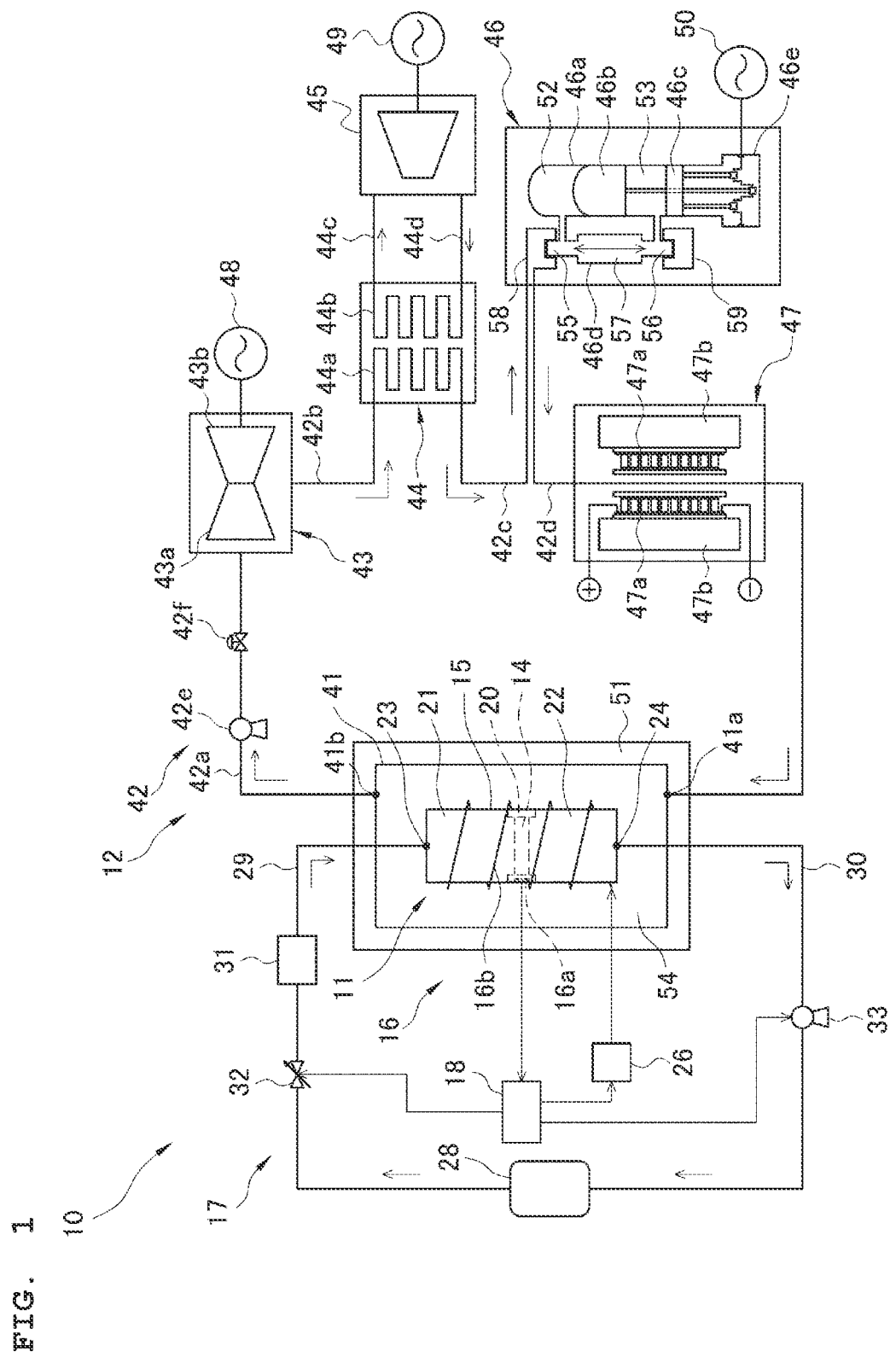
FIG. 1 is a schematic diagram showing a heat utilization system according to a first embodiment.

As shown in FIG. 1, a heat utilization system 10 includes a heat generating device 11 and a heat utilization device 12. The heat utilization system 10 heats a heat medium to be described later by heat generated by the heat generating device 11, and operates the heat utilization device 12 using the heated heat medium as a heat source.

The heat generating device 11 includes a heat-generating element 14, a sealed container 15, a temperature adjustment unit 16, a hydrogen circulation line 17, and a control unit 18.

The heat-generating element 14 is accommodated in the sealed container 15 and is heated by a heater 16b of the temperature adjustment unit 16 to be described later. The heat-generating element 14 generates heat (hereinafter, referred to as excess heat) having a temperature equal to or higher than a heating temperature of the heater 16b by occluding and discharging hydrogen. The heat-generating element 14 heats the heat medium to a temperature within a range of, for example, 50° C. or higher and 1500° C. or lower by generating the excess heat. In this example, the heat-generating element 14 has a plate shape having a front surface and a back surface. A detailed configuration of the heat-generating element 14 will be described later with reference to another drawing.

The sealed container 15 is a hollow container, and accommodates the heat-generating element 14 therein. The sealed container 15 is made of stainless steel or the like. In this example, the sealed container 15 has a shape having a longitudinal direction parallel to a direction orthogonal to the front surface or the back surface of the heat-generating element 14. An installation portion 20 for installing the heat-generating element 14 is provided inside the sealed container 15.

The sealed container 15 has a first chamber 21 and a second chamber 22 partitioned by the heat-generating element 14. The first chamber 21 is defined by the front surface that is one surface of the heat-generating element 14 and an inner surface of the sealed container 15. The first chamber 21 has an introduction port 23 connected to the hydrogen circulation line 17 to be described later. A hydrogen-based gas circulating through the hydrogen circulation line 17 is introduced into the first chamber 21 through the introduction port 23. The second chamber 22 is formed by the back surface that is the other surface of the heat-generating element 14 and the inner surface of the sealed container 15. The second chamber 22 has a recovery port 24 connected to the hydrogen circulation line 17. The hydrogen-based gas in the second chamber 22 is recovered to the hydrogen circulation line 17 through the recovery port 24.

The first chamber 21 is pressurized by introducing the hydrogen-based gas. The second chamber 22 is depressurized by recovering the hydrogen-based gas. Accordingly, a hydrogen pressure in the first chamber 21 is higher than a hydrogen pressure in the second chamber 22. The hydrogen pressure in the first chamber 21 is, for example, 100 [kPa]. The hydrogen pressure in the second chamber 22 is, for example, $1 \times 10^{-4}$ [Pa] or less. The second chamber 22 may be in a vacuum state. In this manner, the first chamber 21 and the second chamber 22 have different hydrogen pressures. Therefore, the inside of the sealed container 15 is in a state in which a pressure difference is generated between two sides of the heat-generating element 14.

When the pressure difference is generated between the two sides of the heat-generating element 14, a hydrogen molecule contained in the hydrogen-based gas is adsorbed on the one surface (the front surface) of the heat-generating element 14 at a high pressure side, and the hydrogen molecule is dissociated into two hydrogen atoms. The hydrogen atoms obtained by dissociation infiltrate into the heat-generating element 14. That is, hydrogen is occluded into the heat-generating element 14. The hydrogen atoms diffuse into the heat-generating element 14 and go through from one surface to the other surface of the heat-generating element 14. On the other surface (the back surface) of the heat-generating element 14 at a low pressure side, the hydrogen atoms that have gone through the heat-generating element 14 are recombined with each other and discharged as a hydrogen molecule. That is, hydrogen is discharged from the heat-generating element 14. In this manner, hydrogen permeates through the heat-generating element 14 from the high pressure side to the low pressure side. "Permeate" refers to that hydrogen occluded from one surface of the heat-generating element 14 is discharged from the other surface of the heat-generating element. The heat-generating element 14 to be described in detail later generates heat by occluding hydrogen, and generates heat also by discharging hydrogen. Therefore, the heat-generating element 14 generates heat by permeation of hydrogen. In the following description, "hydrogen permeates through" the heat-generating element may be described as "a hydrogen-based gas permeates through" the heat-generating element.

A pressure sensor (not shown) that detects an internal pressure of the first chamber 21 is provided inside the first chamber 21. A pressure sensor (not shown) that detects an internal pressure of the second chamber 22 is provided inside the second chamber 22. The pressure sensors provided in the first chamber 21 and the second chamber 22 are electrically connected with the control unit 18, and output a signal corresponding to the detected pressure to the control unit 18.

The temperature adjustment unit 16 adjusts a temperature of the heat-generating element 14 and maintains the heat-generating element 14 at an appropriate temperature for heat generation. An appropriate temperature for heat generation in the heat-generating element 14 is within a range of, for example, 50° C. or higher and 1500° C. or lower.

The temperature adjustment unit 16 includes a temperature sensor 16a and the heater 16b. The temperature sensor 16a detects the temperature of the heat-generating element 14. The temperature sensor 16a is, for example, a thermocouple, and is provided in the installation portion 20 of the sealed container 15. The temperature sensor 16a is electrically connected with the control unit 18, and outputs a signal corresponding to the detected temperature to the control unit 18.

The heater 16b heats the heat-generating element 14. The heater 16b is, for example, an electric heating wire of an electric resistance heat generating type, and is wound around an outer periphery of the sealed container 15. The heater 16b is electrically connected with a power supply 26, and generates heat by inputting electric power from the power supply 26. The heater 16b may be an electric furnace that covers the outer periphery of the sealed container 15.

The hydrogen circulation line 17 is provided outside the sealed container 15, connects the first chamber 21 and the second chamber 22, and circulates a hydrogen-based gas containing hydrogen between an inside and an outside of the sealed container 15. The hydrogen circulation line 17 includes a buffer tank 28, an introduction line 29, a recovery line 30, and a filter 31. Although not shown in FIG. 1, the heat utilization system 10 includes a supply line for supplying the hydrogen-based gas to the hydrogen circulation line 17, and an exhaust line for exhausting the hydrogen-based gas from the hydrogen circulation line 17. For example, the hydrogen-based gas is supplied from the supply line to the hydrogen circulation line 17 when an operation of the heat utilization system 10 is started, and the hydrogen-based gas in the hydrogen circulation line 17 is exhausted to the exhaust line when the operation of the heat utilization system 10 is stopped.

The buffer tank 28 stores the hydrogen-based gas. The hydrogen-based gas is a gas containing isotopes of hydrogen. As the hydrogen-based gas, at least one of a deuterium gas and a protium gas is used. The protium gas includes a mixture of naturally occurring protium and deuterium, that is, a mixture in which an abundance ratio of protium is 99.985% and an abundance ratio of deuterium is 0.015%. A flow rate fluctuation of the hydrogen-based gas is absorbed by the buffer tank 28.

The introduction line 29 connects the buffer tank 28 and the introduction port 23 of the first chamber 21, and introduces the hydrogen-based gas stored in the buffer tank 28 into the first chamber 21. The introduction line 29 includes a pressure adjustment valve 32. The pressure adjustment valve 32 depressurizes the hydrogen-based gas sent from the buffer tank 28 to a predetermined pressure. The pressure adjustment valve 32 is electrically connected with the control unit 18.

The recovery line 30 connects the recovery port 24 of the second chamber 22 and the buffer tank 28, recovers the hydrogen-based gas that has permeated through the heat-generating element 14 from the first chamber 21 to the second chamber 22, and returns the recovered hydrogen-based gas to the buffer tank 28. The recovery line 30 includes a circulation pump 33. The circulation pump 33 recovers the hydrogen-based gas in the second chamber 22 to the recovery line 30, pressurizes the hydrogen-based gas to a predetermined pressure, and sends the pressurized hydrogen-based gas to the buffer tank 28. Examples of the circulation pump 33 include a metal bellows pump. The circulation pump 33 is electrically connected with the control unit 18.

The filter 31 removes impurities contained in the hydrogen-based gas. Here, a permeation amount of hydrogen permeating through the heat-generating element 14 (hereinafter, referred to as a hydrogen permeation amount) is determined by the temperature of the heat-generating element 14, a pressure difference between two sides of the heat-generating element 14, and a surface state of the heat-generating element 14. When the hydrogen-based gas contains impurities, the impurities may adhere to a surface of the heat-generating element 14, and may deteriorate the surface state of the heat-generating element 14. When the impurities adhere to the surface of the heat-generating element 14, adsorption and dissociation of the hydrogen molecule on the surface of the heat-generating element 14 are hindered, and the hydrogen permeation amount decreases. Examples of impurities that hinder the adsorption and dissociation of the hydrogen molecule on the surface of the heat-generating element 14 include water (including steam), hydrocarbons (methane, ethane, methanol, ethanol, and the like), C, S, and Si. It is considered that water is discharged from an inner wall or the like of the sealed container 15, or is obtained by reducing, by hydrogen, an oxide film contained in a member provided inside the sealed container 15. It is considered that hydrocarbons, C, S, and Si are discharged from various members provided inside the sealed container 15. Therefore, the filter 31 at least removes the impurities including water (including steam), hydrocarbons, C, S, and Si. The filter 31 removes the impurities contained in the hydrogen-based gas, so that the hydrogen permeation amount through the heat-generating element 14 can be prevented from decreasing.

The control unit 18 controls an operation of each unit of the heat utilization system 10. The control unit 18 mainly includes, for example, an arithmetic device (a central processing unit), and a storage unit such as a read-only memory and a random access memory. The arithmetic device executes various kinds of arithmetic processings using a program, data, and the like stored in the storage unit.

The control unit 18 is electrically connected with the temperature sensor 16a, the power supply 26, the pressure adjustment valve 32, and the circulation pump 33. The control unit controls an output of the excess heat generated by the heat-generating element 14 by adjusting input electric power of the heater 16b, a pressure of the sealed container 15, and the like.

The control unit 18 functions as an output control unit that controls an output of the heater 16b based on the temperature detected by the temperature sensor 16a. The control unit 18 controls the power supply 26 to adjust input electric power to the heater 16b, thereby maintaining the heat-generating element 14 at an appropriate temperature for heat generation.

The control unit 18 controls the pressure adjustment valve 32 and the circulation pump 33 to adjust a hydrogen pressure difference generated between the first chamber 21 and the second chamber 22, based on a pressure detected by a pressure sensor (not shown) provided in each of the first chamber 21 and the second chamber 22.

The control unit 18 performs a hydrogen occluding step of occluding hydrogen in the heat-generating element 14 and a hydrogen discharging step of discharging hydrogen from the heat-generating element 14. In the present embodiment, the control unit 18 simultaneously performs the hydrogen occluding step and the hydrogen discharging step by generating a hydrogen pressure difference between the first chamber 21 and the second chamber 22. The control unit 18 causes a pressure in the first chamber 21 to be higher than a pressure in the second chamber 22 by introducing the hydrogen-based gas from the introduction line 29 to the first chamber 21 and recovering the hydrogen-based gas from the second chamber 22 to the recovery line 30, and maintains a state in which occluding of hydrogen on the front surface of the heat-generating element 14 and discharging of hydrogen on the back surface of the heat-generating element 14 are simultaneously performed. "Simultaneously" in the present disclosure refers to exact simultaneous or refers to a short period of time to an extent that can be regarded as substantially simultaneous. Since hydrogen continuously permeates through the heat-generating element 14 by simultaneously performing the hydrogen occluding step and the hydrogen discharging step, the excess heat can be efficiently generated in the heat-generating element 14. The control unit 18 may alternately repeat the hydrogen occluding step and the hydrogen discharging step. That is, the control unit 18 may first perform the hydrogen occluding step to occlude hydrogen in the heat-generating element 14, and thereafter perform the hydrogen discharging step to discharge hydrogen occluded in the heat-generating element 14. In this manner, the excess heat can be generated by the heat-generating element 14 by alternately repeating the hydrogen occluding step and the hydrogen discharging step.

In the heat generating device 11, when a hydrogen pressure difference is generated between the first chamber 21 and the second chamber 22 that sandwich the heat-generating element 14, hydrogen permeates through the heat-generating element 14 and the excess heat is generated.

The heat utilization device 12 utilizes, as a heat source, a heat medium heated by the heat of the heat-generating element 14. The heat medium may be a gas or a liquid, and preferably has excellent heat conductivity and chemical stability. Examples of the gas include a rare gas such as a helium gas and an argon gas, a hydrogen gas, a nitrogen gas, steam, air, carbon dioxide, and a gas for forming a hydride. Examples of the liquid include water, a molten salt (such as $KNO_3(40\%)$-$NaNO_3(60\%)$), and a liquid metal (such as Pb). Alternatively, the heat medium may be a heat medium having mixed phases in which solid particles are dispersed in a gas or a liquid. Examples of the solid particles include a metal, a metal compound, an alloy, and ceramics. Examples of the metal include copper, nickel, titanium, and cobalt. Examples of the metal compound include an oxide, a nitride, and a silicide of the above-described metals. Examples of the alloy include stainless steel and chromium molybdenum steel. Examples of the ceramics include alumina. In this example, a helium gas is used as the heat medium.

The heat utilization device 12 includes an accommodation container 41, a heat medium circulation unit 42, a gas turbine 43, a steam generator 44, a steam turbine 45, a Stirling engine 46, and a thermoelectric converter 47. Although the heat utilization device 12 includes the gas turbine 43, the steam generator 44, the steam turbine 45, the Stirling engine 46, and the thermoelectric converter 47 in FIG. 1, the heat utilization device 12 may include any combination of these components.

The accommodation container 41 is a hollow container, and accommodates the sealed container 15 of the heat generating device 11 therein. The accommodation container 41 is made of ceramics, stainless steel, or the like. In this example, the accommodation container 41 has a shape having a longitudinal direction parallel to a longitudinal direction of the sealed container 15. A material of the accommodation container 41 is preferably a material having an excellent heat insulation property. The accommodation container 41 is covered with a heat insulation member 51 in order to more reliably cut off heat exchange with the outside.

The accommodation container 41 has an inlet port 41a and an outlet port 41b that are connected with the heat medium circulation unit 42 serving as a heat medium circulation line to be described later. The heat medium is circulated through a gap 54 between the accommodation container 41 and the sealed container 15. The inlet port 41a is provided at one end of the accommodation container 41 in the longitudinal direction. The outlet port 41b is provided at the other end of the accommodation container 41 in the longitudinal direction. The gap 54 is formed by an inner surface of the accommodation container 41 and an outer surface of the sealed container 15.

The heat medium circulation unit 42 circulates the heat medium between an inside and an outside of the accommodation container 41. In the present embodiment, the heat medium circulation unit 42 includes a first pipe 42a that connects the accommodation container 41 and the gas turbine 43, a second pipe 42b that connects the gas turbine 43 and the steam generator 44, a third pipe 42c that connects the steam generator 44 and the Stirling engine 46, a fourth pipe 42d that connects the Stirling engine 46 and the accommodation container 41, a pump 42e that causes the heat medium to flow from the accommodation container 41 to the first pipe 42a, and a heat medium flow rate control unit 42f that adjusts a flow rate of the heat medium flowing out from the accommodation container 41 to the first pipe 42a. The pump 42e and the heat medium flow rate control unit 42f are provided in the first pipe 42a. Examples of the pump 42e include a metal bellows pump.

The heat medium flowing out from the accommodation container 41 sequentially flows through the first pipe 42a, the second pipe 42b, the third pipe 42c, and the fourth pipe 42d, and is returned to the accommodation container 41. Therefore, the heat medium circulation unit 42 functions as a heat medium circulation line through which the heat medium is circulated between the inside and the outside of the accommodation container 41. The heat medium heated by the heat generating device 11 inside the accommodation container 41 flows through the heat medium circulation unit 42 serving as a heat medium circulation line, and is cooled sequentially via the gas turbine 43, the steam generator 44, the Stirling engine 46, and the thermoelectric converter 47. The cooled heat medium flows into the accommodation container 41 and is heated again by the heat generating device 11. That is, the heat utilization device 12 discharges the heat medium heated by the heat of the heat-generating element 14 inside the accommodation container 41 to the heat medium circulation line, and introduces the heat medium cooled by being circulated through the heat medium circulation line into the accommodation container 41.

The heat medium flow rate control unit 42f controls a flow rate of the heat medium based on the temperature detected by the temperature sensor 16a. The heat medium flow rate control unit 42f includes a variable leak valve or the like as an adjustment valve. For example, when the temperature of the heat-generating element 14 detected by the temperature sensor 16a is higher than an upper limit temperature of an appropriate temperature range for heat generation of the heat-generating element 14, the heat medium flow rate control unit 42f increases a circulation flow rate of the heat medium. Cooling of the heat-generating element 14 is promoted by increasing the circulation flow rate of the heat medium. On the other hand, when the temperature of the heat-generating element 14 detected by the temperature sensor 16a is lower than a lower limit temperature of the appropriate temperature range for heat generation of the heat-generating element 14, the heat medium flow rate control unit 42f reduces the circulation flow rate of the heat medium. Cooling of the heat-generating element 14 is slowed down by reducing the circulation flow rate of the heat medium. In this manner, the heat medium flow rate control unit 42f maintains the heat-generating element 14 at an appropriate temperature for heat generation by increasing or reducing the circulation flow rate of the heat medium.

The gas turbine 43 is driven by the heat medium flowing out from the accommodation container 41. A temperature of the heat medium supplied to the gas turbine 43 is preferably in a range of, for example, 600° C. or higher and 1500° C. or lower. The gas turbine 43 includes a compressor 43a and a turbine 43b. The compressor 43a and the turbine 43b are coupled to each other by a rotation shaft (not shown). The compressor 43a generates a high-temperature and high-pressure heat medium by compressing the helium gas heated by the heat generating device 11. The turbine 43b is rotated about the rotation shaft by the heat medium that has passed through the compressor 43a.

The gas turbine 43 is connected with a power generator 48. The power generator 48 is coupled to the rotation shaft of the gas turbine 43, and generates power by rotation of the turbine 43b.

The steam generator 44 generates steam by the heat of the heat medium flowing out from the gas turbine 43. The steam generator 44 includes an internal pipe 44a and a heat exchange unit 44b. The internal pipe 44a connects the second pipe 42b and the third pipe 42c and circulates the heat medium. The heat exchange unit 44b is implemented by a pipe through which boiler water is circulated, and performs heat exchange between the boiler water circulating through the pipe and the heat medium flowing through the internal pipe 44a. The boiler water is heated due to the heat exchange to generate steam.

The steam generator 44 is connected to the steam turbine 45 via a steam pipe 44c and a water supply pipe 44d. The steam pipe 44c supplies the steam generated by the heat exchange unit 44b to the steam turbine 45. The water supply pipe 44d includes a condenser (not shown) and a water supply pump (not shown). Steam discharged from the steam turbine 45 is cooled by the condenser and returned to the boiler water, and the boiler water is sent to the heat exchange unit 44b via the water supply pump.

The steam turbine 45 is driven by the steam generated by the steam generator 44. A temperature of the steam supplied to the steam turbine 45 is preferably in a range of, for example, 300° C. or higher and 700° C. or lower. The steam turbine 45 has a rotation shaft (not shown) and is rotated about the rotation shaft.

The steam turbine 45 is connected with a power generator 49. The power generator 49 is coupled to the rotation shaft of the steam turbine 45, and generates power by rotation of the steam turbine 45.

The Stirling engine 46 is driven by the heat medium flowing out from the steam generator 44. The temperature of the heat medium supplied to the Stirling engine 46 is preferably in a range of, for example, 300° C. or higher and 1000° C. or lower. In this example, the Stirling engine 46 is a displacer type Stirling engine. The Stirling engine 46 includes a cylinder portion 46a, a displacer piston 46b, a power piston 46c, a flow path 46d, and a crank portion 46e.

The cylinder portion 46a has a cylindrical shape, and one end thereof is closed and the other end thereof is opened. The displacer piston 46b is provided inside the cylinder portion 46a. The power piston 46c is provided at other end side inside the cylinder portion 46a with respect to the displacer piston 46b. The displacer piston 46b and the power piston 46c can reciprocate in an axial direction of the cylinder portion 46a.

An expansion space 52 and a compression space 53 partitioned by the displacer piston 46b are provided inside the cylinder portion 46a. The expansion space 52 is provided at one end side of the cylinder portion 46a with respect to the compression space 53. A working fluid is sealed in the expansion space 52 and the compression space 53. Examples of the working fluid include a helium gas, a hydrogen-based gas, and air. In this example, a helium gas is used as the working fluid.

The flow path 46d is provided outside the cylinder portion 46a, and connects the expansion space 52 and the compression space 53. The flow path 46d circulates the working fluid between the expansion space 52 and the compression space 53.

The flow path 46d includes a high temperature portion 55, a low temperature portion 56, and a regenerator 57. The working fluid in the expansion space 52 sequentially passes through the high temperature portion 55, the regenerator 57, and the low temperature portion 56, and flows into the compression space 53. The working fluid in the compression space 53 sequentially passes through the low temperature portion 56, the regenerator 57, and the high temperature portion 55, and flows into the expansion space 52.

The high temperature portion 55 is a heat exchanger for heating the working fluid. A heat transfer pipe 58 is provided outside the high temperature portion 55. The heat transfer pipe 58 connects the third pipe 42c and the fourth pipe 42d, and circulates the heat medium from the third pipe 42c to the fourth pipe 42d. When the heat medium flows from the third pipe 42c to the heat transfer pipe 58, the heat of the heat medium is transferred to the high temperature portion 55, and the working fluid passing through the high temperature portion 55 is heated.

The low temperature portion 56 is a heat exchanger for cooling the working fluid. A cooling pipe 59 is provided outside the low temperature portion 56. The cooling pipe 59 is connected with a cooling medium supply unit (not shown). The cooling pipe 59 circulates a cooling medium supplied from the cooling medium supply unit. When the cooling medium flows through the cooling pipe 59, the heat of the working fluid passing through the low temperature portion 56 is taken by the cooling medium, and the working fluid is cooled. The cooling medium is, for example, water.

The regenerator 57 is a heat exchanger for storing heat. The regenerator 57 is provided between the high temperature portion 55 and the low temperature portion 56. When the working fluid moves from the expansion space 52 to the compression space 53, the regenerator 57 receives and accumulates the heat from the working fluid that has passed through the high temperature portion 55. When the working fluid moves from the compression space 53 to the expansion space 52, the regenerator 57 supplies the accumulated heat to the working fluid that has passed through the low temperature portion 56.

The crank portion 46e is provided at the other end of the cylinder portion 46a. The crank portion 46e includes, for example, a crankshaft rotatably supported by a crankcase, a rod connected with the displacer piston 46b, a rod connected with the power piston 46c, and a coupling member that couples the rods and the crankshaft. The crank portion 46e converts reciprocating motions of the displacer piston 46b and the power piston 46c into a rotational motion of the crankshaft.

The Stirling engine 46 is connected with a power generator 50. The power generator 50 is coupled to the crankshaft of the Stirling engine 46, and generates power by rotation of the crankshaft.

The thermoelectric converter 47 converts the heat of the heat medium circulating through the fourth pipe 42d into electric power by utilizing a Seebeck effect. The thermoelectric converter 47 generates electric power by converting the heat of the heat medium of, for example, 300° C. or lower. The thermoelectric converter 47 has a cylindrical shape and covers an outer periphery of the fourth pipe 42d.

The thermoelectric converter 47 includes a thermoelectric conversion module 47a provided on an inner surface thereof and a cooling unit 47b provided on an outer surface thereof. The thermoelectric conversion module 47a includes a heat reception substrate facing the fourth pipe 42d, a heat reception side electrode provided on the heat reception substrate, a heat dissipation substrate facing the cooling unit 47b, a heat dissipation side electrode provided on the heat dissipation substrate, p-type thermoelectric elements each made of a p-type semiconductor, and n-type thermoelectric elements each made of an n-type semiconductor. In this example, in the thermoelectric conversion module 47a, the p-type thermoelectric elements and the n-type thermoelectric elements are alternately arranged, and a p-type thermoelectric element and an n-type thermoelectric element adjacent to each other are electrically connected with each other via the heat reception side electrode and the heat dissipation side electrode. A lead is electrically connected with a p-type thermoelectric element provided at one end of the thermoelectric conversion module 47a and an n-type thermoelectric element provided at the other end of the thermoelectric conversion module 47a via the heat dissipation side electrode. The cooling unit 47b is implemented by, for example, a pipe through which cooling water is circulated. Accordingly, the thermoelectric converter 47 generates electric power corresponding to a temperature difference generated between the inner surface and the outer surface.

Figure 2:
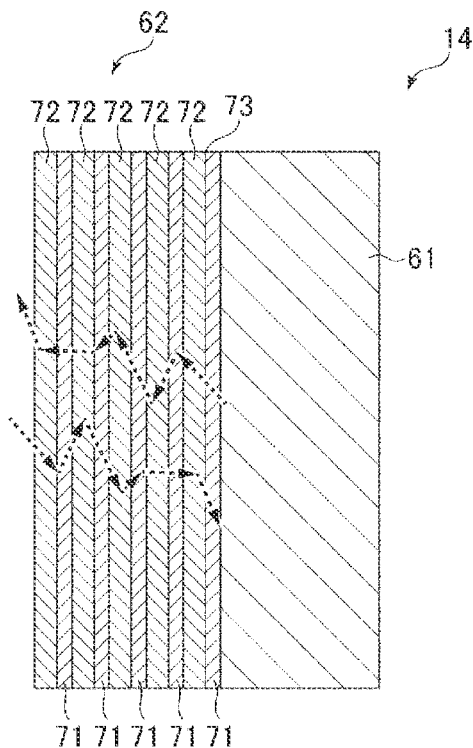
FIG. 2 is a cross-sectional view showing a structure of a heat-generating element having a first layer and a second layer.

A detailed structure of the heat-generating element 14 will be described with reference to FIG. 2. As shown in FIG. 2, the heat-generating element 14 includes a support element 61 and a multilayer film 62.

The support element 61 is made of at least one of a porous body, a hydrogen permeable film, and a proton conductor. In this example, the support element 61 has a plate shape having a front surface and a back surface. The porous body has pores having a size through which the hydrogen-based gas can pass through. The porous body is made of a metal, a non-metal, ceramics, or the like. The porous body is preferably made of a material that does not hinder a reaction between the hydrogen-based gas and the multilayer film 62 (hereinafter, referred to as an exothermic reaction). The hydrogen permeable film is made of, for example, a hydrogen storage metal or a hydrogen storage alloy. Examples of the hydrogen storage metal include Ni, Pd, V, Nb, Ta, and Ti. Examples of the hydrogen storage alloy include $LaNi_5$, $CaCu_5$, $MgZn_2$, $ZrNi_2$, $ZrCr_2$, TiFe, TiCo, $Mg_2Ni$, and $Mg_2Cu$. The hydrogen permeable film is a film having a mesh-like sheet. Examples of the proton conductor include a $BaCeO_3$-based conductor (for example, Ba $(Ce_{0.95}Y_{0.05})$ $O_{3-6}$), a $SrCeO_3$-based conductor (for example, Sr $(Ce_{0.95}Y_{0.05})$ $O_{3-6}$), a $CaZrO_3$-based conductor (for example, $CaZr_{0.95}Y_{0.05}O_{3-\alpha}$) a $SrZrO_3$-based conductor (for example, $SrZr_{0.9}Y_{0.1}O_{3-\alpha}$) $\beta$-$Al_2O_3$, and $\beta$-$Ga_2O_3$.

The multilayer film 62 is provided on the support element 61. The multilayer film 62 has a first layer 71 made of a hydrogen storage metal or a hydrogen storage alloy, and a second layer 72 made of a hydrogen storage metal different from that of the first layer 71, a hydrogen storage alloy different from that of the first layer 71, or ceramics. A heterogeneous material interface 73 to be described later is formed between the support element 61 and the first layer 71 and the second layer 72. In FIG. 2, the multilayer film 62 is formed by alternately stacking the first layer 71 and the second layer 72 in order on one surface (for example, the front surface) of the support element 61. The first layer 71 and the second layer 72 each have five layers. The number of layers of each of the first layer 71 and the second layer 72 may be changed as appropriate. The multilayer film 62 may be formed by alternately stacking the second layer 72 and the first layer 71 in order on the front surface of the support element 61. The multilayer film 62 preferably has one or more first layers 71 and one or more second layers 72, and one or more heterogeneous material interfaces 73 are preferably formed.

The first layer 71 is made of, for example, any one of Ni, Pd, Cu, Mn, Cr, Fe, Mg, Co, and an alloy thereof. An alloy for forming the first layer 71 is preferably an alloy made of two or more of Ni, Pd, Cu, Mn, Cr, Fe, Mg, and Co. The alloy for forming the first layer 71 may be an alloy obtained by adding an additive element to Ni, Pd, Cu, Mn, Cr, Fe, Mg, and Co.

The second layer 72 is made of, for example, any one of Ni, Pd, Cu, Mn, Cr, Fe, Mg, Co, an alloy thereof, and SiC. An alloy for forming the second layer 72 is preferably an alloy made of two or more of Ni, Pd, Cu, Mn, Cr, Fe, Mg, and Co. The alloy for forming the second layer 72 may be an alloy obtained by adding an additive element to Ni, Pd, Cu, Mn, Cr, Fe, Mg, and Co.

A combination of the first layer 71 and the second layer 72 is preferably Pd—Ni, Ni—Cu, Ni—Cr, Ni—Fe, Ni—Mg, and Ni—Co when types of elements are expressed as "first layer 71-second layer 72 (second layer 72-first layer 71)". When the second layer 72 is made of ceramics, the "first layer 71-second layer 72" is preferably Ni—SiC.

Figure 3:
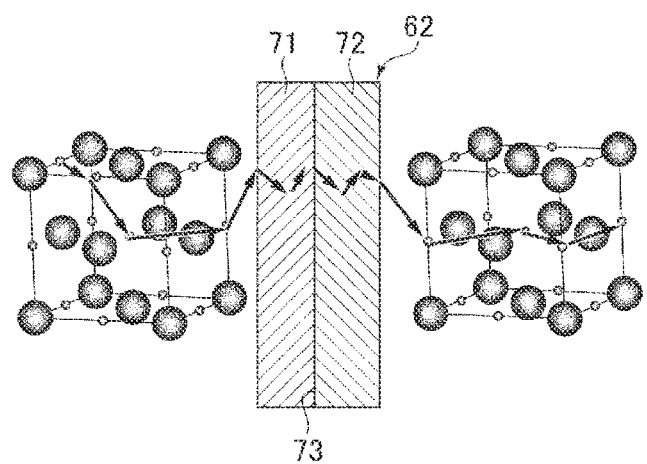
FIG. 3 is a diagram showing generation of excess heat.

As shown in FIG. 3, hydrogen atoms permeate through the heterogeneous material interface 73. FIG. 3 is a schematic diagram showing a state in which hydrogen atoms in a metal lattice of the first layer 71 permeate through the heterogeneous material interface 73 and move to a metal lattice of the second layer 72 in the first layer 71 and the second layer 72 each made of a hydrogen storage metal having a face-centered cubic structure. It is known that hydrogen is light and hops in a manner of quantum diffusion at a site (octahedral site or tetrahedral site) occupied by hydrogen of a certain substance A and substance B. Therefore, hydrogen occluded in the heat-generating element 14 hops in the multilayer film 62 in a manner of quantum diffusion. In the heat-generating element 14, hydrogen permeates through the first layer 71, the heterogeneous material interface 73, and the second layer 72 in a manner of quantum diffusion.

A thickness of each of the first layer 71 and the second layer 72 is preferably less than 1000 nm. When the thickness of each of the first layer 71 and the second layer 72 is 1000 nm or more, hydrogen is less likely to permeate through the multilayer film 62. When the thickness of each of the first layer 71 and the second layer 72 is less than 1000 nm, a nano-structure that does not exhibit a bulk property can be maintained. The thickness of each of the first layer 71 and the second layer 72 is more preferably less than 500 nm. When the thickness of each of the first layer 71 and the second layer 72 is less than 500 nm, a nano-structure that does not exhibit a bulk property at all can be maintained.

An example of a method for manufacturing the heat-generating element 14 will be described. The plate-shaped support element 61 is prepared, an evaporation device is used to make a hydrogen storage metal or a hydrogen storage alloy for forming the first layer 71 or the second layer 72 into a gas phase state, and then the first layer 71 and the second layer 72 are alternately formed on the front surface of the support element 61 by aggregation or adsorption, so that the heat-generating element 14 is formed. The first layer 71 and the second layer 72 are preferably formed continuously in a vacuum state. Accordingly, between the first layer 71 and the second layer 72, no natural oxide film is formed and only the heterogeneous material interface 73 is formed. The evaporation device may be a physical evaporation device in which the hydrogen storage metal or the hydrogen storage alloy is evaporated by a physical method. The physical evaporation device is preferably a sputtering device, a vacuum evaporation device, and a chemical vapor deposition (CVD) device. Alternatively, the hydrogen storage metal or the hydrogen storage alloy may be deposited on the front surface of the support element 61 by an electroplating method, and the first layer 71 and the second layer 72 may be alternately formed.

Figure 4:
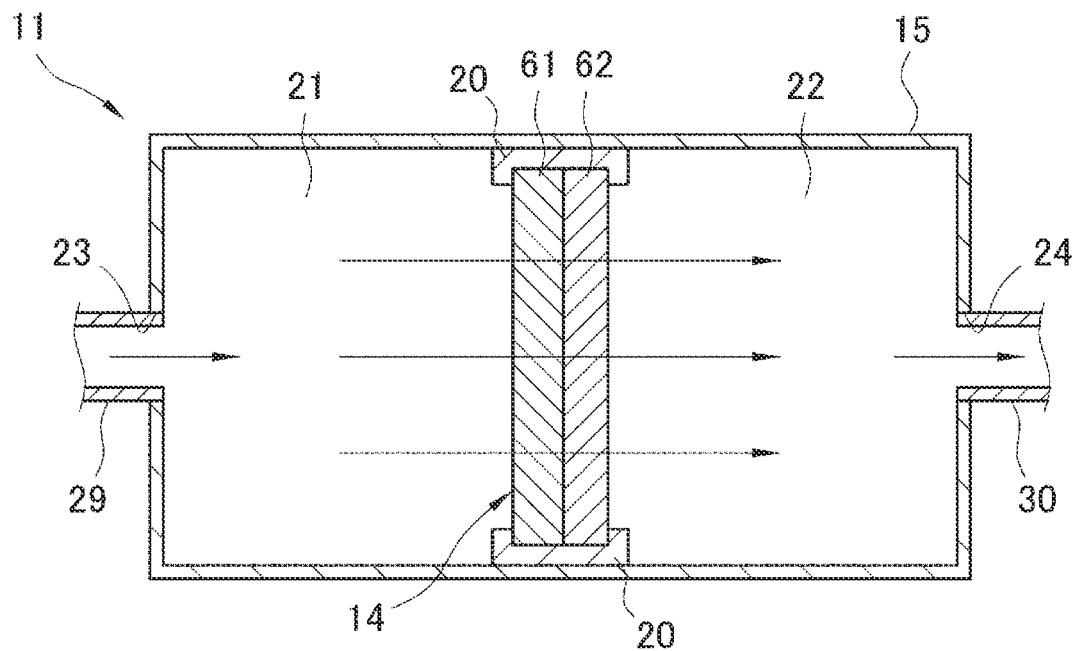
FIG. 4 is a diagram showing a function of a heat generating device.

As shown in FIG. 4, in the heat-generating element 14, the support element 61 is provided at a first chamber 21 side (a high pressure side), and the multilayer film 62 is provided at a second chamber 22 side (a low pressure side). Due to a hydrogen pressure difference generated between the first chamber 21 and the second chamber 22, hydrogen introduced into the first chamber 21 permeates an inside of the heat-generating element 14 sequentially through the support element 61 and the multilayer film 62, and moves to the second chamber 22. The heat-generating element 14 generates excess heat when hydrogen permeates through the multilayer film 62, that is, by occluding hydrogen to the multilayer film 62 and discharging hydrogen from the multilayer film 62. In the heat-generating element 14, the support element 61 may be provided at the second chamber 22 side (the low pressure side) and the multilayer film 62 may be provided at the first chamber 21 side (the high pressure side).

Since the heat-generating element 14 generates heat using hydrogen, a greenhouse gas such as carbon dioxide is not generated. Hydrogen used is generated from water and is thus inexpensive. Unlike a nuclear fission reaction, heat generation of the heat-generating element 14 is safe since there is no chain reaction. Therefore, since the heat utilization system 10 and the heat generating device 11 utilize the heat-generating element 14 as a heat energy source, inexpensive, clean, and safe energy can be supplied.

The invention is not limited to the first embodiment described above, and can be modified as appropriate without departing from the scope of the invention. Hereinafter, modifications of the first embodiment will be described. In the drawings and in the description of the modifications, the same or equivalent components and members as those in the first embodiment described above are denoted by the same reference numerals. Repeated description with the first embodiment described above is omitted as appropriate, and configurations different from those in the first embodiment described above will be mainly described.

[Modification 1]

Figure 5:
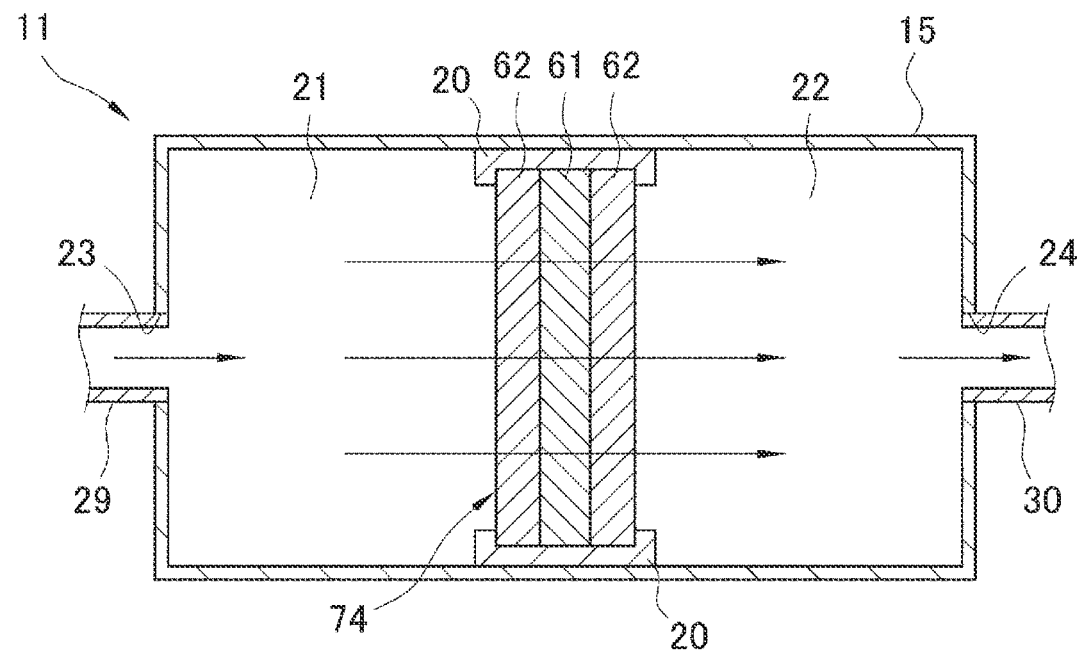
FIG. 5 is a diagram showing a heat-generating element having a multilayer film on both surfaces according to Modification 1.

As shown in FIG. 5, instead of the heat-generating element 14 in which the multilayer film 62 is only provided on the front surface of the support element 61, the heat generating device 11 uses a heat-generating element 74 in which the multilayer film 62 is provided on two surfaces of the support element 61. The heat-generating element 74 generates excess heat by occluding and discharging hydrogen. A high output of excess heat can be achieved by using the heat-generating element 74.

[Modification 2]

Figure 6:
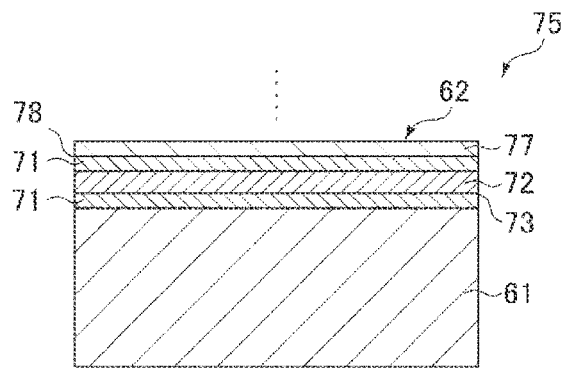
FIG. 6 is a diagram showing a heat-generating element having a first layer, a second layer, and a third layer according to Modification 2.

Instead of the heat-generating element 14, the heat generating device 11 includes a heat-generating element 75 shown in FIG. 6. As shown in FIG. 6, the multilayer film 62 of the heat-generating element 75 further has a third layer 77 in addition to the first layer 71 and the second layer 72. The third layer 77 is made of a hydrogen storage metal, a hydrogen storage alloy, or ceramics different from those of the first layer 71 and the second layer 72. A thickness of the third layer 77 is preferably less than 1000 nm. In FIG. 6, the first layer 71, the second layer 72, and the third layer 77 are stacked on the front surface of the support element 61 in order of the first layer 71, the second layer 72, the first layer 71, and the third layer 77. The first layer 71, the second layer 72, and the third layer 77 may be stacked on the front surface of the support element 61 in order of the first layer 71, the third layer 77, the first layer 71, and the second layer 72. That is, the multilayer film 62 has a stacking structure in which the first layer 71 is provided between the second layer 72 and the third layer 77. The multilayer film 62 preferably has one or more third layers 77. Similar to the heterogeneous material interface 73, hydrogen atoms permeate through a heterogeneous material interface 78 formed between the first layer 71 and the third layer 77.

The third layer 77 is made of, for example, any one of Ni, Pd, Cu, Cr, Fe, Mg, Co, an alloy thereof, SiC, CaO, $Y_2O_3$, TiC, $LaB_6$, SrO, and BaO. An alloy for forming the third layer 77 is preferably an alloy made of two or more of Ni, Pd, Cu, Cr, Fe, Mg, and Co. The alloy for forming the third layer 77 may be an alloy obtained by adding an additive element to Ni, Pd, Cu, Cr, Fe, Mg, and Co.

In particular, the third layer 77 is preferably made of any one of CaO, $Y_2O_3$, TiC, $LaB_6$, SrO, and BaO. In the heat-generating element 75 having the third layer 77 made of any one of CaO, $Y_2O_3$, TiC, $LaB_6$, SrO, and BaO, an occluding amount of hydrogen is increased, an amount of hydrogen permeating through the heterogeneous material interface 73 and the heterogeneous material interface 78 is increased, and a high output of excess heat can be achieved. The thickness of the third layer 77 made of any one of CaO, $Y_2O_3$, TiC, $LaB_6$, SrO, and BaO is preferably 10 nm or less.

Accordingly, hydrogen atoms easily permeate through the multilayer film 62. The third layer 77 made of any one of CaO, $Y_2O_3$, TiC, $LaB_6$, SrO, and BaO may not be formed into a complete film shape and may be formed into an island shape. The first layer 71 and the third layer 77 are preferably formed continuously in a vacuum state. Accordingly, between the first layer 71 and the third layer 77, no natural oxide film is formed and only the heterogeneous material interface 78 is formed.

A combination of the first layer 71, the second layer 72, and the third layer 77 is preferably Pd—CaO—Ni, Pd—$Y_2O_3$—Ni, Pd—TiC—Ni, Pd—$LaB_6$—Ni, Ni—CaO—Cu, Ni—$Y_2O_3$—Cu, Ni—TiC—Cu, Ni—$LaB_6$—Cu, Ni—Co—Cu, Ni—CaO—Cr, Ni—$Y_2O_3$—Cr, Ni—TiC—Cr, Ni—$LaB_6$—Cr, Ni—CaO—Fe, Ni—$Y_2O_3$—Fe, Ni—TiC—Fe, Ni—$LaB_6$—Fe, Ni—Cr—Fe, Ni—CaO—Mg, Ni—$Y_2O_3$—Mg, Ni—TiC—Mg, Ni—$LaB_6$—Mg, Ni—CaO—Co, Ni—$Y_2O_3$—Co, Ni—TiC—Co, Ni—$LaB_6$—Co, Ni—CaO—SiC, Ni—$Y_2O_3$—SiC, Ni—TiC—SiC, and Ni—$LaB_6$—SiC when types of elements are expressed as "first layer 71-third layer 77-second layer 72".

[Modification 3]

Figure 7:
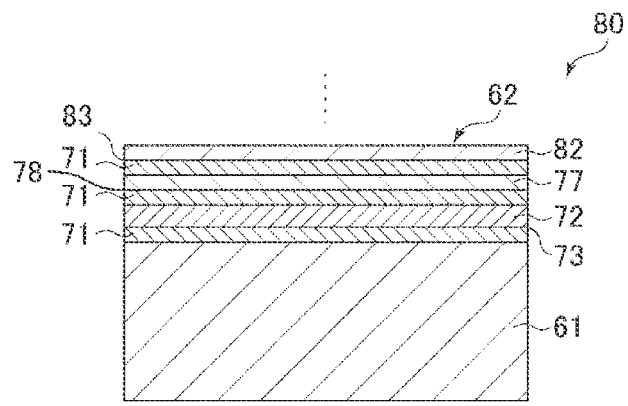
FIG. 7 is a diagram showing a heat-generating element having a first layer, a second layer, a third layer, and a fourth layer according to Modification 3.

Instead of the heat-generating element 14, the heat generating device 11 includes a heat-generating element 80 shown in FIG. 7. As shown in FIG. 7, the multilayer film 62 of the heat-generating element 80 further has a fourth layer 82 in addition to the first layer 71, the second layer 72, and the third layer 77. The fourth layer 82 is made of a hydrogen storage metal, a hydrogen storage alloy, or ceramics different from those of the first layer 71, the second layer 72, and the third layer 77. A thickness of the fourth layer 82 is preferably less than 1000 nm. In FIG. 7, the first layer 71, the second layer 72, the third layer 77, and the fourth layer 82 are stacked on the front surface of the support element 61 in order of the first layer 71, the second layer 72, the first layer 71, the third layer 77, the first layer 71, and the fourth layer 82. The first layer 71, the second layer 72, the third layer 77, and the fourth layer 82 may be stacked on the front surface of the support element 61 in order of the first layer 71, the fourth layer 82, the first layer 71, the third layer 77, the first layer 71, and the second layer 72. That is, the multilayer film 62 has a stacking structure in which the second layer 72, the third layer 77, and the fourth layer 82 are stacked in any order and the first layer 71 is provided between the second layer 72 and the third layer 77, between the third layer 77 and the fourth layer 82, and between the second layer 72 and the fourth layer 82. The multilayer film 62 preferably has one or more fourth layers 82. Similar to the heterogeneous material interface 73 and the heterogeneous material interface 78, hydrogen atoms permeate through a heterogeneous material interface 83 formed between the first layer 71 and the fourth layer 82.

The fourth layer 82 is made of, for example, any one of Ni, Pd, Cu, Cr, Fe, Mg, Co, an alloy thereof, SiC, CaO, $Y_2O_3$, TiC, $LaB_6$, SrO, and BaO. An alloy for forming the fourth layer 82 is preferably an alloy made of two or more of Ni, Pd, Cu, Cr, Fe, Mg, and Co. The alloy for forming the fourth layer 82 may be an alloy obtained by adding an additive element to Ni, Pd, Cu, Cr, Fe, Mg, and Co.

In particular, the fourth layer 82 is preferably made of any one of CaO, $Y_2O_3$, TiC, $LaB_6$, SrO, and BaO. In the heat-generating element 80 having the fourth layer 82 made of any one of CaO, $Y_2O_3$, TiC, $LaB_6$, SrO, and BaO, an occluding amount of hydrogen is increased, an amount of hydrogen permeating through the heterogeneous material interface 73, the heterogeneous material interface 78, and the heterogeneous material interface 83 is increased, and a high output of excess heat can be achieved. The thickness of the fourth layer 82 made of any one of CaO, $Y_2O_3$, TiC, $LaB_6$, SrO, and BaO is preferably 10 nm or less. Accordingly, hydrogen atoms easily permeate through the multilayer film 62. The fourth layer 82 made of any one of CaO, $Y_2O_3$, TiC, $LaB_6$, SrO, and BaO may not be formed into a complete film shape and may be formed into an island shape. The first layer 71 and the fourth layer 82 are preferably formed continuously in a vacuum state. Accordingly, between the first layer 71 and the fourth layer 82, no natural oxide film is formed and only the heterogeneous material interface 83 is formed.

A combination of the first layer 71, the second layer 72, the third layer 77, and the fourth layer 82 is preferably Ni—CaO—Cr—Fe, Ni—$Y_2O_3$—Cr—Fe, Ni—TiC—Cr—Fe, and Ni—$LaB_6$—Cr—Fe when types of elements are expressed as "first layer 71-fourth layer 82-third layer 77-second layer 72".

A configuration of the multilayer film 62 such as a ratio of layer thicknesses, the number of layers of each layer, and a material may be appropriately changed according to a temperature to be used. Hereinafter, an example of the configuration of the multilayer film 62 corresponding to a temperature will be described after describing a "relationship between a ratio of layer thicknesses of the multilayer film and the excess heat", a "relationship between the number of layers of the multilayer film and the excess heat", and a "relationship between a material of the multilayer film and the excess heat".

The "relationship between a ratio of layer thicknesses of the multilayer film and the excess heat", the "relationship between the number of layers of the multilayer film and the excess heat", and the "the relationship between a material of the multilayer film and the excess heat" were examined by preparing an experimental heat generating device (not shown) and performing, by using the experimental heat generating device, an experiment to test whether the heat-generating element generates excess heat. The experimental heat generating device includes a sealed container, two heat-generating elements provided inside the sealed container, and a heater that heats the heat-generating elements. The heat-generating element has a plate shape. The heater is a ceramic heater having a plate shape, and includes a built-in thermocouple. The heater is provided between the two heat-generating elements. The sealed container is connected to a hydrogen-based gas supply path and an exhaust path. The hydrogen-based gas supply path connects a gas cylinder that stores a hydrogen-based gas and the sealed container. The hydrogen-based gas supply path is provided with an adjustment valve or the like for adjusting a supply amount of the hydrogen-based gas stored in the gas cylinder to the sealed container. The exhaust path connects a dry pump for evaciating an inside of the sealed container and the sealed container. The exhaust path is provided with an adjustment valve for adjusting an exhaust amount of the gas.

The experimental heat generating device generates the excess heat from the heat-generating element by alternately repeating a hydrogen occluding step and a hydrogen discharging step. That is, the experimental heat generating device occludes hydrogen in the heat-generating element 14 by performing the hydrogen occluding step, and then discharges the hydrogen occluded in the heat-generating element 14 by performing the hydrogen discharging step. In the hydrogen occluding step, the hydrogen-based gas is supplied into the sealed container. In the hydrogen discharging step, the inside of the sealed container is evacuated and the heat-generating element is heated.

The "relationship between a ratio of layer thicknesses of the multilayer film and the excess heat" will be described. A relationship between a ratio of a thickness of the second layer 72 to a thickness of the first layer 71 and the excess heat was examined using the heat-generating element 14 including the support element 61 made of Ni and the multilayer film 62 having the first layer 71 made of Cu and the second layer 72 made of Ni. Hereinafter, the ratio of layer thicknesses of the multilayer film 62 is referred to as Ni:Cu.

Eight types of heat-generating elements 14 in which the multilayer film 62 was formed under the same conditions except the ratio Ni:Cu were prepared and used as Experimental Examples 1 to 8. The multilayer film 62 was provided only on the front surface of the support element 61. Ratios Ni:Cu in the heat-generating elements 14 according to Experimental Examples 1 to 8 are respectively 7:1, 14:1, 4.33:1, 3:1, 5:1, 8:1, 6:1, and 6.5:1. In each of the heat-generating elements 14 according to Experimental Examples 1 to 8, the multilayer film 62 is formed by repeating a stacking configuration having the first layer 71 and the second layer 72. In each of the heat-generating elements 14 according to Experimental Examples 1 to 8, the number of layers in the stacking configuration of the multilayer film 62 (hereinafter, referred to as the number of layers of the multilayer film) was 5. The thickness of the entire multilayer film 62 in each of the heat-generating elements 14 according to Experimental Examples 1 to 8 was substantially the same.

Figure 8:
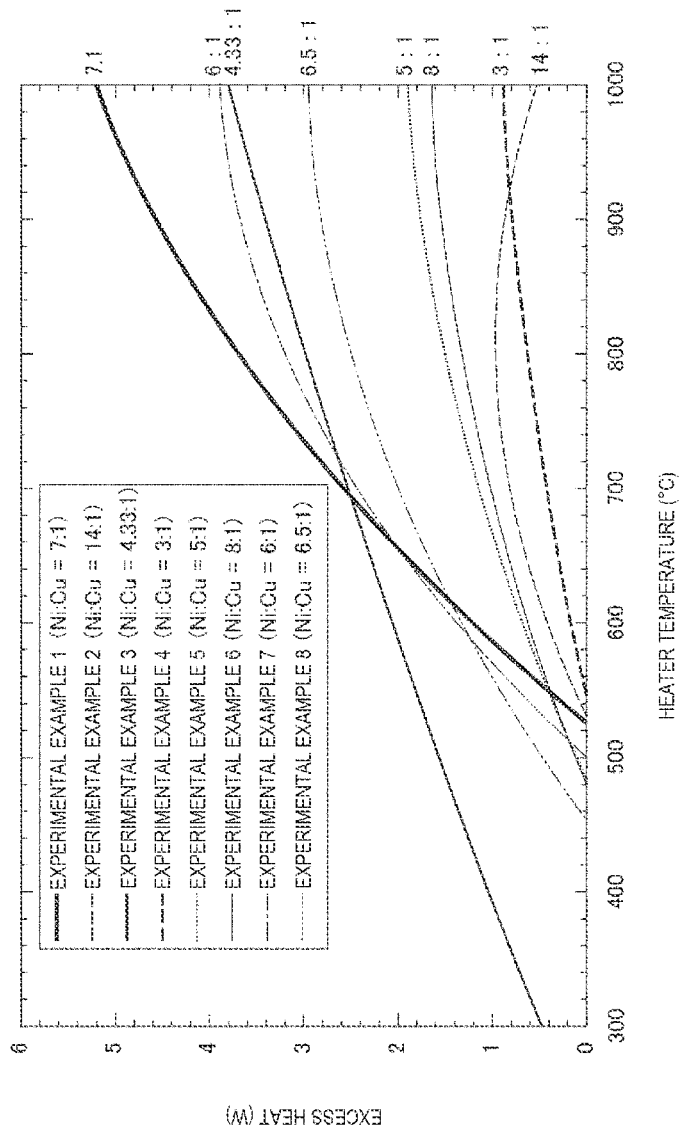
FIG. 8 is a graph showing a relationship between a ratio of layer thicknesses of the multilayer film and the excess heat.

Each of the heat-generating elements 14 according to Experimental Examples 1 to 8 was provided inside a sealed container of an experimental heat generating device, and the hydrogen occluding step and the hydrogen discharging step were alternately repeated. A protium gas (manufactured by Numata Oxygen Co., grade 2, purity: 99.999 vol % or more) was used as a hydrogen-based gas. In the hydrogen occluding step, the hydrogen-based gas was supplied into the sealed container at about 50 Pa. The time for occluding hydrogen in the heat-generating element 14 was about 64 hours. Before the hydrogen occluding step, first, the inside of the sealed container was baked by a heater at about 200° C. or higher for 36 hours to remove water and the like adhered to a front surface of the heat-generating element 14. Hydrogen discharging steps were performed with input electric power of the heater of 9 W, 18 W, and 27 W, and hydrogen occluding steps were performed between the hydrogen discharging steps. Then, the temperature of the heat-generating element 14 in each of the hydrogen discharging steps was measured using the thermocouple built in the heater. Results are shown in FIG. 8. FIG. 8 is a graph obtained by fitting measured data by a predetermined method. In FIG. 8, a horizontal axis indicates a heater temperature and a vertical axis indicates electric power of excess heat. The heater temperature is the temperature of the heat-generating element 14 at predetermined input electric power. In FIG. 8, Experimental Example 1 was expressed as "Ni:Cu=7:1", Experimental Example 2 was expressed as "Ni:Cu=14:1", Experimental Example 3 was expressed as "Ni:Cu=4.33:1", Experimental Example 4 was expressed as "Ni:Cu=3:1", Experimental Example 5 was expressed as "Ni:Cu=5:1", Experimental Example 6 was expressed as "Ni:Cu=8:1", Experimental Example 7 was expressed as "Ni:Cu=6:1", and Experimental Example 8 was expressed as "Ni:Cu=6.5:1".

From FIG. 8, it was confirmed that the excess heat was generated in all of the heat-generating elements 14 according to Experimental Examples 1 to 8. When comparing the heat-generating elements 14 according to Experimental Examples 1 to 8 at a heater temperature of 700° C. or higher, it is found that the heat-generating element 14 according to Experimental Example 1 generates the largest excess heat. When comparing the heat-generating element according to Experimental Example 3 with the heat-generating elements 14 according to Experimental Examples 1, 2, 4 to 8, it is found that the heat-generating element according to Experimental Example 3 generates excess heat in a wide range in which the heater temperature is 300° C. or higher and 1000° C. or lower. It is found that the excess heat increases as the heater temperature increases in the heat-generating elements 14 according to Experimental Examples 1, 3 to 8 in which Ni:Cu of the multilayer film 62 is 3:1 to 8:1. It is found that the excess heat decreases at a heater temperature of 800° C. or higher in the heat-generating element 14 according to Experimental Example 2 in which Ni:Cu of the multilayer film 62 is 14:1. Thus, it is considered that the excess heat does not simply increase with respect to the ratio Ni:Cu due to a quantum effect of hydrogen in the multilayer film 62.

Next, the "relationship between the number of layers of the multilayer film and the excess heat" will be described. A relationship between the number of layers of the multilayer film 62 and the excess heat was examined by using the heat-generating element 14 including the support element 61 made of Ni and the multilayer film 62 having the first layer 71 made of Cu and the second layer 72 made of Ni.

Eight types of heat-generating elements 14 in which the multilayer film 62 was manufactured under the conditions same as the conditions for manufacturing the heat-generating element 14 according to Experimental Example 1 except the number of layers were prepared and used as Experimental Examples 9 to 16. The number of layers of the multilayer films 62 of the heat-generating elements 14 according to Experimental Examples 1, 9 to 16 is respectively 5, 3, 7, 6, 8, 9, 12, 4, and 2.

Figure 9:
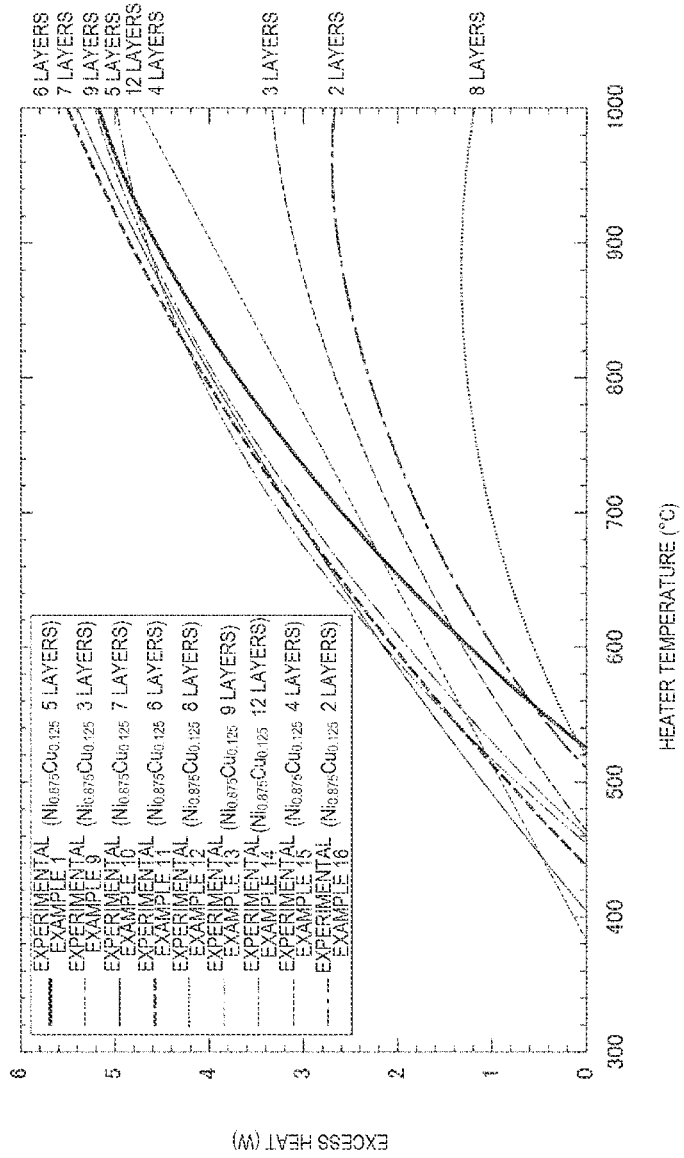
FIG. 9 is a graph showing a relationship between the number of layers of the multilayer film and the excess heat.

Each of the heat-generating elements 14 according to Experimental Examples 1, 9 to 16 was provided inside a sealed container of an experimental heat generating device. The experimental heat generating device is the same as the device used to examine the above-described "relationship between a ratio of layer thicknesses of the multilayer film and the excess heat". In the experimental heat generating device, the temperature of each of the heat-generating elements 14 during the hydrogen discharging step was measured by the same method as that for the above-described "relationship between a ratio of layer thicknesses of the multilayer film and the excess heat". Results are shown in FIG. 9. FIG. 9 is a graph obtained by fitting measured data by a predetermined method. In FIG. 9, a horizontal axis indicates a heater temperature and a vertical axis indicates electric power of excess heat. In FIG. 9, based on a thickness of each layer, Experimental Example 1 was expressed as "$Ni_{0.875}Cu_{0.125}$ 5 layers", Experimental Example 9 was expressed as "$Ni_{0.875}Cu_{0.125}$ 3 layers", Experimental Example 10 was expressed as "$Ni_{0.875}Cu_{0.125}$ 7 layers", Experimental Example 11 was expressed as "$Ni_{0.875}Cu_{0.125}$ 6 layers", Experimental Example 12 was expressed as "$Ni_{0.875}Cu_{0.125}$ 8 layers", Experimental Example 13 was expressed as "$Ni_{0.875}Cu_{0.125}$ 9 layers", Experimental Example 14 was expressed as "$Ni_{0.875}Cu_{0.125}$ 12 layers", Experimental Example 15 was expressed as "$Ni_{0.875}Cu_{0.125}$ 4 layers", and Experimental Example 16 was expressed as "$Ni_{0.875}Cu_{0.125}$ 2 layers".

From FIG. 9, it was confirmed that the excess heat was generated in all of the heat-generating elements 14 according to Experimental Examples 1, 9 to 16. When comparing the heat-generating elements 14 according to Experimental Examples 1, 9 to 16 at a heater temperature of 840° C. or higher, it is found that the heat-generating element 14 according to Experimental Example 11 in which the number of layers of the multilayer film 62 is 6 generates the largest excess heat and the heat-generating element 14 according to Experimental Example 12 in which the number of layers of the multilayer film 62 is 8 generates the smallest excess heat. Thus, it is considered that the excess heat does not simply increase with respect to the number of layers of the multilayer film 62 since a wavelength of a behavior as the hydrogen wave in the multilayer film 62 is in a nanometer order and interferes with the multilayer film 62.

Next, the "relationship between a material of the multilayer film and the excess heat" will be described. The relationship between a type of a material for forming the third layer 77 and the excess heat was examined using the heat-generating element 75 including the multilayer film 62 having the first layer 71 made of Ni, the second layer 72 made of Cu, and the third layer 77 made of a hydrogen storage metal, a hydrogen storage alloy, or ceramics different from the materials of the first layer 71 and the second layer 72.

Nine types of heat-generating elements 75 in which the multilayer film 62 was made under the same conditions except for types of the material for forming the third layer 77 were prepared and used as Experimental Examples 17 to 25. The types of the material for forming the third layer 77 in the heat-generating elements 75 according to Experimental Examples 17 to 25 are respectively CaO, SiC, $Y_2O_3$, TiC, Co, $LaB_6$, ZrC, $TiB_2$, and CaOZrO.

Figure 10:
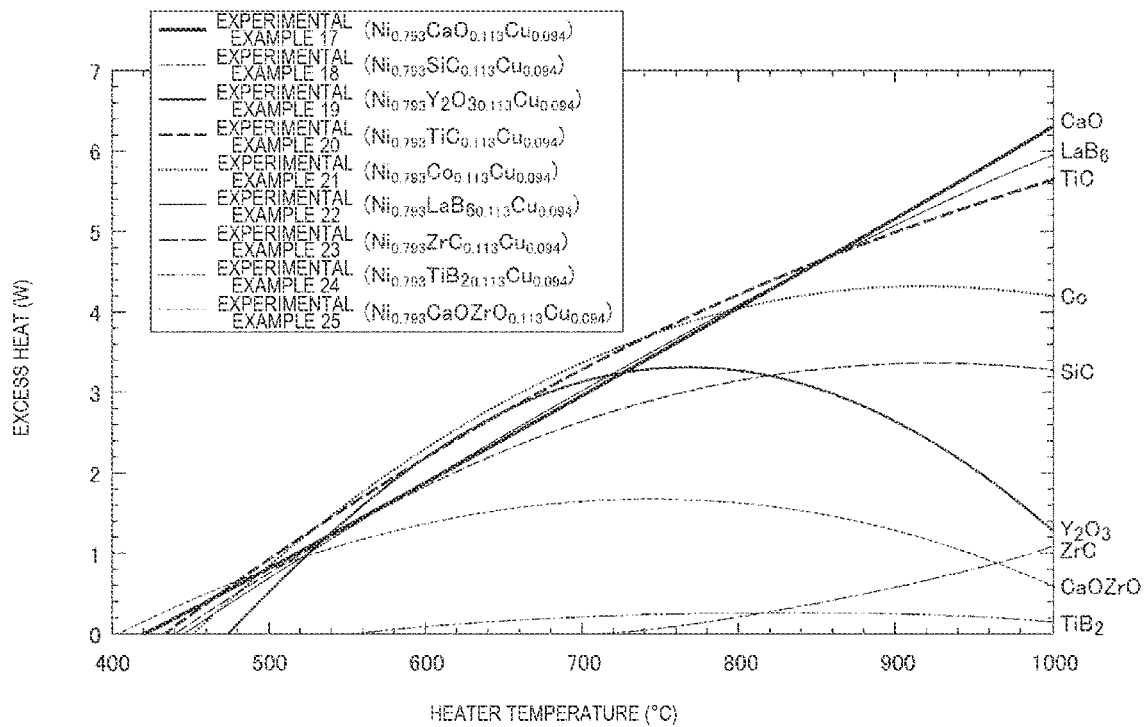
FIG. 10 is a graph showing a relationship between a material of the multilayer film and the excess heat.

Each of the heat-generating elements 75 according to Experimental Examples 17 to 25 was provided inside a sealed container of an experimental heat generating device. The experimental heat generating device is the same as the device used to examine the above-described "relationship between a ratio of layer thicknesses of the multilayer film and the excess heat". In the experimental heat generating device, the temperature of each of the heat-generating elements 75 during the hydrogen discharging step was measured by the same method as that for the above-described "relationship between a ratio of layer thicknesses of the multilayer film and the excess heat". Results are shown in FIG. 10. FIG. 10 is a graph obtained by fitting measured data by a predetermined method. In FIG. 10, a horizontal axis indicates a heater temperature and a vertical axis indicates electric power of excess heat. In FIG. 10, based on a thickness of each layer, Experimental Example 17 was expressed as "$Ni_{0.793}CaO_{0.113}Cu_{0.094}$", Experimental Example 18 was expressed as "$Ni_{0.793}SiC_{0.113}Cu_{0.094}$", Experimental Example 19 was expressed as "$Ni_{0.793}Y_2O_{30.113}Cu_{0.094}$", Experimental Example 20 was expressed as "$Ni_{0.793}TiC_{0.113}Cu_{0.094}$", Experimental Example 21 was expressed as "$Ni_{0.793}Co_{0.113}Cu_{0.094}$", Experimental Example 22 was expressed as "$Ni_{0.793}LaB_{60.113}Cu_{0.094}$", Experimental Example 23 was expressed as "$Ni_{0.793}ZrC_{0.113}Cu_{0.094}$", Experimental Example 24 was expressed as "$Ni_{0.793}TiB_{20.113}Cu_{0.094}$", and Experimental Example 25 was expressed as "$Ni_{0.793}CaZrO_{0.113}Cu_{0.094}$".

From FIG. 10, it was confirmed that the excess heat was generated in all of the heat-generating elements 75 according to Experimental Examples 17 to 25. In particular, when comparing Experimental Example 17 in which a material for forming the third layer 77 is CaO, Experimental Example 20 in which a material for forming the third layer 77 is TiC, and Experimental Example 22 in which a material for forming the third layer 77 is LaB$_6$ with Experimental Examples 18, 19, 21, 23 to 25, it is found that the excess heat increases in a substantially linear manner in a wide range in which the heater temperature is 400° C. or higher and 1000° C. or lower. Materials for forming the third layers 77 in Experimental Examples 17, 20, and 22 have a work function smaller than those of the materials in Experimental Examples 18, 19, 21, 23 to 25. Therefore, it is found that the type of the material for forming the third layer 77 preferably has a small work function. Based on the results, an electron density in the multilayer film 62 may contribute to an exothermic reaction.

An example of the configuration of the multilayer film 62 corresponding to the temperature of the heat-generating element 14 will be described. In consideration of the above-described "relationship between a ratio of layer thicknesses of the multilayer film and the excess heat" of the heat-generating element 14, when the temperature of the heat-generating element 14 is a low temperature (for example, in a range of 50° C. or higher and 500° C. or lower), a ratio of layer thicknesses of the multilayer film 62 is preferably in a range of 2:1 or more and 5:1 or less. When the temperature of the heat-generating element 14 is an intermediate temperature (for example, in a range of 500° C. or higher and 800° C. or lower), the ratio of layer thicknesses of the multilayer film 62 is preferably in a range of 5:1 or more and 6:1 or less. When the temperature of the heat-generating element 14 is a high temperature (for example, in a range of 800° C. or higher and 1500° C. or lower), the ratio of layer thicknesses of the multilayer film 62 is preferably in a range of 6:1 or more and 12:1 or less.

In consideration of the above-described "relationship between the number of layers of the multilayer film and the excess heat", when the temperature of the heat-generating element 14 is any one of the low temperature, the intermediate temperature, and the high temperature, the number of layers of the first layer 71 of the multilayer film 62 is preferably in a range of 2 layers or more and 18 layers or less, and the number of layers of the second layer 72 is preferably in a range of 2 layers or more and 18 layers or less.

In consideration of the above-described "relationship between a material of the multilayer film and the excess heat" of the heat-generating element 75, when the temperature of the heat-generating element 75 is the low temperature, the first layer 71 is preferably made of Ni, the second layer 72 is preferably made of Cu, and the third layer 77 is preferably made of Y$_2$O$_3$. When the temperature of the heat-generating element 75 is the intermediate temperature, the first layer 71 is preferably made of Ni, the second layer 72 is preferably made of Cu, and the third layer 77 is preferably made of TiC. When the temperature of the heat-generating element 75 is the high temperature, the first layer 71 is preferably made of Ni, the second layer 72 is preferably made of Cu, and the third layer 77 is preferably made of CaO or LaB$_6$.

[Modification 4]

Figure 11:
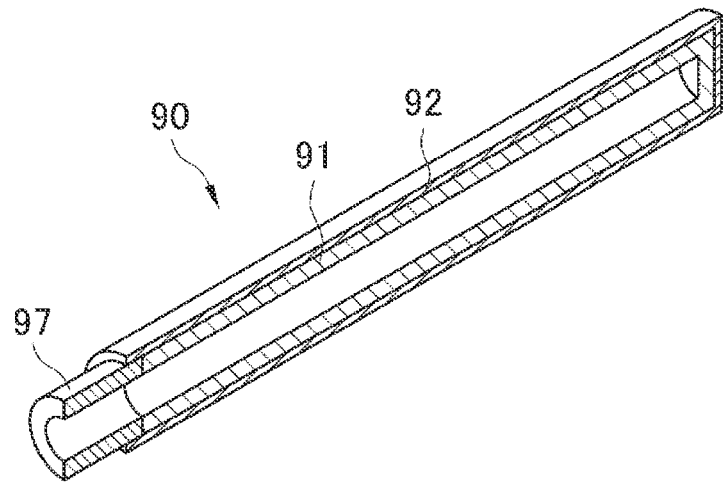
FIG. 11 is a cross-sectional view showing a heat-generating element having a bottomed cylindrical shape.

FIG. 11 is a cross-sectional view showing a heat-generating element 90 having a bottomed cylindrical shape with one end opened and the other end closed. The heat-generating element 90 includes a support element 91 and a multilayer film 92. The support element 91 is made of at least one of a porous body, a hydrogen permeable film, and a proton conductor. The multilayer film 92 has a first layer (not shown) made of a hydrogen storage metal or a hydrogen storage alloy and having a thickness of less than 1000 nm, and a second layer (not shown) made of a hydrogen storage metal different from that of the first layer, a hydrogen storage alloy different from that of the first layer, or ceramics and having a thickness of less than 1000 nm. Although the heat-generating element 90 has a bottomed cylindrical shape in FIG. 11, the heat-generating element 90 may have a bottomed polygonal cylindrical shape.

An example of a method for manufacturing the heat-generating element 90 will be described. The heat-generating element 90 is manufactured by preparing the support element 91 having a bottomed cylindrical shape, and forming the multilayer film 92 on the support element 91 using a wet film forming method. In this example, the multilayer film 92 is formed on an outer surface of the support element 91. Accordingly, the heat-generating element 90 having a bottomed cylindrical shape is formed. Examples of the wet film forming method include a spin coating method, a spray coating method, and a dipping method. The multilayer film 92 may be formed by using an atomic layer deposition (ALD) method, or the multilayer film 92 may be formed on the support element 91 while rotating the support element 91 using a sputtering device including a rotation mechanism that rotates the support element 91. The multilayer film 92 is not limited to being provided only on the outer surface of the support element 91, and may be provided only on an inner surface of the support element 91, or on two surfaces of the support element 91.

Figure 12:
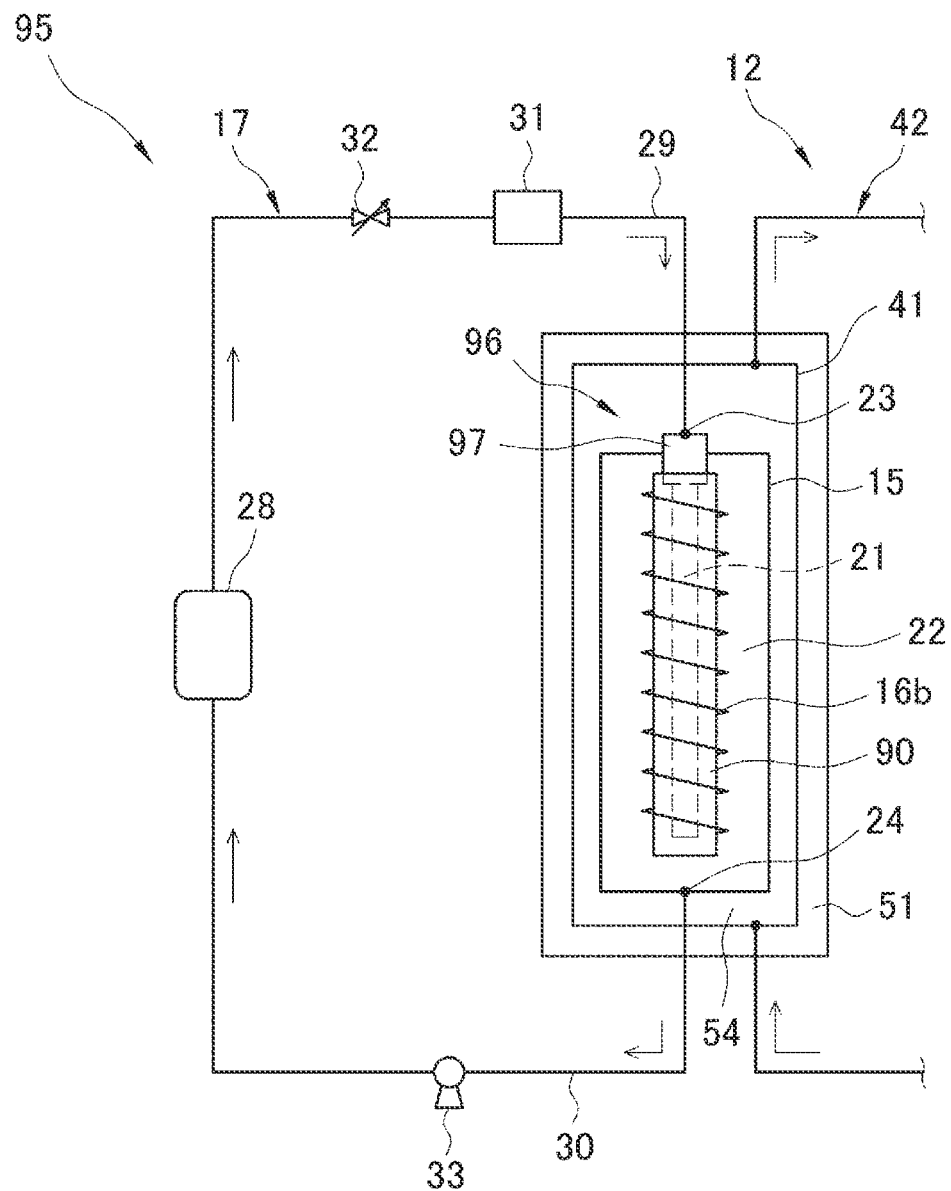
FIG. 12 is a schematic diagram showing a heat utilization system according to Modification 4.

As shown in FIG. 12, a heat utilization system 95 includes a heat generating device 96 and the heat utilization device 12. The heat generating device 96 is different from the heat generating device 11 according to the above-described embodiment in that the heat generating device 96 includes the heat-generating element 90 instead of the heat-generating element 14. The heat-generating element 90 is mounted in the sealed container 15 using a mounting pipe 97. Although not shown in FIG. 12, the heat utilization system 95 includes a temperature sensor that detects a temperature of the heat-generating element 90, a power supply that inputs electric power to the heater 16b, a control unit serving as an output control unit that controls an output of the heater 16b based on the temperature detected by the temperature sensor. The temperature sensor is provided, for example, on an outer surface of the heat-generating element 90.

The mounting pipe 97 is made of, for example, stainless steel. The mounting pipe 97 passes through the sealed container 15. One end of the mounting pipe 97 is provided in the gap 54 between the inner surface of the accommodation container 41 and the outer surface of the sealed container 15, and the other end of the mounting pipe 97 is provided inside the sealed container 15. One end of the mounting pipe 97 is connected with the introduction line 29 of the hydrogen circulation line 17. The other end of the mounting pipe 97 is provided with the heat-generating element 90.

In Modification 4, the first chamber 21 is formed by an inner surface of the heat-generating element 90. The second chamber 22 is defined by the inner surface of the sealed container 15 and the outer surface of the heat-generating element 90. Therefore, in the heat-generating element 90, the support element 91 is provided at the first chamber 21 side (a high pressure side), and the multilayer film 92 is provided at the second chamber 22 side (a low pressure side) (see FIG. 11). Due to a pressure difference generated between the first chamber 21 and the second chamber 22, hydrogen introduced into the first chamber 21 permeates an inside of the heat-generating element 90 sequentially through the support element 91 and the multilayer film 92, and moves to the second chamber 22. That is, hydrogen permeates through the heat-generating element 90 from the inner surface thereof toward the outer surface thereof. Accordingly, the heat-generating element 90 generates excess heat when hydrogen is discharged from the multilayer film 92. Therefore, the heat utilization system 95 has the same effects as the heat utilization system 10 according to the above-described embodiment.

Figure 13:
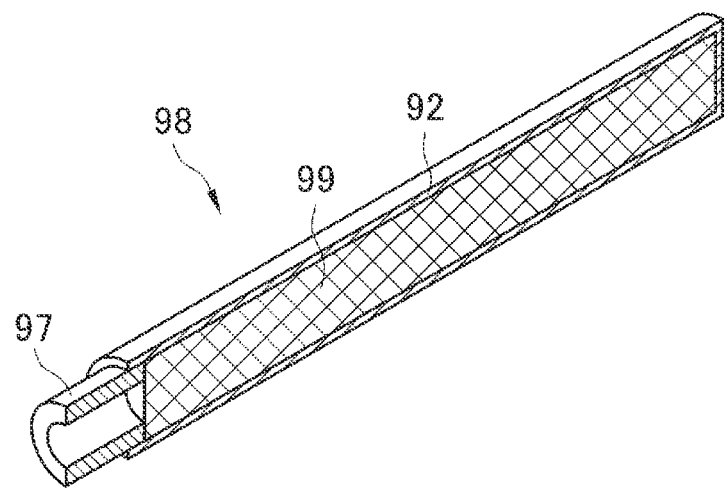
FIG. 13 is a cross-sectional view showing a heat-generating element including a support element having a columnar shape.

The heat utilization system 95 may include a heat-generating element 98 shown in FIG. 13 instead of the heat-generating element 90. The heat-generating element 98 is different from the heat-generating element 90 in that the heat-generating element 98 includes a support element 99 having a columnar shape. Similar to the support element 61, the support element 99 is made of at least one of a porous body, a hydrogen permeable film, and a proton conductor. The support element 99 improves mechanical strength of the heat-generating element 98 while allowing passage of the hydrogen-based gas therethrough. Although the support element 99 has a cylindrical columnar shape in FIG. 13, the support element 99 may have a polygonal columnar shape.

[Modification 5]

Figure 14:
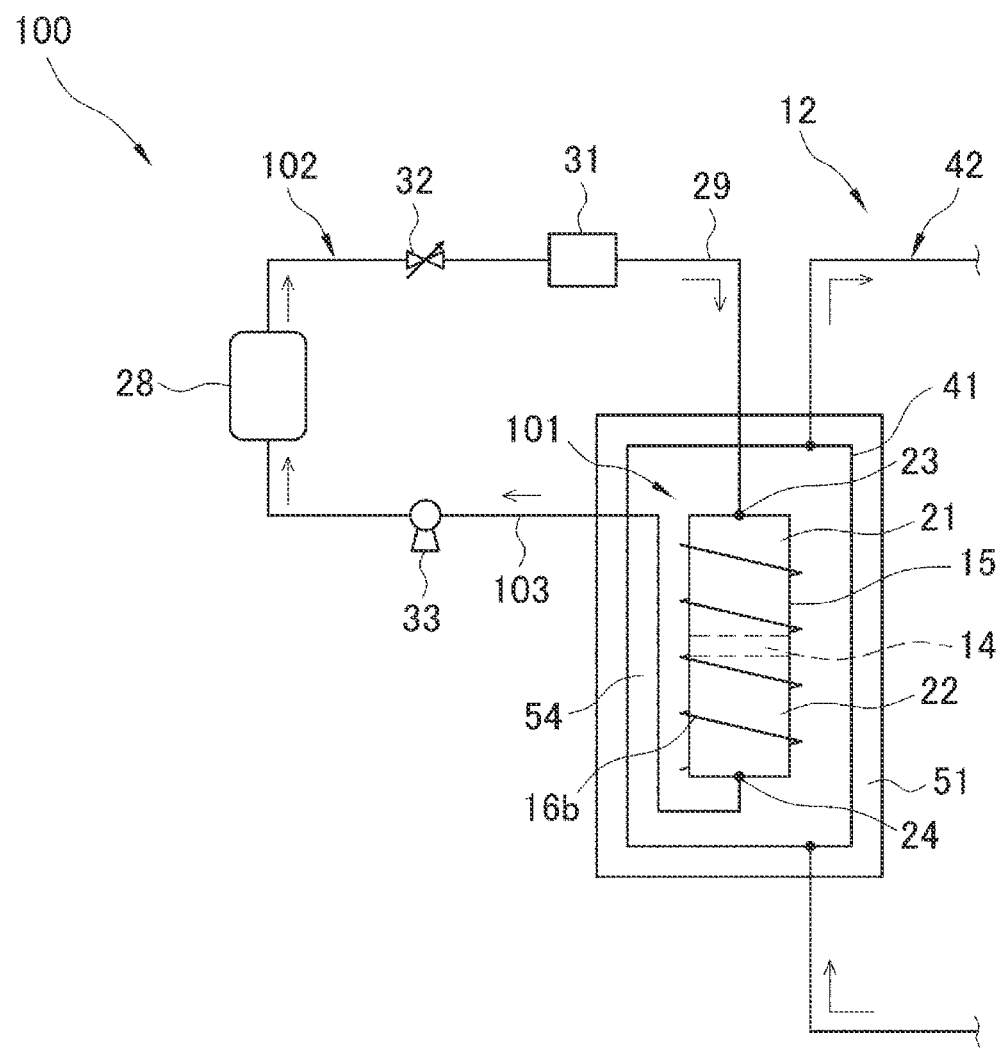
FIG. 14 is a schematic diagram showing a heat utilization system according to Modification 5.

As shown in FIG. 14, a heat utilization system 100 includes a heat generating device 101 and the heat utilization device 12. The heat generating device 101 is different from the heat generating device 11 according to the above-described embodiment in that the heat generating device 101 includes a hydrogen circulation line 102 instead of the hydrogen circulation line 17.

The hydrogen circulation line 102 includes the buffer tank 28, the introduction line 29, a recovery line 103, and the filter 31. The recovery line 103 connects the recovery port 24 of the second chamber 22 and the buffer tank 28, recovers the hydrogen-based gas that has permeated through the heat-generating element 14 from the first chamber 21 to the second chamber 22, and returns the recovered hydrogen-based gas to the buffer tank 28. The recovery line 103 includes the circulation pump 33.

The recovery line 103 passes through the gap 54 between the inner surface of the accommodation container 41 and the outer surface of the sealed container 15. Specifically, the recovery line 103 has, in the gap 54, a portion extending in a direction parallel to the longitudinal direction of the sealed container 15. A part of the recovery line 103 provided in the gap 54 is provided in the heat medium heated by the heat of the heat-generating element 14. The hydrogen-based gas heated by the heat of the heat-generating element 14 inside the sealed container flows into the recovery line 103. The heat of the hydrogen-based gas flowing into the recovery line 103 is taken by the heat medium when the hydrogen-based gas circulates through the part of the recovery line 103 provided in the heat medium, and then the hydrogen-based gas is returned to the buffer tank 28 in a cooled state. That is, the recovery line 103 returns the hydrogen-based gas, whose heat is taken by the heat medium circulating through the gap 54, to the buffer tank 28.

As described above, not only the heat of the heat-generating element 14 is transferred to the heat medium, but also the heat of the hydrogen-based gas heated by permeating through the heat-generating element 14 is transferred to the heat medium, so that the heat utilization system 100 is excellent in energy efficiency.

[Modification 6]

Figure 15:
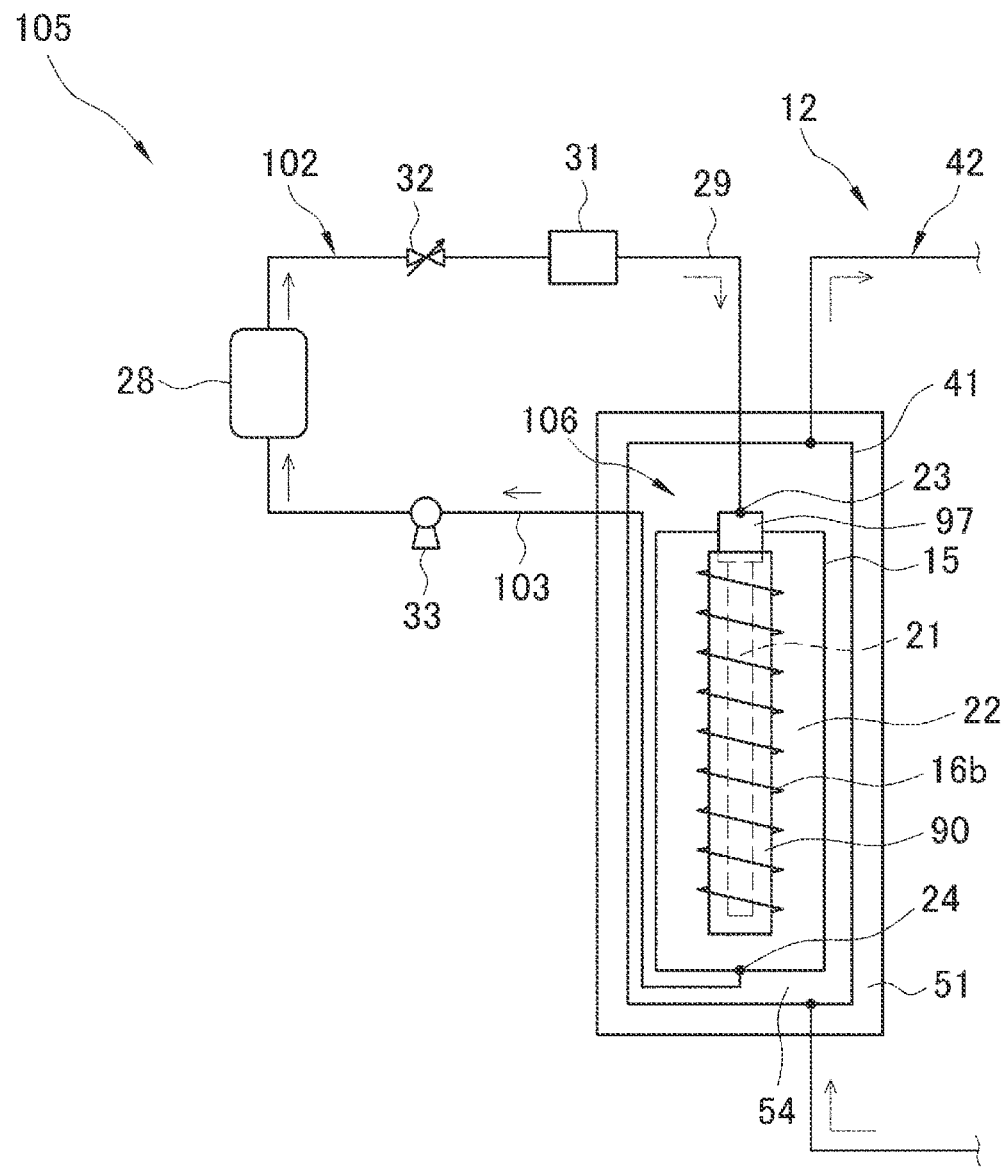
FIG. 15 is a schematic diagram showing a heat utilization system according to Modification 6.

As shown in FIG. 15, a heat utilization system 105 includes a heat generating device 106 and the heat utilization device 12. The heat generating device 106 is different from the heat generating device 101 according to Modification 5 in that the heat generating device 106 includes the heat-generating element 90 instead of the heat-generating element 14.

Similar to the heat utilization system 100 according to Modification 5, not only the heat of the heat-generating element 90 is transferred to the heat medium, but also the heat of the hydrogen-based gas heated by permeating through the heat-generating element 90 is transferred to the heat medium, so that the heat utilization system 105 is excellent in energy efficiency.

[Modification 7]

Figure 16:
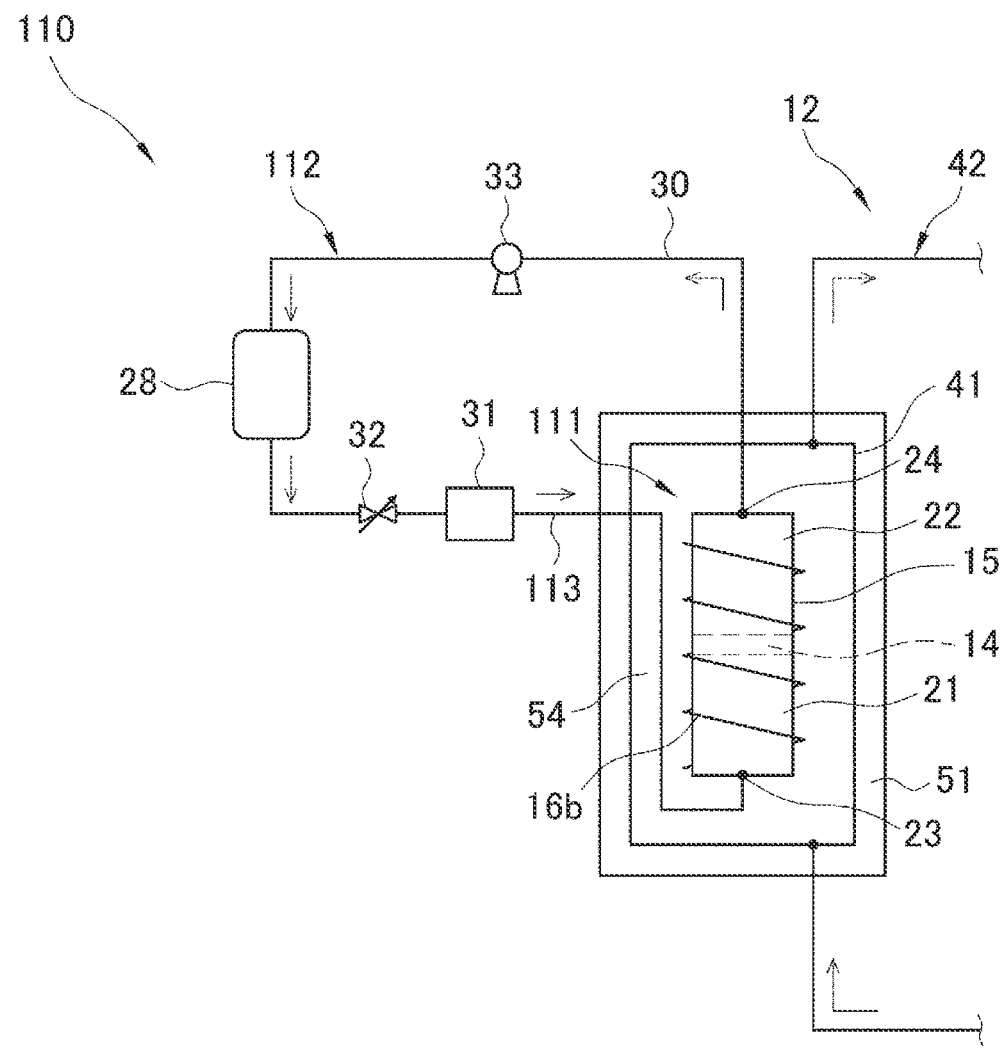
FIG. 16 is a schematic diagram showing a heat utilization system according to Modification 7.

As shown in FIG. 16, a heat utilization system 110 includes a heat generating device 111 and the heat utilization device 12. The heat generating device 111 is different from the heat generating device 11 according to the above-described embodiment in that the heat generating device 111 includes a hydrogen circulation line 112 instead of the hydrogen circulation line 17.

The hydrogen circulation line 112 includes the buffer tank 28, an introduction line 113, the recovery line 30, and the filter 31. The introduction line 113 connects the buffer tank 28 and the introduction port 23 of the first chamber 21, and introduces the hydrogen-based gas stored in the buffer tank 28 to the first chamber 21. The introduction line 113 includes the pressure adjustment valve 32.

The introduction line 113 passes through the gap 54 between the inner surface of the accommodation container 41 and the outer surface of the sealed container 15. Specifically, the introduction line 113 has, in the gap 54, a portion extending in a direction parallel to the longitudinal direction of the sealed container 15. Apart of the introduction line 113 provided in the gap 54 is provided in the heat medium heated by the heat of the heat-generating element 14. The hydrogen-based gas sent from the buffer tank 28 is heated by the heat medium when flowing through the part of the introduction line 113 provided in the heat medium. Therefore, a pre-heated hydrogen-based gas is introduced into the first chamber 21. That is, the introduction line 113 introduces, into the first chamber 21, the hydrogen-based gas that is pre-heated by the heat medium circulating through the gap 54.

As described above, the hydrogen-based gas is pre-heated in the heat utilization system 110, so that a temperature change of the heat-generating element 14 is prevented, and the temperature of the heat-generating element 14 is maintained more reliably.

[Modification 8]

Figure 17:
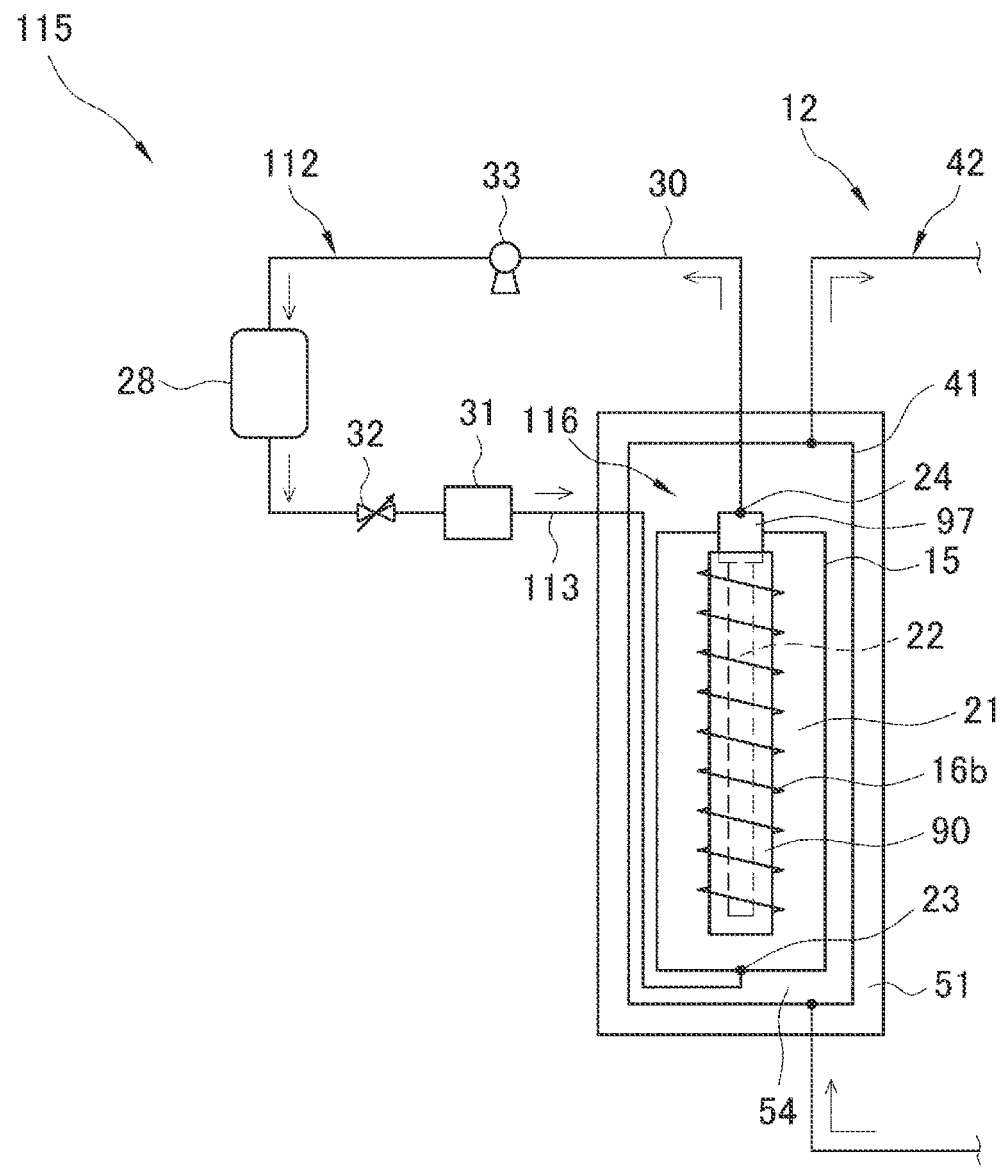
FIG. 17 is a schematic diagram showing a heat utilization system according to Modification 8.

As shown in FIG. 17, a heat utilization system 115 includes a heat generating device 116 and the heat utilization device 12. The heat generating device 116 is different from the heat generating device 111 according to Modification 7 in that the heat generating device 116 includes the heat-generating element 90 instead of the heat-generating element 14.

Similar to the heat utilization system 110 according to Modification 7, the hydrogen-based gas is pre-heated in the heat utilization system 115, so that a temperature change of the heat-generating element 90 is prevented, and the temperature of the heat-generating element 90 can be maintained more reliably.

[Modification 9]

Figure 18:
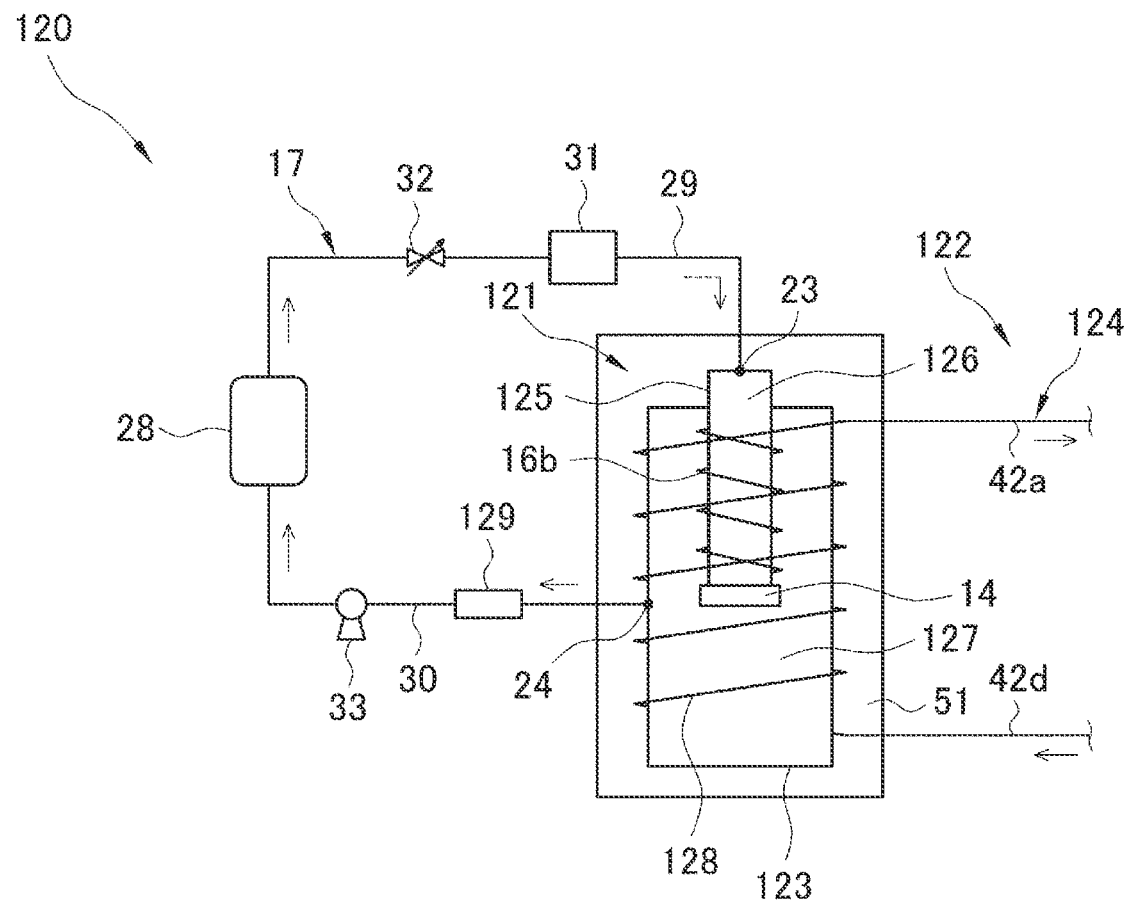
FIG. 18 is a schematic diagram showing a heat utilization system according to Modification 9.

As shown in FIG. 18, a heat utilization system 120 includes a heat generating device 121 and a heat utilization device 122. The heat generating device 121 is different from the heat generating device 11 according to the above-described embodiment in that the heat generating device 121 includes a sealed container 123 instead of the sealed container 15. The heat utilization device 122 is different from the heat utilization device 12 according to the above-described embodiment in that the heat utilization device 122 does not include the accommodation container 41 and includes a heat medium circulation unit 124 instead of the heat medium circulation unit 42.

The sealed container 123 is a hollow container, and accommodates the heat-generating element 14 therein. The sealed container 123 is covered with the heat insulation member 51. A mounting pipe 125 for mounting the heat-generating element 14 is provided in the sealed container 123.

The mounting pipe 125 is made of, for example, stainless steel. The mounting pipe 125 passes through the sealed container 123. One end of the mounting pipe 125 is provided outside the sealed container 123, and the other end of the mounting pipe 125 is provided inside the sealed container 123. In this example, one end of the mounting pipe 125 is provided inside the heat insulation member 51. The one end of the mounting pipe 125 is connected with the introduction line 29 of the hydrogen circulation line 17. The other end of the mounting pipe 125 is provided with the heat-generating element 14. The heater 16b of the temperature adjustment unit (not shown) is wound around an outer periphery of the mounting pipe 125.

The sealed container 123 has a first chamber 126 and a second chamber 127 partitioned by the mounting pipe 125 and the heat-generating element 14. The first chamber 126 is formed by the front surface of the heat-generating element 14 and an inner surface of the mounting pipe 125. The first chamber 126 has the introduction port 23 connected with the introduction line 29. The second chamber 127 is formed by an inner surface of the sealed container 123, the back surface of the heat-generating element 14, and an outer surface of the mounting pipe 125. The second chamber 127 has the recovery port 24 connected with the recovery line 30. In FIG. 18, the recovery port 24 is provided at a substantially central position of the sealed container 123 in a longitudinal direction thereof. The first chamber 126 is pressurized by introducing the hydrogen-based gas. The second chamber 127 is depressurized by exhausting the hydrogen-based gas. Accordingly, a hydrogen pressure in the first chamber 126 is higher than a hydrogen pressure in the second chamber 127. The first chamber 126 and the second chamber 127 have different hydrogen pressures. Therefore, the sealed container 123 is in a state in which a pressure difference is generated between two sides of the heat-generating element 14.

The heat medium circulation unit 124 includes a fifth pipe 128 that connects the first pipe 42a and the fourth pipe 42d. Although not shown in FIG. 18, the heat medium circulation unit 124 includes the second pipe 42b, the third pipe 42c, the pump 42e, and the heat medium flow rate control unit 42f, similar to the heat medium circulation unit 42. The heat medium circulation unit 124 functions as a heat medium circulation line by connecting the first pipe 42a and the fourth pipe 42d via the fifth pipe 128.

The fifth pipe 128 is a heat transfer pipe provided along an outer periphery of the sealed container 123. A heat medium circulating through the fifth pipe 128 is heated by the heat of the heat-generating element 14 provided inside the sealed container 123. That is, the heat medium circulation unit 124 serving as a heat medium circulation line heats the heat medium circulating through the fifth pipe 128 by exchanging heat with the heat-generating element 14.

The heat utilization device 122 includes a first heat exchanger 129 provided on the recovery line 30. The first heat exchanger 129 exchanges heat with the hydrogen-based gas that is heated by the heat of the heat-generating element 14 and circulates through the recovery line 30. The first heat exchanger 129 is formed by, for example, a pipe through which water circulates, and exchanges heat between water and the hydrogen-based gas. Water circulating through the pipe is heated by the heat of the hydrogen-based gas circulating through the recovery line 30, becomes warm water or steam, and is utilized for various purposes such as heating. That is, the hydrogen-based gas that has permeated through the heat-generating element 14 functions as the heat medium heated by the heat-generating element 14, and is utilized as a heat source for obtaining heat energy. The heat utilization device 122 may include the thermoelectric converter 47 instead of the first heat exchanger 129 so as to convert the heat of the hydrogen-based gas circulating through the recovery line 30 into electric power.

As described above, the heat utilization system 120 includes the fifth pipe 128 serving as a heat transfer pipe provided along the outer periphery of the sealed container 123, so that the heat of the heat-generating element 14 is transferred to the heat medium circulating through the fifth pipe 128. Therefore, the heat utilization system 120 has the same effects as the heat utilization system 10 according to the above-described embodiment.

The heat utilization system 120 includes the first heat exchanger 129, so that the hydrogen-based gas heated by the heat of the heat-generating element 14 is utilized as a heat source in addition to the heat medium that is utilized as a heat source. Therefore, the heat utilization system 120 is excellent in energy efficiency.

[Modification 10]

Figure 19:
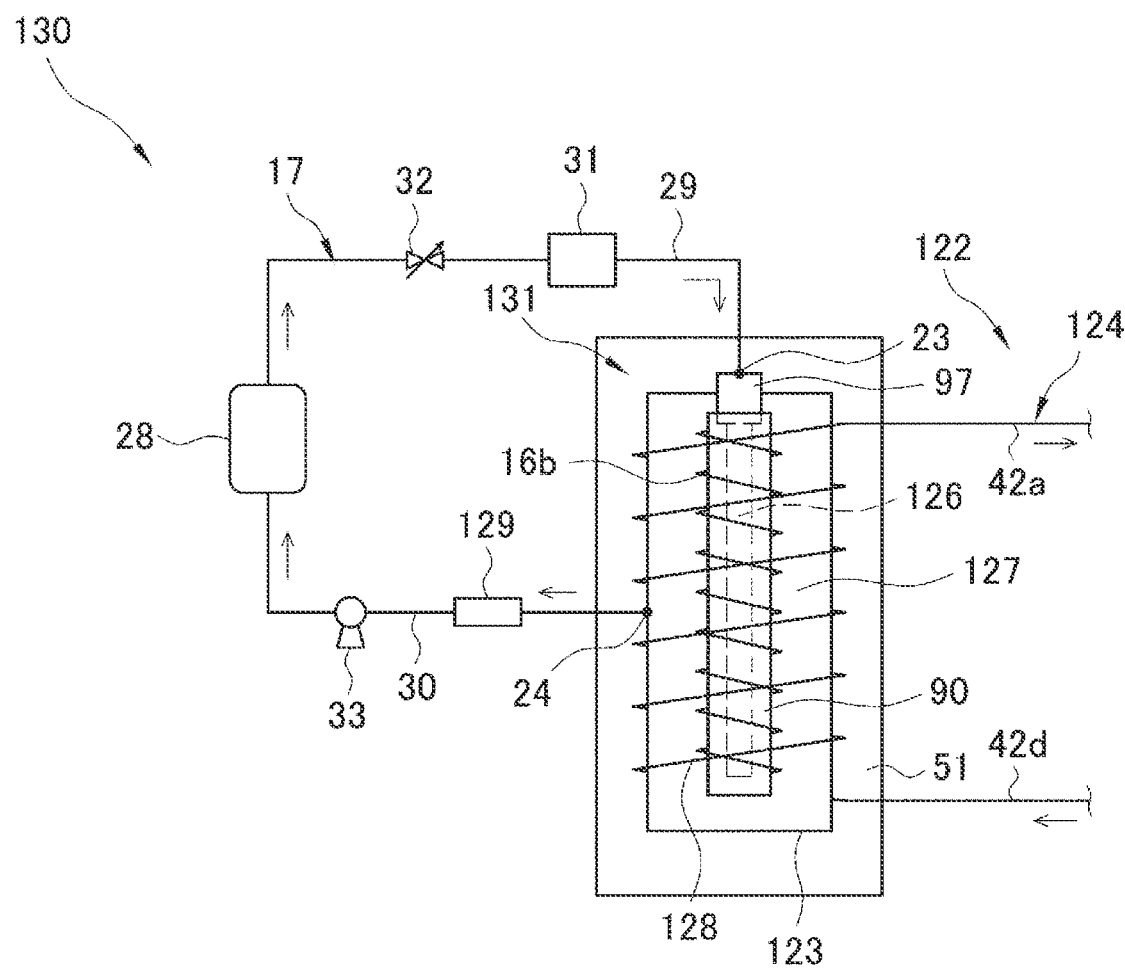
FIG. 19 is a schematic diagram showing a heat utilization system according to Modification 10.

As shown in FIG. 19, a heat utilization system 130 includes a heat generating device 131 and the heat utilization device 122. The heat generating device 131 is different from the heat generating device 121 according to Modification 9 in that the heat generating device 131 includes the heat-generating element 90 instead of the heat-generating element 14.

The heat utilization system 130 includes the fifth pipe 128 serving as a heat transfer pipe provided along the outer periphery of the sealed container 123, so that the heat of the heat-generating element 90 is transferred to the heat medium circulating through the fifth pipe 128. Therefore, the heat utilization system 130 has the same effects as the heat utilization system 10 according to the above-described embodiment.

The heat utilization system 130 includes the first heat exchanger 129, so that the hydrogen-based gas heated by the heat of the heat-generating element 90 is utilized as a heat source in addition to the heat medium that is utilized as a heat source. Therefore, the heat utilization system 130 is excellent in energy efficiency.

[Modification 11]

Figure 20:
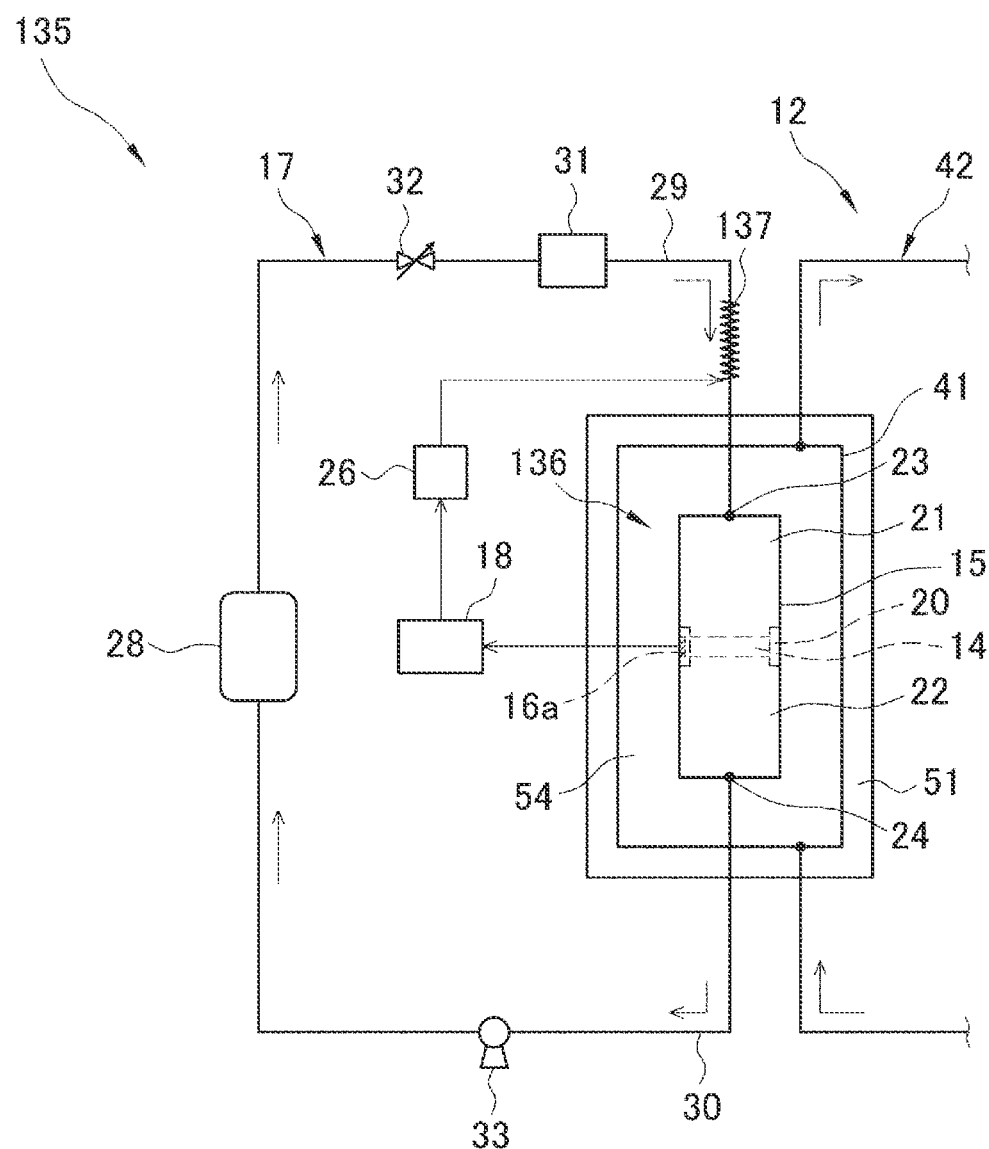
FIG. 20 is a schematic diagram showing a heat utilization system according to Modification 11.

As shown in FIG. 20, a heat utilization system 135 includes a heat generating device 136 and the heat utilization device 12. The heat generating device 136 is different from the heat generating device 11 according to the above-described embodiment in an arrangement of a heater 137 of the temperature adjustment unit (not shown). The temperature adjustment unit (not shown) includes the temperature sensor 16a, the heater 137, and the control unit 18 serving as an output control unit.

The heater 137 is provided on the introduction line 29, and heats the heat-generating element 14 by heating the hydrogen-based gas circulating through the introduction line 29. The heater 137 is electrically connected with the power supply 26, and generates heat by inputting electric power from the power supply 26. Input electric power of the power supply 26 is controlled by the control unit 18. The control unit 18 adjusts input electric power to the heater 137 based on the temperature detected by the temperature sensor 16a, thereby maintaining the heat-generating element 14 at an appropriate temperature for heat generation.

The heat utilization system 135 includes the heater 137 provided in the introduction line 29, so that the heat-generating element 14 can be heated by the heated hydrogen-based gas, and the heat-generating element 14 can be maintained at an appropriate temperature for heat generation. Therefore, the heat utilization system 135 has the same effects as the heat utilization system 10 according to the above-described embodiment.

[Modification 12]

Figure 21:
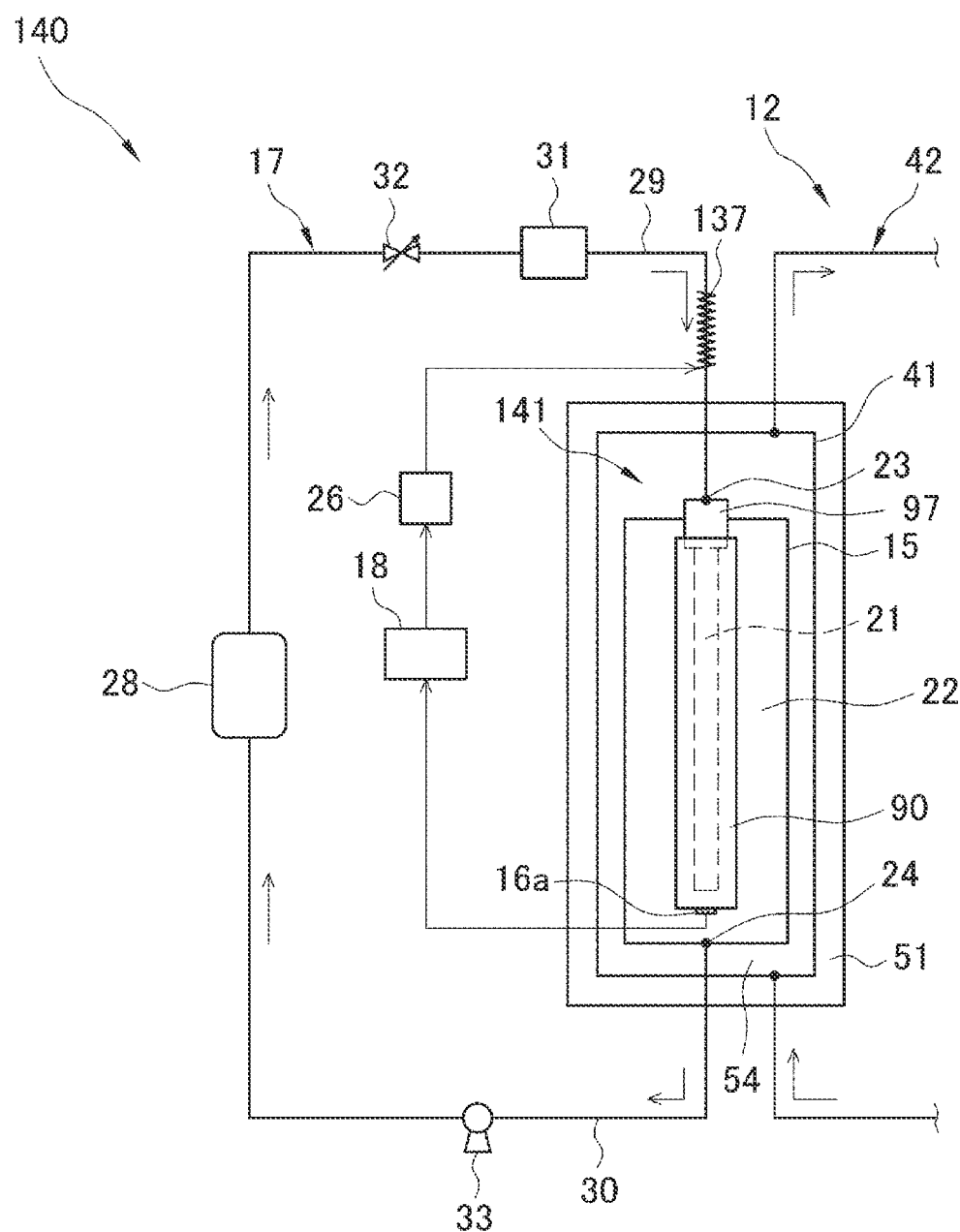
FIG. 21 is a schematic diagram showing a heat utilization system according to Modification 12.

As shown in FIG. 21, a heat utilization system 140 includes a heat generating device 141 and the heat utilization device 12. The heat generating device 141 is different from the heat generating device 136 according to Modification 11 in that the heat generating device 141 includes the heat-generating element 90 instead of the heat-generating element 14. The temperature sensor 16a is provided, for example, on an outer surface of the heat-generating element 90. Although the temperature sensor 16a is provided at the other end of the heat-generating element 90 in FIG. 21, the temperature sensor 16a may be provided at one end of the heat-generating element 90, or may be appropriately provided between the one end and the other end of the heat-generating element 90.

The heat utilization system 140 includes the heater 137 provided in the introduction line 29, so that the heat-generating element 90 can be heated by the heated hydrogen-based gas, and the heat-generating element 90 can be maintained at an appropriate temperature for heat generation. Therefore, the heat utilization system 140 has the same effects as the heat utilization system 10 according to the above-described embodiment.

[Modification 13]

Figure 22:
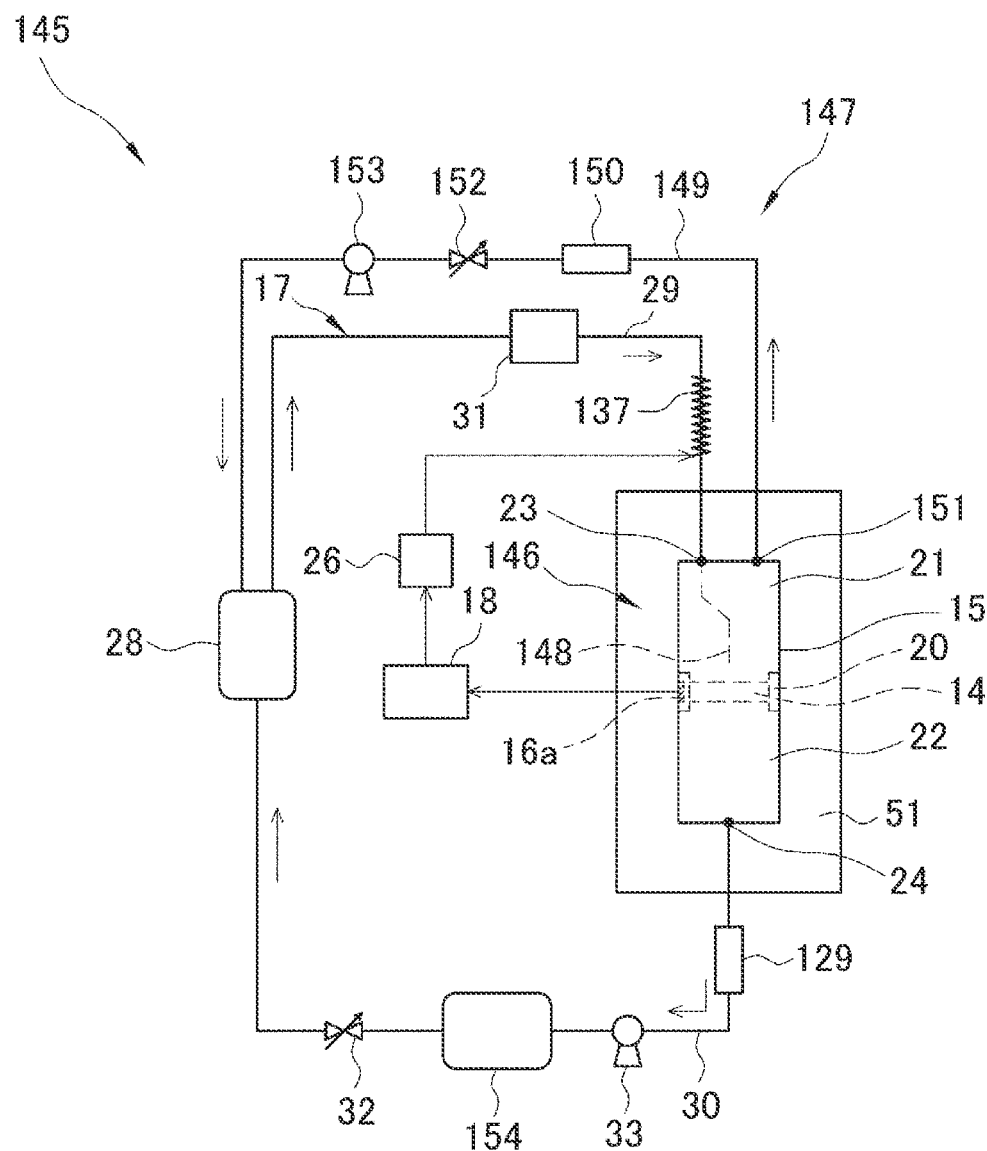
FIG. 22 is a schematic diagram showing a heat utilization system according to Modification 13.

As shown in FIG. 22, a heat utilization system 145 includes a heat generating device 146 and a heat utilization device 147. In the heat generating device 146, the heater 137 is provided in the introduction line 29, and a nozzle portion 148 is provided inside the sealed container 15.

The nozzle portion 148 is provided between the introduction port 23 and the heat-generating element 14. The nozzle portion 148 is connected with the introduction line 29 via the introduction port 23. The nozzle portion 148 ejects, from an ejection port provided at a nozzle tip end, a hydrogen-based gas that circulates through the introduction line 29 and from which impurities are removed by the filter 31. A distance between the nozzle tip end and the front surface of the heat-generating element 14 is, for example, 1 to 2 cm. A direction of the nozzle tip end is perpendicular to the front surface of the heat-generating element 14. Accordingly, the nozzle portion 148 ejects the hydrogen-based gas over the entire front surface that is one surface of the heat-generating element 14. The distance between the nozzle tip end and the front surface of the heat-generating element 14 or the direction of the nozzle tip end is preferably a distance or a direction in which the hydrogen-based gas discharged from the nozzle tip end is blown onto the entire front surface of the heat-generating element 14.

The heat utilization device 147 includes the first heat exchanger 129, a non-permeated gas recovery line 149, and a second heat exchanger 150. A description for the first heat exchanger 129 will be omitted, and the non-permeated gas recovery line 149 and the second heat exchanger 150 will be described.

The non-permeated gas recovery line 149 is connected with a non-permeated gas recovery port 151 provided in the first chamber 21, and recovers a non-permeated gas that has not permeated through the heat-generating element 14 among the hydrogen-based gas introduced into the first chamber 21. The non-permeated gas recovery line 149 is connected with the buffer tank 28, and returns the recovered non-permeated gas to the buffer tank 28. The non-permeated gas recovery port 151 is provided side by side with the introduction port 23.

The hydrogen-based gas introduced into the first chamber 21 is heated by the heat of the heat-generating element 14. Apart of the heated hydrogen-based gas permeates through the heat-generating element 14 and is recovered in the recovery line 30. The hydrogen-based gas recovered in the recovery line 30 exchanges heat with the first heat exchanger 129, and is returned to the buffer tank 28 via a buffer tank 154 and the pressure adjustment valve 32.

Among the hydrogen-based gas that is introduced into the first chamber 21 and is heated by the heat of the heat-generating element 14, a remaining part of the hydrogen-based gas that has not permeated through the heat-generating element 14 is recovered in the non-permeated gas recovery line 149 as a non-permeated gas. The non-permeated gas circulates through the non-permeated gas recovery line 149 and returned to the buffer tank 28, circulates through the introduction line 29 and is re-introduced into the first chamber 21 as the hydrogen-based gas. That is, the non-permeated gas recovery line 149 connects the first chamber 21 and the introduction line 29, recovers the non-permeated gas that has not permeated through the heat-generating element 14 among the hydrogen-based gas introduced from the introduction line 29 to the first chamber 21, and returns the non-permeated gas to the introduction line 29.

The non-permeated gas recovery line 149 includes a non-permeated gas flow rate control unit 152 and a circulation pump 153. The non-permeated gas flow rate control unit 152 includes, for example, a variable leak valve as an adjustment valve. The non-permeated gas flow rate control unit 152 controls a flow rate of the non-permeated gas based on the temperature detected by the temperature sensor 16a. For example, when the temperature of the heat-generating element 14 detected by the temperature sensor 16a is higher than an upper limit temperature of the appropriate temperature range for heat generation of the heat-generating element 14, the non-permeated gas flow rate control unit 152 increases a circulation flow rate of the non-permeated gas. When the temperature of the heat-generating element 14 detected by the temperature sensor 16a is lower than a lower limit temperature of the appropriate temperature range for heat generation of the heat-generating element 14, the non-permeated gas flow rate control unit 152 reduces a flow rate of the non-permeated gas. In this manner, the non-permeated gas flow rate control unit 152 maintains the heat-generating element 14 at an appropriate temperature for heat generation by increasing or reducing the circulation flow rate of the non-permeated gas.

The circulation pump 153 recovers the non-permeated gas in the first chamber 21 from the non-permeated gas recovery port 151 and sends the non-permeated gas to the buffer tank 28. Examples of the circulation pump 153 include a metal bellows pump. The circulation pump 153 is electrically connected with the control unit 18.

The second heat exchanger 150 is provided on the non-permeated gas recovery line 149 and exchanges heat with the non-permeated gas heated by the heat of the heat-generating element 14. Similar to, for example, the first heat exchanger 129, the second heat exchanger 150 is formed by a pipe through which water circulates, and exchanges heat between water and the hydrogen-based gas. Water circulating through the pipe is heated by the heat of the non-permeated gas circulating through the non-permeated gas recovery line 149, becomes warm water or steam, and is utilized for various purposes such as heating. That is, the non-permeated gas that has not permeated the heat-generating element 14 functions as a heat medium to be heated by the heat-generating element 14, and is utilized as a heat source for obtaining heat energy. The thermoelectric converter 47 may be provided instead of the second heat exchanger 150 to convert the heat of the hydrogen-based gas into electric power.

The heat utilization system 145 includes the non-permeated gas recovery line 149, so that the non-permeated gas heated by the heat of the heat-generating element 14 is utilized as a heat source. Therefore, the heat utilization system 145 has the same effects as the heat utilization system 10 according to the above-described embodiment. In particular, the heat utilization system 145 includes the first heat exchanger 129 and the second heat exchanger 150, so that the hydrogen-based gas that has permeated through the heat-generating element 14 and the non-permeated gas that has not permeated through the heat-generating element 14 are utilized as heat sources. Therefore, the heat utilization system 145 is excellent in energy efficiency.

The heat utilization system 145 includes the nozzle portion 148, so that the hydrogen-based gas after the impurities are removed is directly blown onto the front surface of the heat-generating element 14. Accordingly, impurities on the surface and a periphery of the heat-generating element 14 are blown away and the front surface of the heat-generating element 14 is provided under an atmosphere including a fresh hydrogen-based gas from which impurities are removed by the filter 31 in the heat utilization system 145. Therefore, a high output of excess heat can be achieved.

[Modification 14]

Figure 23:
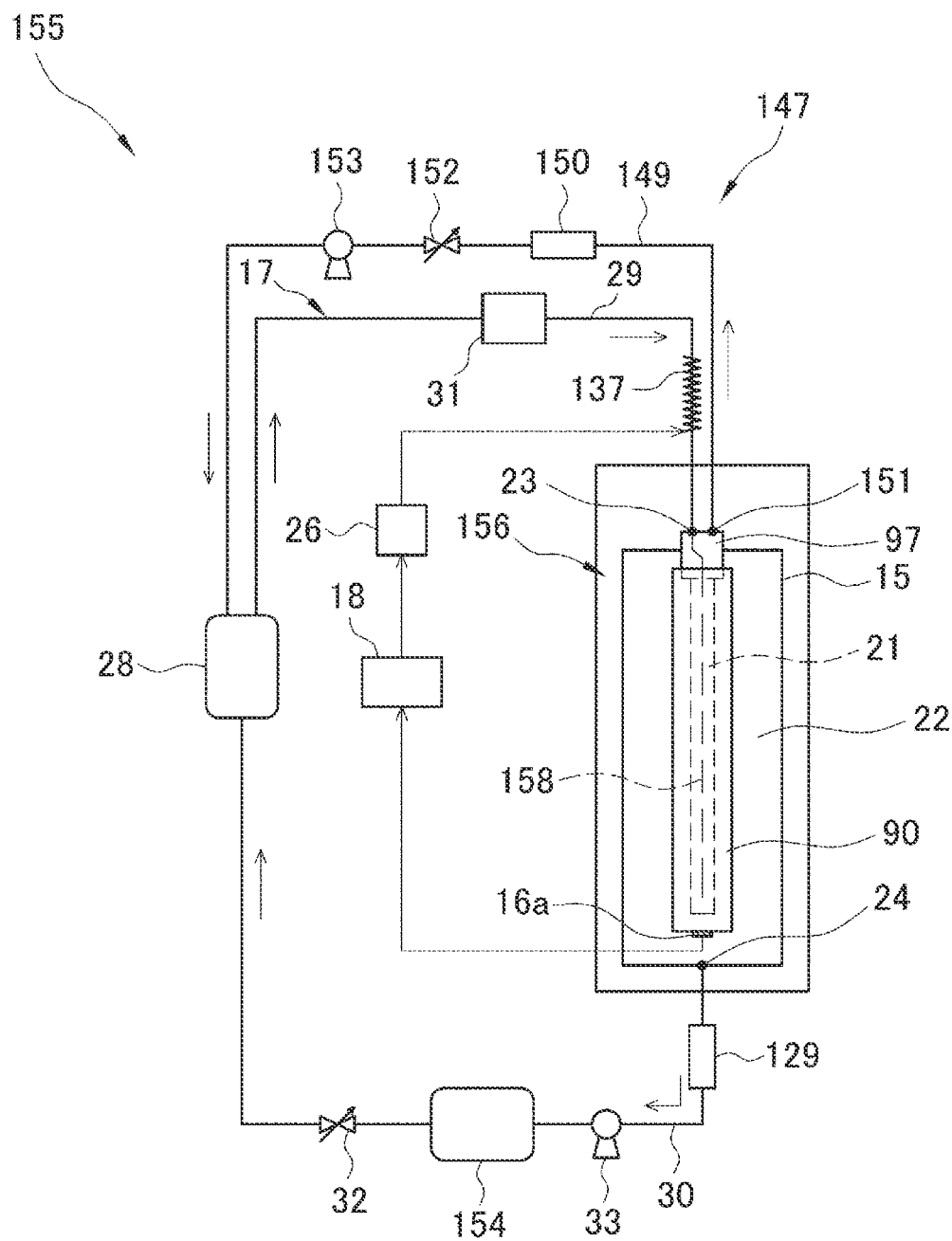
FIG. 23 is a schematic diagram showing a heat utilization system according to Modification 14.

As shown in FIG. 23, a heat utilization system 155 includes a heat generating device 156 and the heat utilization device 147. The heat generating device 156 includes the heat-generating element 90 instead of the heat-generating element 14, and the nozzle portion 158 is provided inside the sealed container 15. In this modification, the introduction port 23 and the non-permeated gas recovery port 151 are provided side by side on the mounting pipe 97.

The nozzle portion 158 is provided between the introduction port 23 and the heat-generating element 90. One end of the nozzle portion 158 is connected with the introduction port 23, and the other end of the nozzle portion 158 extends up to the other end of the heat-generating element 90. The nozzle portion 158 is connected with the introduction line 29 via the introduction port 23.

Figure 24:
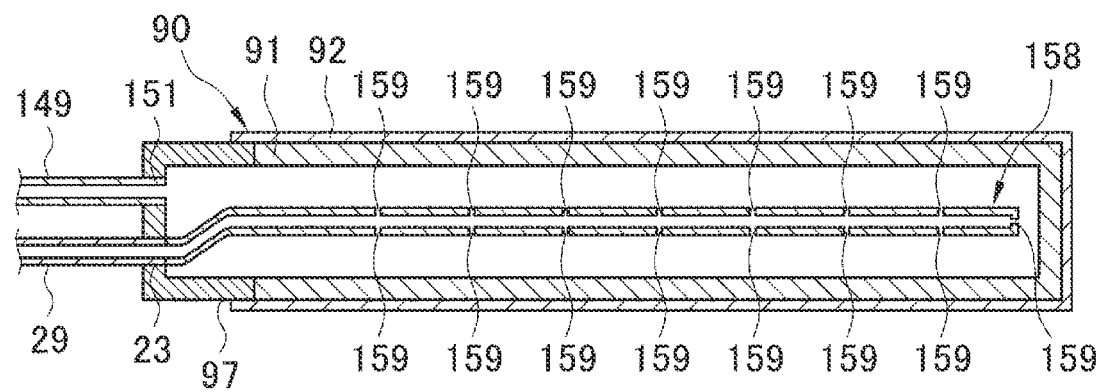
FIG. 24 is a diagram showing a nozzle portion having a plurality of ejection ports.

As shown in FIG. 24, the nozzle portion 158 has a plurality of ejection ports 159 arranged in an axial direction of the heat-generating element 90. The nozzle portion 158 ejects the hydrogen-based gas from the plurality of ejection ports 159 to the entire inner surface of the heat-generating element 90. The plurality of ejection ports 159 are preferably arranged at equal intervals. The hydrogen-based gas is uniformly ejected onto the entire inner surface of the heat-generating element 90 by arranging the plurality of ejection ports 159 at equal intervals. The number and a diameter of the ejection ports 159 may be changed as appropriate.

The heat utilization system 155 includes the non-permeated gas recovery line 149, so that the non-permeated gas heated by the heat of the heat-generating element 90 is utilized as a heat source. Therefore, the heat utilization system 155 has the same effects as the heat utilization system 10 according to the above-described embodiment. In particular, the heat utilization system 155 includes the first heat exchanger 129 and the second heat exchanger 150, so that the hydrogen-based gas that has permeated through the heat-generating element 90 and the non-permeated gas that has not permeated through the heat-generating element 90 are utilized as heat sources. Therefore, the heat utilization system 155 is excellent in energy efficiency.

The heat utilization system 155 includes the nozzle portion 158, so that impurities on the inner surface and a periphery of the heat-generating element 90 are blown away, and the inside of the heat-generating element 90 is in an atmosphere including a fresh hydrogen-based gas from which impurities are removed by the filter 31. Therefore, a high output of excess heat can be achieved.

[Modification 15]

Figure 25:
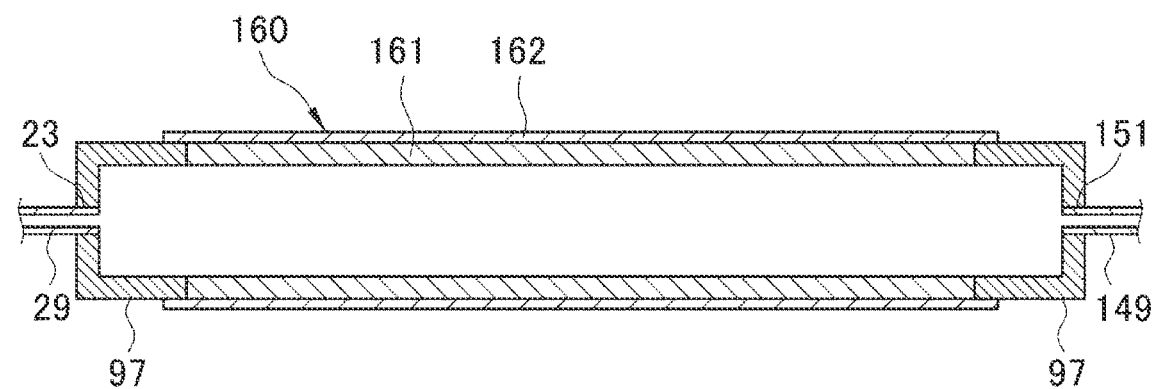
FIG. 25 is a cross-sectional view showing a cylindrical heat-generating element having two open ends.

FIG. 25 is a cross-sectional view showing a cylindrical heat-generating element 160 having two open ends. The heat-generating element 160 includes a support element 161 and a multilayer film 162. The support element 161 is made of at least one of a porous body, a hydrogen permeable film, and a proton conductor. The multilayer film 162 has a first layer (not shown) made of a hydrogen storage metal or a hydrogen storage alloy and having a thickness of less than 1000 nm, and a second layer (not shown) made of a hydrogen storage metal different from that of the first layer, a hydrogen storage alloy different from that of the first layer, or ceramics and having a thickness of less than 1000 nm. Since a method for manufacturing the heat-generating element 160 is the same as the method for manufacturing the heat-generating element 90 except the preparation of the cylindrical support element 161 having two open ends, description of the method for manufacturing the heat-generating element 160 will be omitted. Although the heat-generating element 160 has a cylindrical shape having two open ends in FIG. 25, the heat-generating element 160 may have a polygonal cylindrical shape having two open ends.

Figure 26:
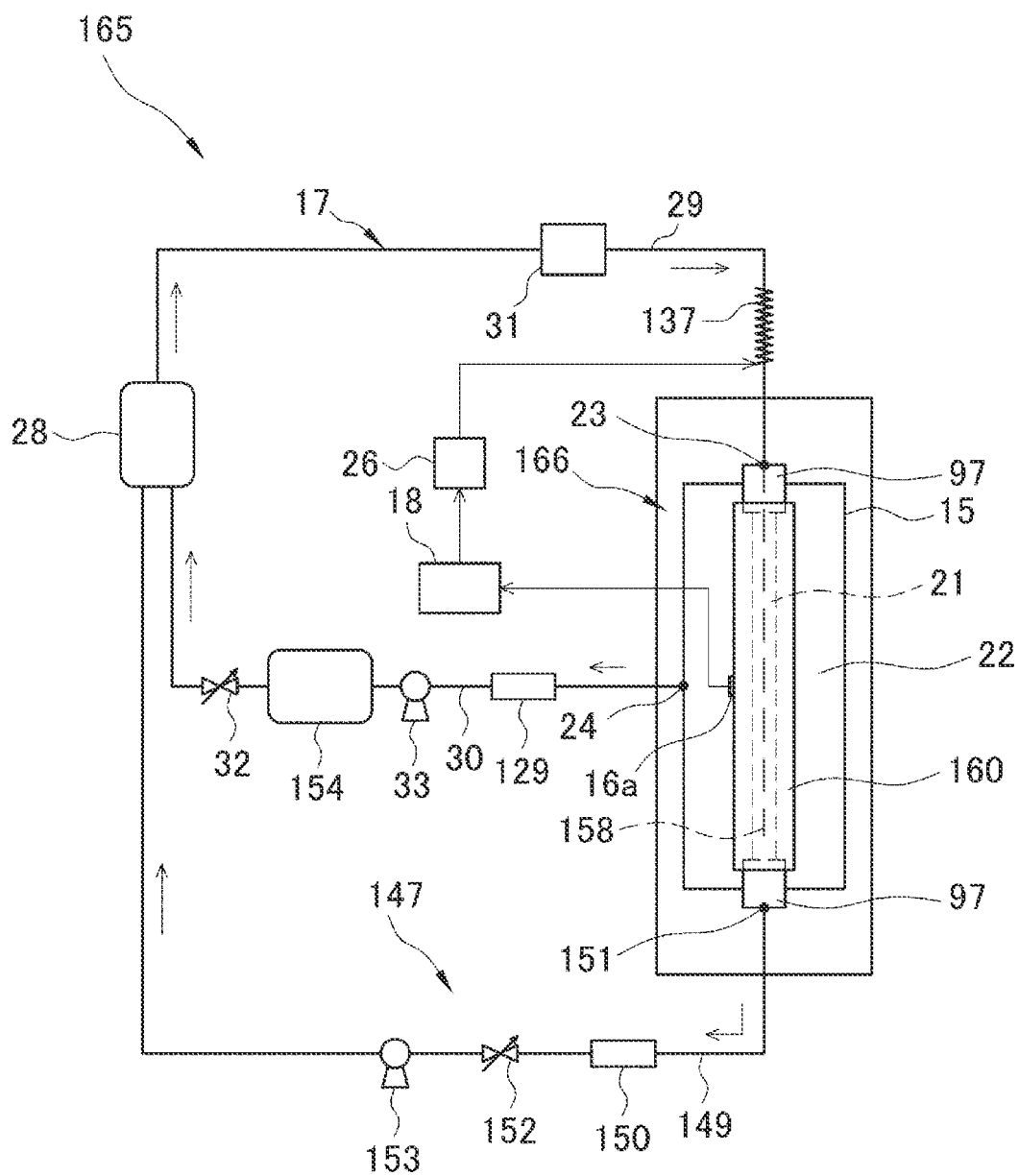
FIG. 26 is a schematic diagram showing a heat utilization system according to Modification 15.

As shown in FIG. 26, a heat utilization system 165 includes a heat generating device 166 and the heat utilization device 147. The heat generating device 166 is different from the heat generating device 156 according to Modification 14 in that the heat generating device 166 includes the heat-generating element 160 instead of the heat-generating element 90.

The mounting pipe 97 is provided at two ends of the heat-generating element 160. The mounting pipe 97 provided at one end of the heat-generating element 160 is connected with the introduction line 29. The mounting pipe 97 provided at the other end of the heat-generating element 160 is connected with the non-permeated gas recovery line 149. That is, the one end of the heat-generating element 160 is connected with the introduction line 29, and the other end thereof is connected with the non-permeated gas recovery line 149. Therefore, the heat utilization system 165 has the same effects as the heat utilization system 155 according to Modification 14.

[Modification 16]

In the above-described embodiment and the above-described modifications, the hydrogen circulation line introduces the hydrogen-based gas into the first chamber and recovers the hydrogen-based gas from the second chamber, thereby generating a hydrogen pressure difference between the first chamber and the second chamber. However, in Modification 16, instead of the hydrogen circulation line, a hydrogen storage metal or a hydrogen storage alloy is used to generate a hydrogen pressure difference between the first chamber and the second chamber by utilizing occluding and discharging of hydrogen.

Figure 27:
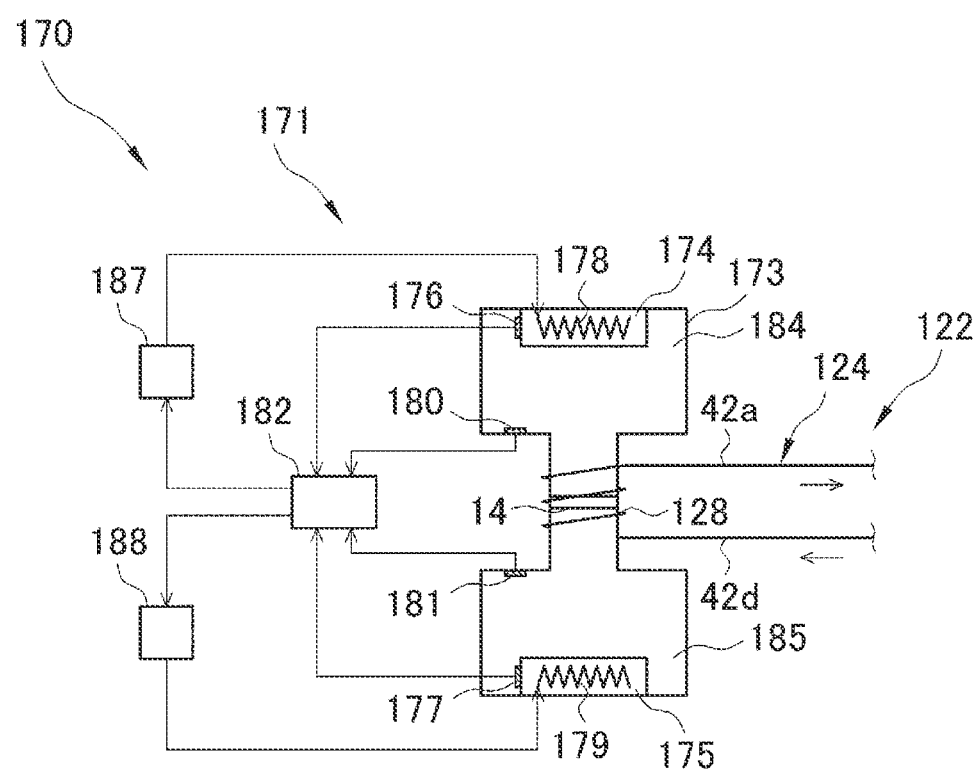
FIG. 27 is a schematic diagram showing a heat utilization system according to Modification 16.

As shown in FIG. 27, a heat utilization system 170 includes a heat generating device 171 and the heat utilization device 122. The heat generating device 171 includes the heat-generating element 14, a sealed container 173, a first hydrogen occluding and discharging unit 174, a second hydrogen occluding and discharging unit 175, a first temperature sensor 176, a second temperature sensor 177, a first heater 178, a second heater 179, a first pressure gauge 180, a second pressure gauge 181, and a hydrogen pressure control unit 182. Description of the heat-generating element 14 will be omitted. The heat utilization system 170 further includes a control unit as an output control unit (not shown). The control unit as the output control unit, the first temperature sensor 176, the second temperature sensor 177, the first heater 178, and the second heater 179 form a temperature adjustment unit (not shown). The temperature adjustment unit adjusts the temperature of the heat-generating element 14 and maintains the heat-generating element 14 at an appropriate temperature for heat generation.

The sealed container 173 has a first chamber 184 and a second chamber 185 partitioned by the heat-generating element 14. The first chamber 184 and the second chamber 185 have different hydrogen pressures by performing switching control by the hydrogen pressure control unit 182 to be described later. The first chamber 184 is formed by the front surface of the heat-generating element 14 and an inner surface of the sealed container 173. The second chamber 185 is formed by the back surface of the heat-generating element 14 and the inner surface of the sealed container 173. Although not shown in FIG. 27, for example, an introduction line for introducing the hydrogen-based gas when the heat utilization system 170 is operated and an exhaust line for exhausting the hydrogen-based gas when the heat utilization system 170 is stopped are connected to the sealed container 173.

The first hydrogen occluding and discharging unit 174 is provided in the first chamber 184. The first hydrogen occluding and discharging unit 174 is made of a hydrogen storage metal or a hydrogen storage alloy. The first hydrogen occluding and discharging unit 174 occludes and discharges hydrogen. Occluding and discharging of hydrogen performed by the first hydrogen occluding and discharging unit 174 are sequentially switched by the hydrogen pressure control unit 182 to be described later.

The second hydrogen occluding and discharging unit 175 is provided in the second chamber 185. The second hydrogen occluding and discharging unit 175 is made of a hydrogen storage metal or a hydrogen storage alloy. The second hydrogen occluding and discharging unit 175 occludes and discharges hydrogen. Occluding and discharging of hydrogen performed by the second hydrogen occluding and discharging unit 175 are sequentially switched by the hydrogen pressure control unit 182 to be described later.

The first temperature sensor 176 is provided in the first hydrogen occluding and discharging unit 174, and detects a temperature of the first hydrogen occluding and discharging unit 174. The second temperature sensor 177 is provided in the second hydrogen occluding and discharging unit 175, and detects a temperature of the second hydrogen occluding and discharging unit 175.

The first heater 178 is provided in the first hydrogen occluding and discharging unit 174, and heats the first hydrogen occluding and discharging unit 174. The first heater 178 is electrically connected with a power supply 187, and generates heat by inputting electric power from the power supply 187. The second heater 179 is provided in the second hydrogen occluding and discharging unit 175, and heats the second hydrogen occluding and discharging unit 175. The second heater 179 is electrically connected with a power supply 188, and generates heat by inputting electric power from the power supply 188.

The first pressure gauge 180 is provided inside the first chamber 184, and detects a hydrogen pressure in the first chamber 184. The second pressure gauge 181 is provided inside the second chamber 185 and detects a hydrogen pressure in the second chamber 185.

The hydrogen pressure control unit 182 is electrically connected with the first temperature sensor 176, the second temperature sensor 177, the first pressure gauge 180, the second pressure gauge 181, the power supply 187, and the power supply 188.

The hydrogen pressure control unit 182 controls the temperature of the first hydrogen occluding and discharging unit 174 based on a temperature detected by the first temperature sensor 176. The hydrogen pressure control unit 182 turns on the power supply 187 and adjusts input electric power to the first heater 178, thereby heating the first hydrogen occluding and discharging unit 174 to a predetermined temperature. The hydrogen pressure control unit 182 turns off the power supply 187, thereby cooling the first hydrogen occluding and discharging unit 174. The first hydrogen occluding and discharging unit 174 may be cooled by using a cooling device (not shown).

The hydrogen pressure control unit 182 controls a temperature of the second hydrogen occluding and discharging unit 175 based on a temperature detected by the second temperature sensor 177. The hydrogen pressure control unit 182 turns on the power supply 188 and adjusts input electric power to the second heater 179, thereby heating the second hydrogen occluding and discharging unit 175 to a predetermined temperature. The hydrogen pressure control unit 182 turns off the power supply 188, thereby cooling the second hydrogen occluding and discharging unit 175. The second hydrogen occluding and discharging unit 175 may be cooled by using a cooling device (not shown).

The hydrogen pressure control unit 182 has a first mode in which the hydrogen pressure in the first chamber 184 is higher than the hydrogen pressure in the second chamber 185, and a second mode in which the hydrogen pressure in the second chamber 185 is higher than the hydrogen pressure in the first chamber 184.

Figure 28:
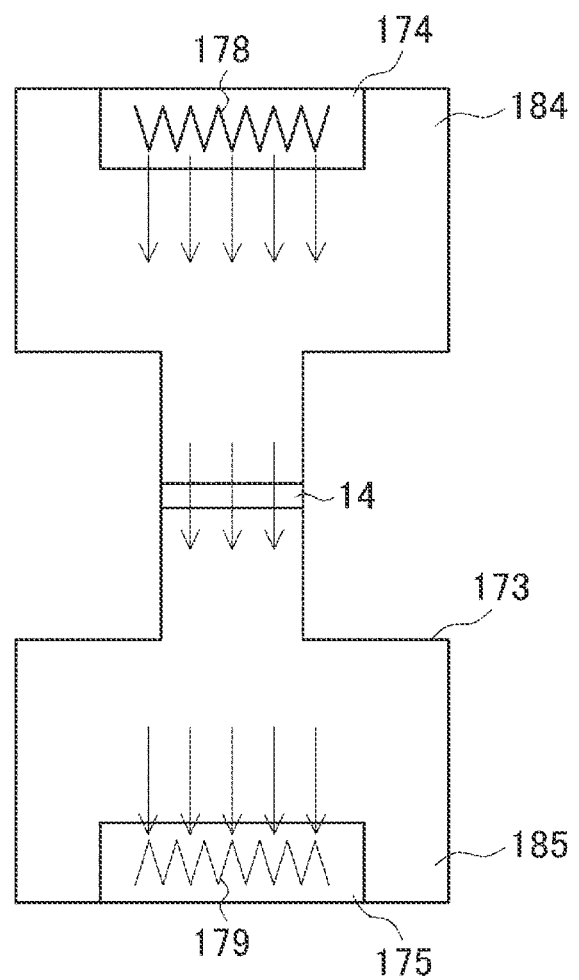
FIG. 28 is a diagram showing a first mode of a hydrogen pressure control unit.

As shown in FIG. 28, in the first mode, the hydrogen pressure control unit 182 heats the first hydrogen occluding and discharging unit 174 by the first heater 178 and cools the second hydrogen occluding and discharging unit 175. The first hydrogen occluding and discharging unit 174 is heated to discharge hydrogen. The first chamber 184 is pressurized by discharging hydrogen from the first hydrogen occluding and discharging unit 174. On the other hand, the second hydrogen occluding and discharging unit 175 is cooled to occlude hydrogen. The second chamber 185 is depressurized by occluding hydrogen to the second hydrogen occluding and discharging unit 175. As a result, the hydrogen pressure in the first chamber 184 is higher than the hydrogen pressure in the second chamber 185. Hydrogen in the first chamber 184 permeates through the heat-generating element 14 and moves to the second chamber 185 due to a hydrogen pressure difference generated between the first chamber 184 and the second chamber 185. The heat-generating element 14 generates excess heat by permeation of hydrogen.

Figure 29:
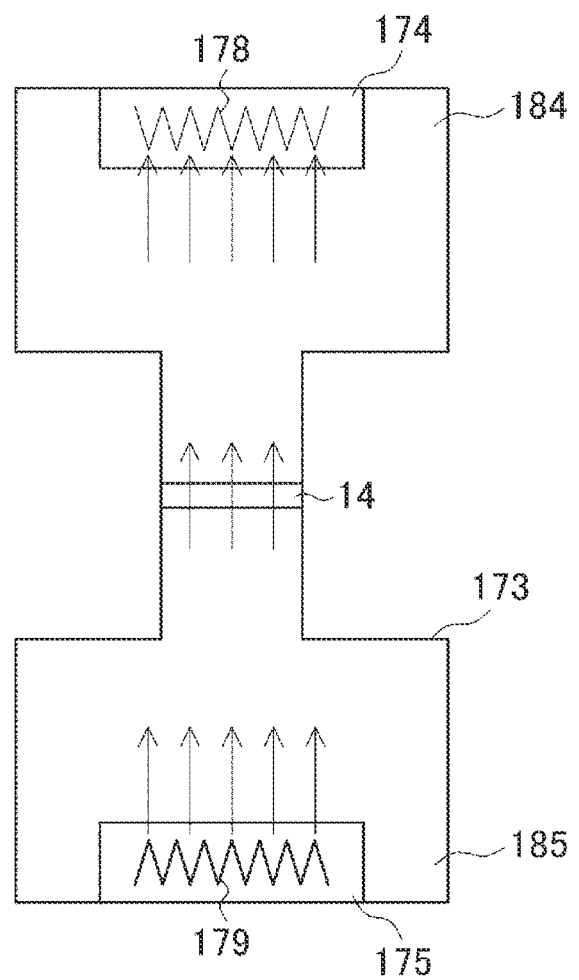
FIG. 29 is a diagram showing a second mode of the hydrogen pressure control unit.

As shown in FIG. 29, in the second mode, the hydrogen pressure control unit 182 cools the first hydrogen occluding and discharging unit 174 and heats the second hydrogen occluding and discharging unit 175 by the second heater 179. The first hydrogen occluding and discharging unit 174 is cooled to occlude hydrogen. The first chamber 184 is depressurized by occluding hydrogen to the first hydrogen occluding and discharging unit 174. On the other hand, the second hydrogen occluding and discharging unit 175 is heated to discharge hydrogen. The second chamber 185 is pressurized by discharging hydrogen from the second hydrogen occluding and discharging unit 175. As a result, the hydrogen pressure in the second chamber 185 is higher than the hydrogen pressure in the first chamber 184. Hydrogen in the second chamber 185 permeates through the heat-generating element 14 and moves to the first chamber 184 due to a hydrogen pressure difference generated between the first chamber 184 and the second chamber 185. The heat-generating element 14 generates excess heat by permeation of hydrogen.

The hydrogen pressure control unit 182 performs switching control to switch between the first mode and the second mode. An example of the switching control will be described. The hydrogen pressure control unit 182 switches from the first mode to the second mode when a pressure detected by the first pressure gauge 180 is equal to or lower than a predetermined threshold in the first mode. The hydrogen pressure control unit 182 switches from the second mode to the first mode when a pressure detected by the second pressure gauge 181 is equal to or lower than a predetermined pressure in the second mode. The hydrogen pressure control unit 182 performs the switching control between the first mode and the second mode, thereby switching directions in which hydrogen permeates through the heat-generating element 14 to intermittently continue the generation of excess heat in the heat-generating element 14. Therefore, the heat utilization system 170 has the same effects as the heat utilization system 10 according to the above-described embodiment. Since in the heat utilization system 170 and the heat generating device 171, a hydrogen pressure difference can be generated between the first chamber and the second chamber without using a hydrogen circulation line, miniaturization of the heat utilization system 170 and the heat generating device 171 can be achieved.

[Modification 17]

Although one heat-generating element is used in the heat utilization systems according to the above-described embodiment and the above-described modifications, a plurality of heat-generating elements may be used.

Figure 30:
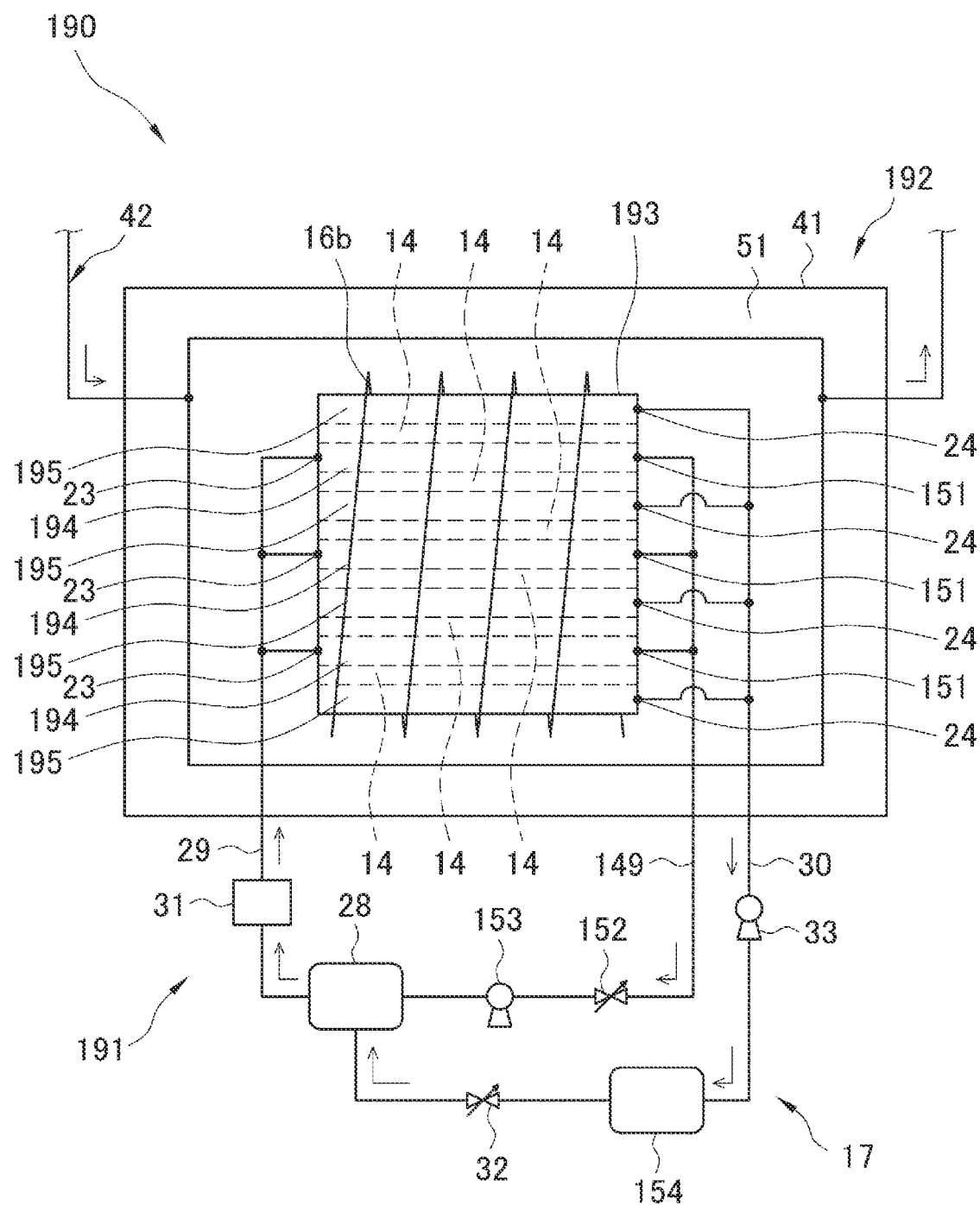
FIG. 30 is a schematic diagram showing a heat utilization system according to Modification 17.

As shown in FIG. 30, a heat utilization system 190 includes a heat generating device 191 and a heat utilization device 192. The heat utilization device 192 includes the accommodation container 41, the heat medium circulation unit 42, and the non-permeated gas recovery line 149.

The heat generating device 191 includes a plurality of heat-generating elements 14, a sealed container 193 that accommodates the plurality of heat-generating elements 14, and the like. The plurality of heat-generating elements 14 are each have a plate shape. The plurality of heat-generating elements 14 are provided with a gap between each other so that surfaces thereof face each other. In this modification, six heat-generating elements 14 are provided inside the sealed container 193 (See FIGS. 30 and 31). The heater 16b of the temperature adjustment unit (not shown) is provided on an outer periphery of the sealed container 193. The heater 16b heats the plurality of heat-generating elements 14 by inputting electric power from a power supply (not shown).

The sealed container 193 is provided with a plurality of introduction ports 23, a plurality of recovery ports 24, and a plurality of non-permeated gas recovery ports 151. The introduction port 23 is provided at a position facing the non-permeated gas recovery port 151. The recovery ports 24 and the non-permeated gas recovery ports 151 are alternately arranged in an arrangement direction of the plurality of heat-generating elements 14. The plurality of introduction ports 23 are connected with the introduction line 29 using, for example, a gas introduction branch pipe (not shown). The plurality of recovery ports 24 are connected with the recovery line 30 using, for example, a gas introduction branch pipe (not shown).

The sealed container 193 has a plurality of first chambers 194 and a plurality of second chambers 195 partitioned by the plurality of heat-generating elements 14. The first chambers 194 and the second chambers 195 are alternately arranged in the arrangement direction of the plurality of heat-generating elements 14. The first chamber 194 has the introduction port 23 and the non-permeated gas recovery port 151. The second chamber 195 has the recovery port 24. The first chamber 194 is pressurized by introducing the hydrogen-based gas. The second chamber 195 is depressurized by recovering the hydrogen-based gas. Accordingly, a hydrogen pressure in the first chamber 194 is higher than a hydrogen pressure in the second chamber 195.

Figure 31:
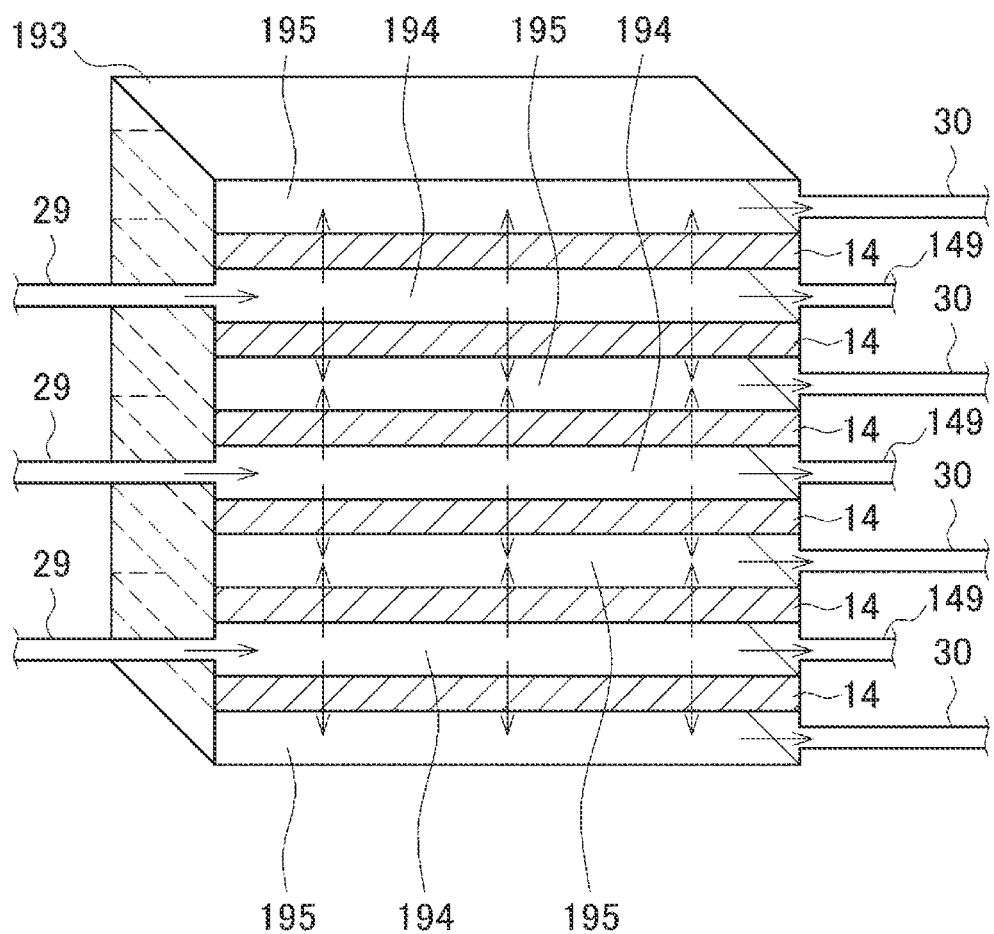
FIG. 31 is a diagram showing a function of a heat generating device according to Modification 17.

As shown in FIG. 31, due to a hydrogen pressure difference generated between the first chamber 194 and the second chamber 195, a part of the hydrogen-based gas introduced into the first chamber 194 permeates through the heat-generating element 14, moves to the second chamber 195, and is recovered in the recovery line 30. On the other hand, a non-permeated gas that has not permeated through the heat-generating element 14 among the hydrogen-based gas introduced into the first chamber 194 is recovered in the non-permeated gas recovery line 149. Each of the heat-generating elements 14 generates excess heat by permeation of the hydrogen-based gas. Therefore, the heat utilization system 190 can increase an output of excess heat by providing the plurality of heat-generating elements 14.

[Modification 18]

In Modification 17, the non-permeated gas that has not permeated through the heat-generating element 14 is recovered in the non-permeated gas recovery line 149 and returned to the introduction line 29 so as to circulate the non-permeated gas. However, in Modification 18, the non-permeated gas is not circulated.

Figure 32:
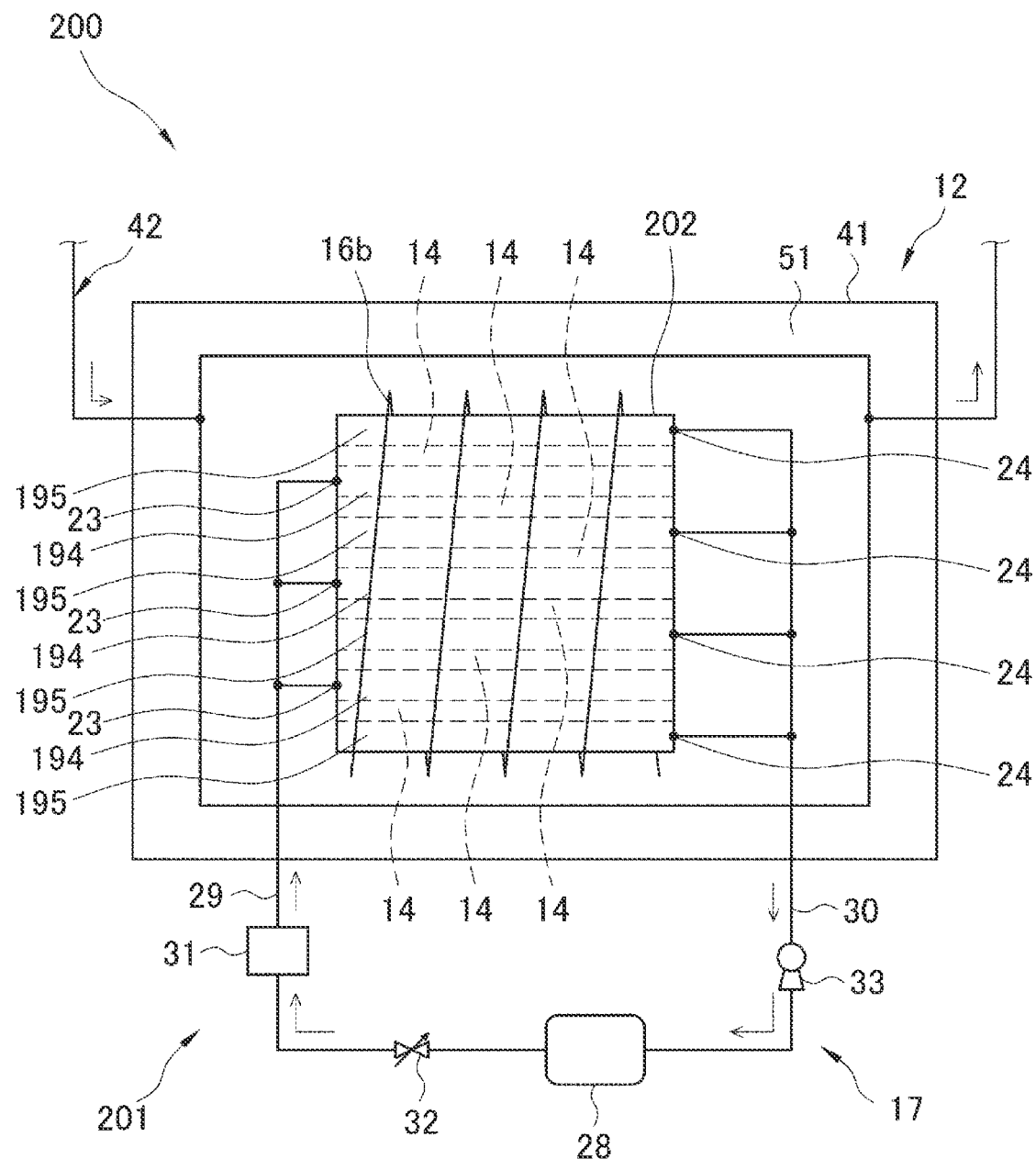
FIG. 32 is a schematic diagram showing a heat utilization system according to Modification 18.

As shown in FIG. 32, a heat utilization system 200 includes a heat generating device 201 and the heat utilization device 12. The heat generating device 201 includes a plurality of heat-generating elements 14 and a sealed container 202 that accommodates the plurality of heat-generating elements 14. The sealed container 202 is different from the sealed container 193 according to Modification 17 in that the sealed container 202 has a plurality of introduction ports 23 and a plurality of recovery ports 24 and does not have the non-permeated gas recovery port 151.

The hydrogen-based gas introduced into the first chamber 194 permeates through the heat-generating element 14, moves to the second chamber 195, and is recovered in the recovery line 30. Each of the heat-generating elements 14 generates excess heat by permeation of the hydrogen-based gas. Therefore, similar to Modification 17, the heat utilization system 200 can increase an output of excess heat by providing the plurality of heat-generating elements 14.

[Modification 19]

Figure 33:
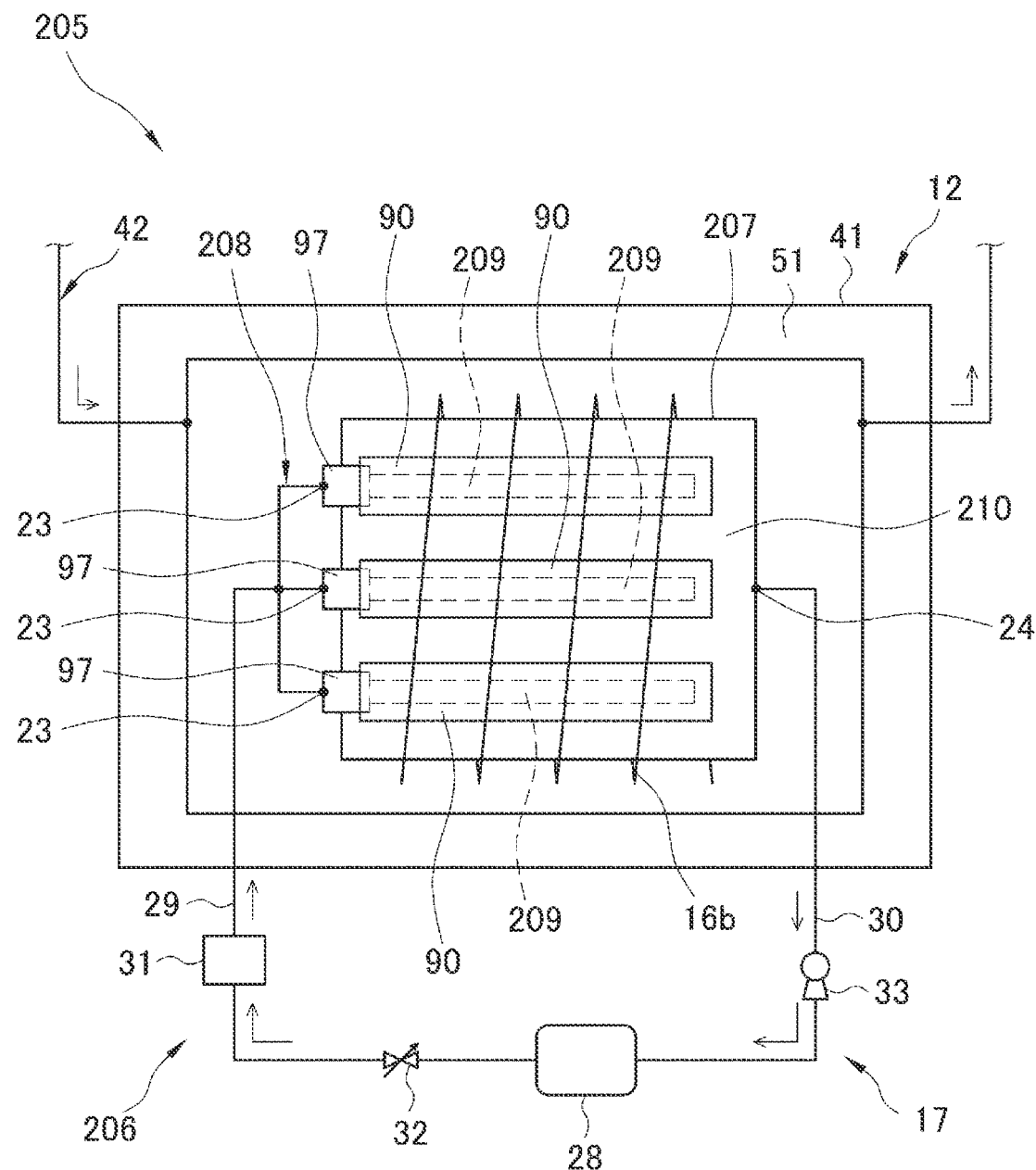
FIG. 33 is a schematic diagram showing a heat utilization system according to Modification 19.

As shown in FIG. 33, a heat utilization system 205 includes a heat generating device 206 and the heat utilization device 12. The heat generating device 206 includes a plurality of heat-generating elements 90 and a sealed container 207 that accommodates the plurality of heat-generating elements 90. In this modification, nine heat-generating elements 90 each having a bottomed cylindrical shape are provided inside the sealed container 207 (See FIG. 34). The heat-generating element 90 is mounted in the sealed container 207 via the mounting pipe 97. The sealed container 207 is provided with a plurality of introduction ports 23 and one recovery port 24. The heater 16b of the temperature adjustment unit (not shown) is provided on an outer periphery of the sealed container 207. The heater 16b heats the plurality of heat-generating elements 90 by inputting electric power from a power supply (not shown).

Figure 34:
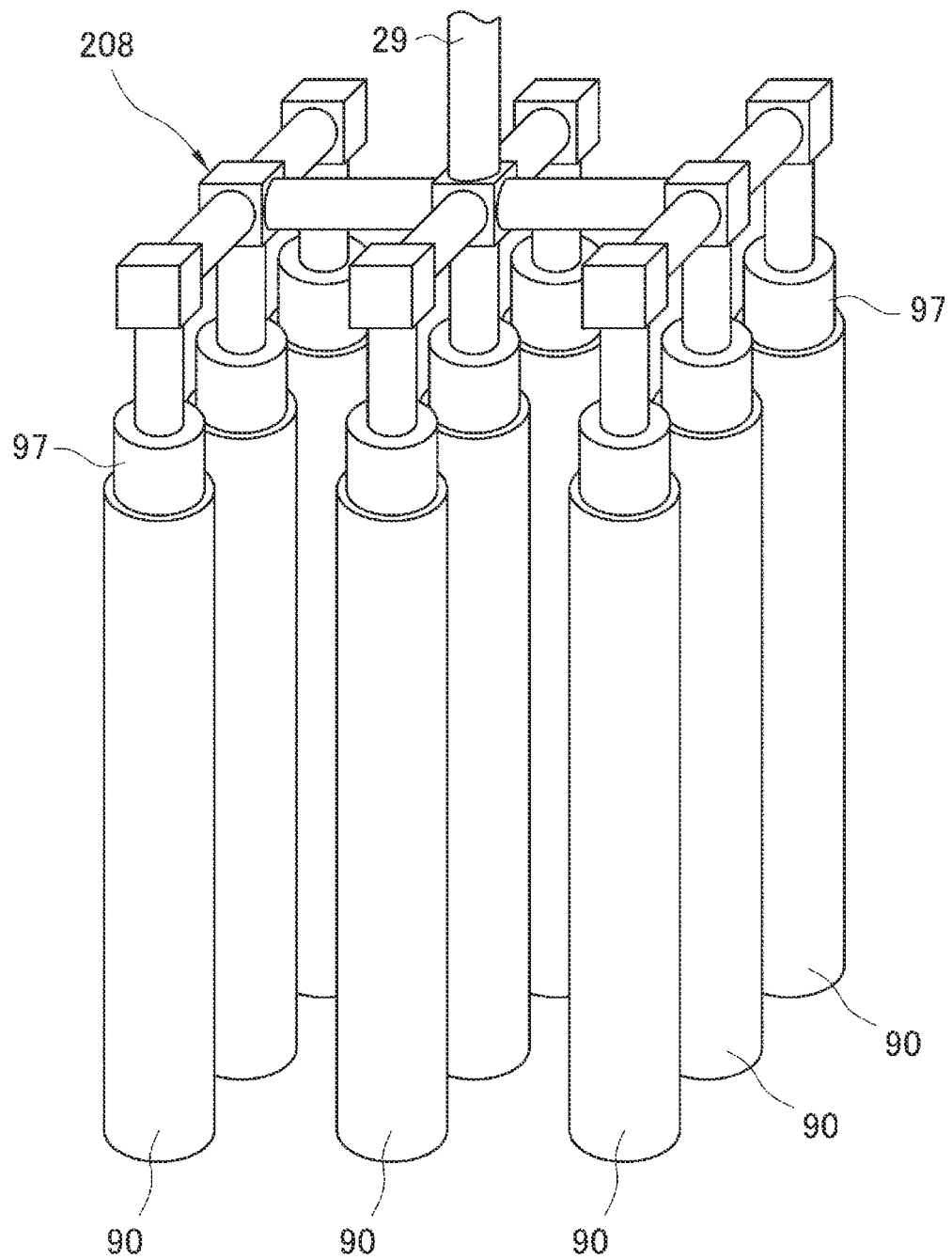
FIG. 34 is a diagram showing a gas introduction branch pipe.

As shown in FIG. 34, the heat generating device 206 further includes a gas introduction branch pipe 208. One end of the gas introduction branch pipe 208 is connected with the introduction line 29, and the other end thereof is branched and connected with the plurality of introduction ports 23. The gas introduction branch pipe 208 and the plurality of introduction ports 23 are detachable from each other. The gas introduction branch pipe 208 guides the hydrogen-based gas circulating through the introduction line 29 to the plurality of introduction ports 23. The number of branches of the gas introduction branch pipe 208 may be appropriately designed according to the number of heat-generating elements 90 to be used.

The sealed container 207 includes a plurality of first chambers 209 and one second chamber 210 (See FIG. 33). The plurality of first chambers 209 are pressurized by introducing the hydrogen-based gas. The second chamber 210 is depressurized by recovering the hydrogen-based gas. Accordingly, a hydrogen pressure in the plurality of first chambers 209 is higher than a hydrogen pressure in the second chamber 210. Due to a hydrogen pressure difference generated between the first chambers 209 and the second chamber 210, the hydrogen-based gas introduced into the first chambers 209 permeates through the heat-generating elements 14, moves to the second chamber 210, and is recovered in the recovery line 30. Each of the heat-generating elements 90 generates excess heat by permeation of the hydrogen-based gas. Therefore, the heat utilization system 205 can increase an output of excess heat by providing the plurality of heat-generating elements 90.

[Modification 20]

In Modification 19, temperatures of the plurality of heat-generating elements 90 are collectively adjusted using the heater 16b provided on the outer periphery of the sealed container 207. However, in Modification 20, the temperatures of the heat-generating elements 90 are adjusted independently.

Figure 35:
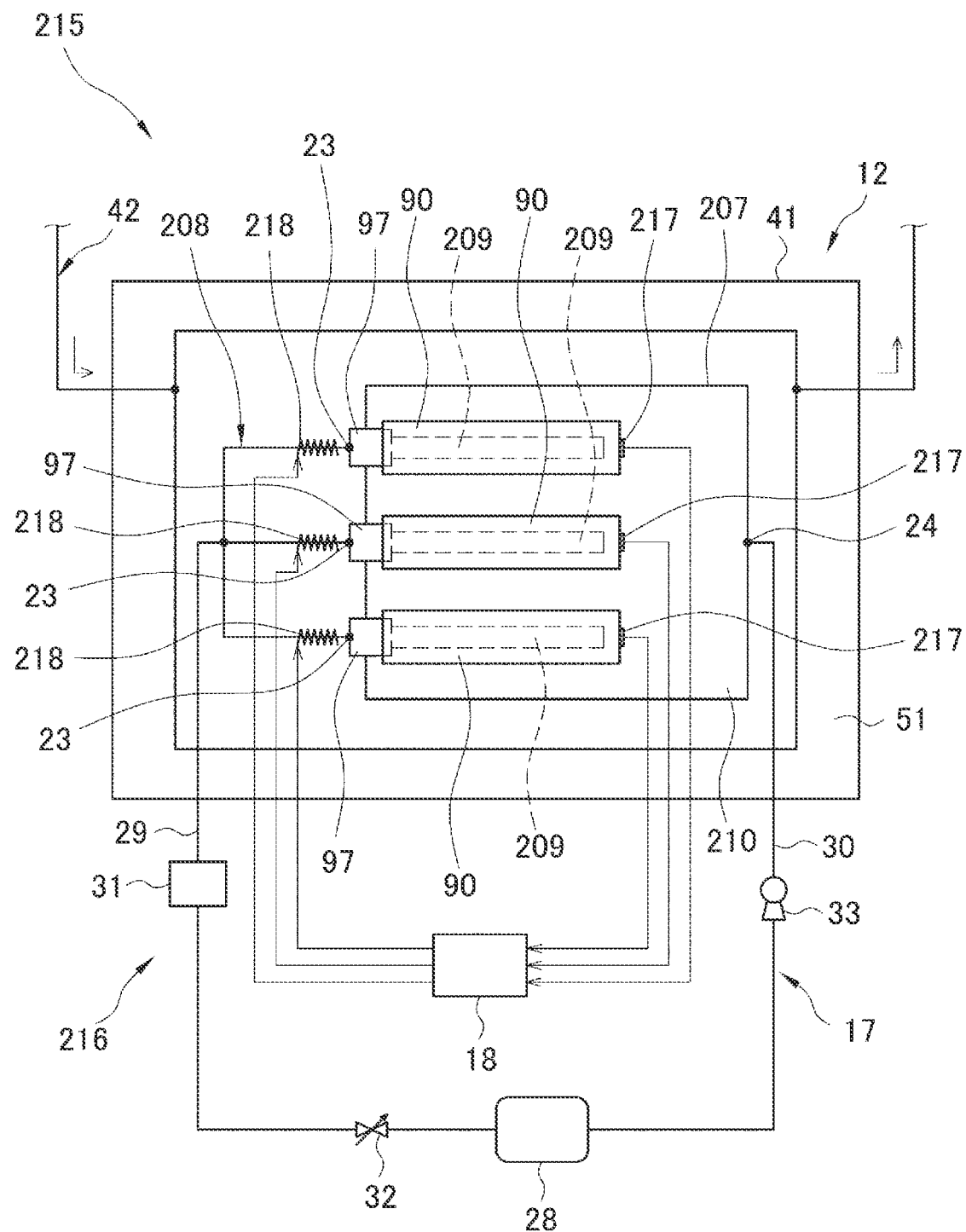
FIG. 35 is a schematic diagram showing a heat utilization system according to Modification 20.

As shown in FIG. 35, a heat utilization system 215 includes a heat generating device 216 and the heat utilization device 12. The heat generating device 216 includes a plurality of heat-generating elements 90, the sealed container 207, the gas introduction branch pipe 208, a plurality of temperature sensors 217, a plurality of heaters 218, the control unit 18, and a power supply (not shown).

The temperature sensor 217 is provided at the heat-generating element 90. One temperature sensor 217 is provided at one heat-generating element 90. That is, the temperature of one heat-generating element 90 is detected by one temperature sensor 217. The plurality of temperature sensors 217 are electrically connected with the control unit 18, and a signal corresponding to the detected temperature of each of the heat-generating elements 90 is output to the control unit 18.

The heaters 218 are provided at branched ends of the gas introduction branch pipe 208. The plurality of heaters 218 are electrically connected with a power supply (not shown). The heater 218 generates heat by inputting electric power from the power supply.

The control unit 18 independently controls an output of each of the heaters 218 based on the temperature detected by each of the temperature sensors 217. Therefore, since the heat utilization system 215 independently adjusts the temperature of each of the heat-generating elements 90 and maintains the plurality of heat-generating elements 90 at appropriate temperatures for heat generation, an output of excess heat can be stabilized.

[Modification 21]

Figure 36:
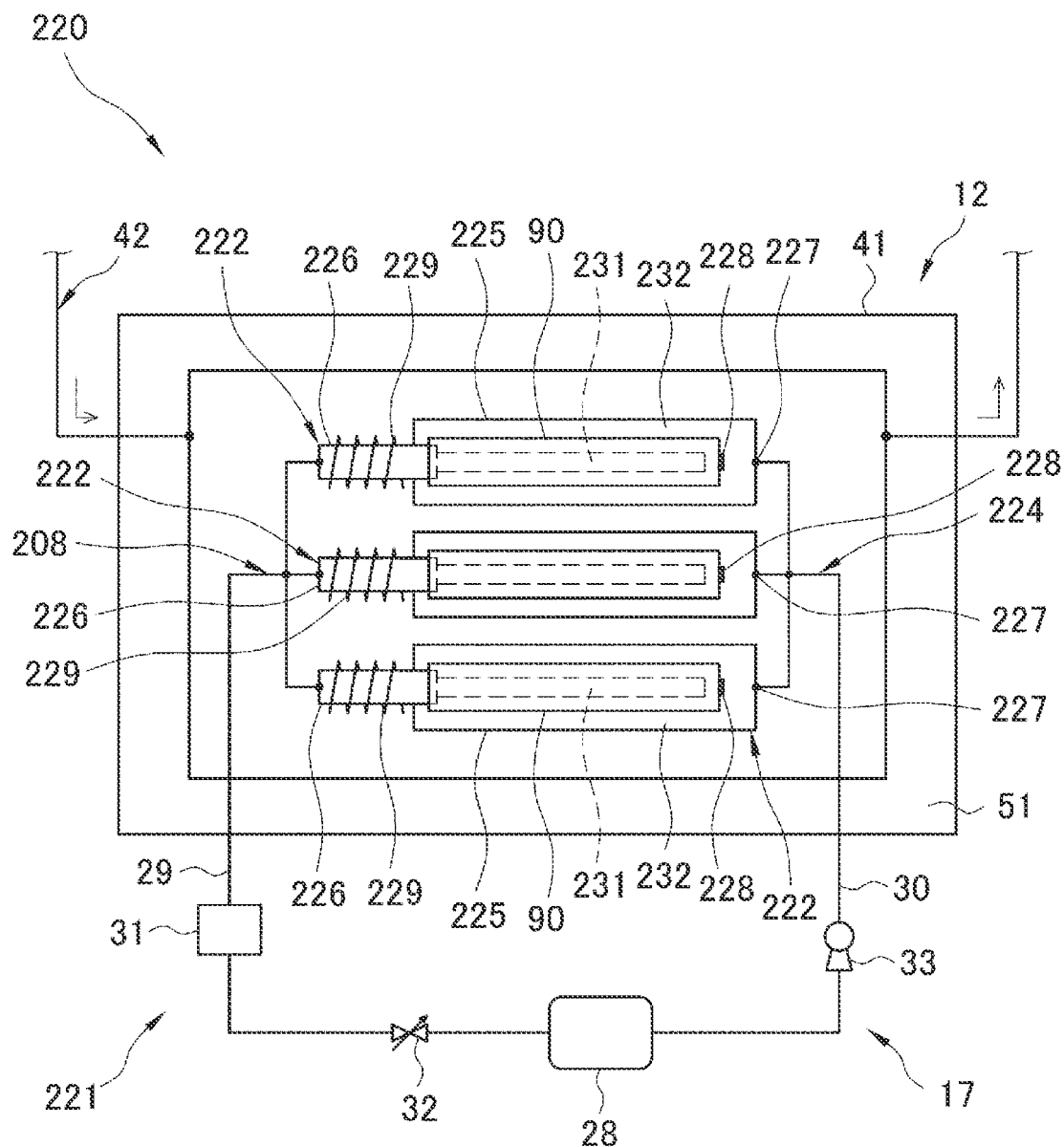
FIG. 36 is a schematic diagram showing a heat utilization system according to Modification 21.

As shown in FIG. 36, a heat utilization system 220 includes a heat generating device 221 and the heat utilization device 12. The heat generating device 221 includes a plurality of heat generating cells 222, the gas introduction branch pipe 208, a gas recovery branch pipe 224, the hydrogen circulation line 17, a control unit (not shown), a power supply (not shown), and the like. The heat generating cell 222 is a cell in which the heat-generating element 90, a sealed container 225, a gas introduction unit 226, a gas discharge unit 227, a temperature sensor 228, and a heater 229 are modularized as one unit. The control unit (not shown) is electrically connected with the temperature sensor 228, the heater 229, and the power supply (not shown), and controls an output of the heater 229 based on a temperature detected by the temperature sensor 228. The control unit adjusts input electric power to the heater 229 for each of the heat generating cells 222, thereby maintaining each of the heat-generating elements 90 at an appropriate temperature for heat generation.

Figure 37:
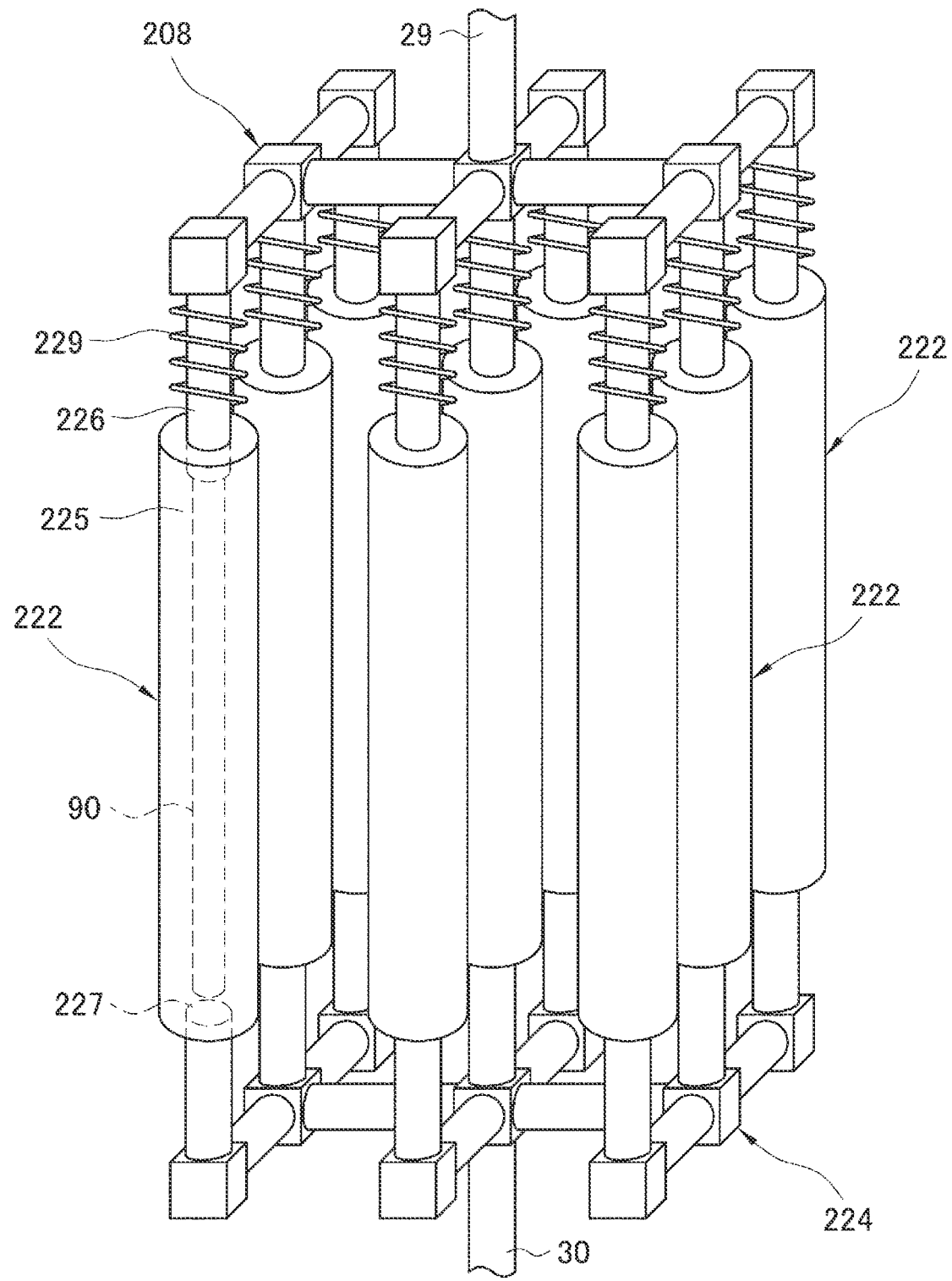
FIG. 37 is a diagram showing a connection between a heat generating cell and a hydrogen circulation line.

As shown in FIG. 37, one end of the gas introduction branch pipe 208 is connected with the introduction line 29 of the hydrogen circulation line 17, and the other end thereof is branched and connected with the gas introduction units 226 of the plurality of heat generating cells 222. The gas introduction branch pipe 208 and the gas introduction unit 226 are detachable from each other. One end of the gas recovery branch pipe 224 is connected with the recovery line 30 of the hydrogen circulation line 17, and the other end thereof is branched and connected with the gas discharge units 227 of the plurality of heat generating cells 222. The gas recovery branch pipe 224 and the gas discharge unit 227 are detachable from each other. The number of branches of the gas introduction branch pipe 208 and the number of branches of the gas recovery branch pipe 224 may be appropriately designed according to the number of the heat generating cells 222 to be used.

Each configuration of the heat generating cells 222 will be described with reference to FIGS. 36 and 37. The sealed container 225 is a hollow container having a cylindrical shape, and accommodates the heat-generating element 90. The gas introduction unit 226 is provided at one end of the sealed container 225 in an axial direction. The gas introduction unit 226 is connected with the introduction line 29 via the gas introduction branch pipe 208. The gas introduction unit 226 introduces the hydrogen-based gas circulating through the introduction line 29 into the sealed container

225. The gas discharge unit 227 is provided at the other end of the sealed container 225 in the axial direction. The gas discharge unit 227 is connected with the recovery line 30 via the gas recovery branch pipe 224. The gas discharge unit 227 discharges the hydrogen-based gas in the sealed container 225 from the recovery line 30 to an outside of the sealed container 225. The temperature sensor 228 is provided inside the sealed container 225 and detects the temperature of the heat-generating element 90. The heater 229 is provided on the gas introduction unit 226, and heats the heat-generating element 90 by heating the hydrogen-based gas circulating through the gas introduction unit 226.

The sealed container 225 has first chambers 231 and second chambers 232 partitioned by the heat-generating elements 90 (see FIG. 36). The first chamber 231 has an introduction port (not shown), and is pressurized by introducing the hydrogen-based gas. The second chamber 232 has a recovery port (not shown), and is depressurized by recovering the hydrogen-based gas. Accordingly, a hydrogen pressure in the first chamber 231 is higher than a hydrogen pressure in the second chamber 232. The hydrogen-based gas introduced into the first chamber 231 permeates through the heat-generating element 90 and moves to the second chamber 232 due to a hydrogen pressure difference generated between the first chamber 231 and the second chamber 232. The heat-generating element 90 generates excess heat by permeation of the hydrogen-based gas.

The heat generating cell 222 is a cell in which the sealed container 225, the gas introduction unit 226, the gas discharge unit 227, the temperature sensor 228, and the heater 229 are modularized as one unit, and can be detachably connected with the hydrogen circulation line 17 via the gas introduction branch pipe 208 and the gas recovery branch pipe 224. Therefore, since the number of the heat generating cells 222 can be changed depending on application, the heat utilization system 220 and the heat generating device 221 are excellent in a degree of design flexibility.

[Modification 22]

Figure 38:
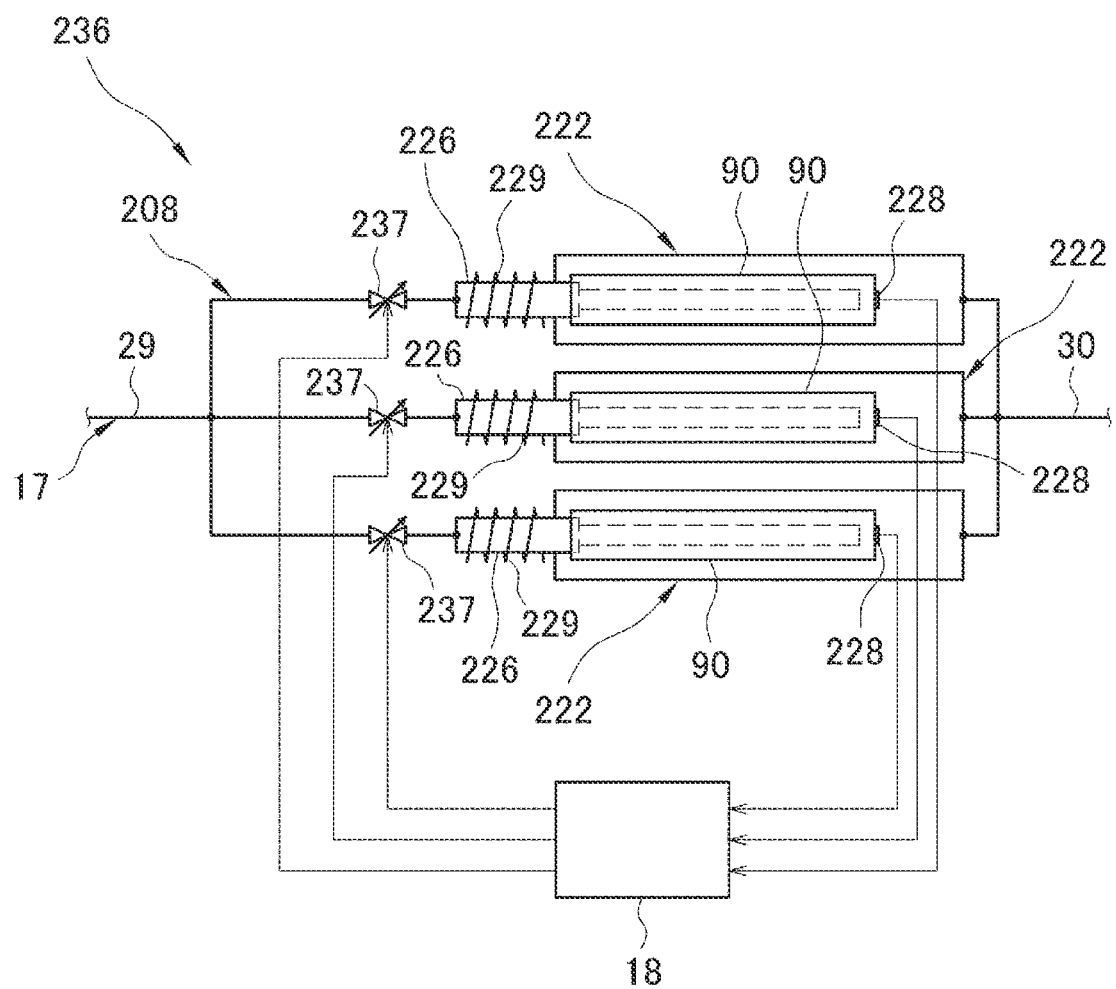
FIG. 38 is a schematic diagram showing a heat generating device according to Modification 22.

In addition to members of the heat generating device 221 according to Modification 21, a heat generating device 236 shown in FIG. 38 further includes a plurality of flow rate adjustment valves 237. The plurality of flow rate adjustment valves 237 are provided on the gas introduction branch pipe 208. The flow rate adjustment valve 237 is, for example, a variable leak valve. The heat generating device 236 includes one flow rate adjustment valve 237 in one heat generating cell 222, so that a circulation flow rate of the hydrogen-based gas in each of the heat generating cells 222 can be controlled.

The control unit 18 adjusts a circulation flow rate of the hydrogen-based gas for each of the heat generating cells 222, thereby performing heat generation control to maintain the temperature of the heat-generating element 90 at an appropriate temperature for heat generation. Hereinafter, an example of the heat generation control performed by the control unit 18 will be described.

An example in which the heat generation control is performed based on the temperature detected by the temperature sensor 228 will be described. When an operation of the heat generating device 236 is started, the control unit 18 sets input electric power to the heater 229 and an opening degree of the flow rate adjustment valve 237 to predetermined initial set values. Accordingly, the temperature of the heat-generating element 90 rises to an appropriate temperature for heat generation.

The control unit 18 acquires the temperature detected by the temperature sensor 228, and compares the acquired temperature with a reference temperature. The reference temperature is a temperature at which the heat-generating element 90 can be assumed not to generate excess heat, and is stored in advance in the control unit 18. For example, the control unit 18 stores a heating temperature of the heater 229 as the reference temperature.

When the temperature acquired from the temperature sensor 228 is equal to or lower than the reference temperature, the control unit 18 determines that no excess heat is generated. When determining that no excess heat is generated, the control unit 18 maintains the input electric power to the heater 229 and the opening degree of the flow rate adjustment valve 237 at the initial set values. Accordingly, it is possible to promote generation of excess heat in the heat-generating element 90 that does not generate excess heat.

On the other hand, when the temperature acquired from the temperature sensor 228 is higher than the reference temperature, the control unit 18 determines that the excess heat is generated. When determining that the excess heat is generated, the control unit 18 increases the circulation flow rate of the hydrogen-based gas to be introduced into the heat generating cell 222 by increasing the opening degree of the flow rate adjustment valve 237. The excess heat is generated, so that the temperature of the heat-generating element 90 is higher than an appropriate temperature for heat generation. The heat-generating element 90 is cooled by increasing the circulation flow rate of the hydrogen-based gas, and is returned to the appropriate temperature for heat generation. Accordingly, an output of the excess heat can be increased in the heat-generating element 90 that generates excess heat.

When the heat generating cell 222 in which no excess heat is generated and the heat generating cell 222 in which excess heat is generated are included, the heat generating device 236 can promote an exothermic reaction in the heat generating cell 222 in which excess heat is generated by performing the heat generation control for each of the heat generating cells 222. Therefore, an output of excess heat in the entire device can be reliably and easily stabilized.

In Modification 22, when the heat generating cell 222 in which no excess heat is generated and the heat generating cell 222 in which excess heat is generated are included, the heat generation control is performed for the heat generating cell 222 in which excess heat is generated. However, the heat generating cell 222 in which no excess heat is generated includes the heat generating cell 222 in which exothermic reaction does not take place at all and the heat generating cell 222 in which the exothermic reaction is insufficient. For the heat generating cell 222 in which the exothermic reaction is insufficient and no excess heat is generated, the heat generation control may be performed to promote the exothermic reaction to generate excess heat. Therefore, of the heat generating cell 222 in which no excess heat is generated and the heat generating cell 222 in which excess heat is generated, the heat generating device 236 may perform the heat generation control on the heat generating cell 222 in which no excess heat is generated. Accordingly, the number of the heat generating cells 222 in which excess heat is generated can be increased, and therefore an output of excess heat of the entire device can be increased.

[Modification 23]

In Modification 23, the hydrogen-based gas that has permeated through the heat-generating element 90 is sampled, the sampled hydrogen-based gas is analyzed, and the heat generation control is performed based on an analysis result.

Figure 39:
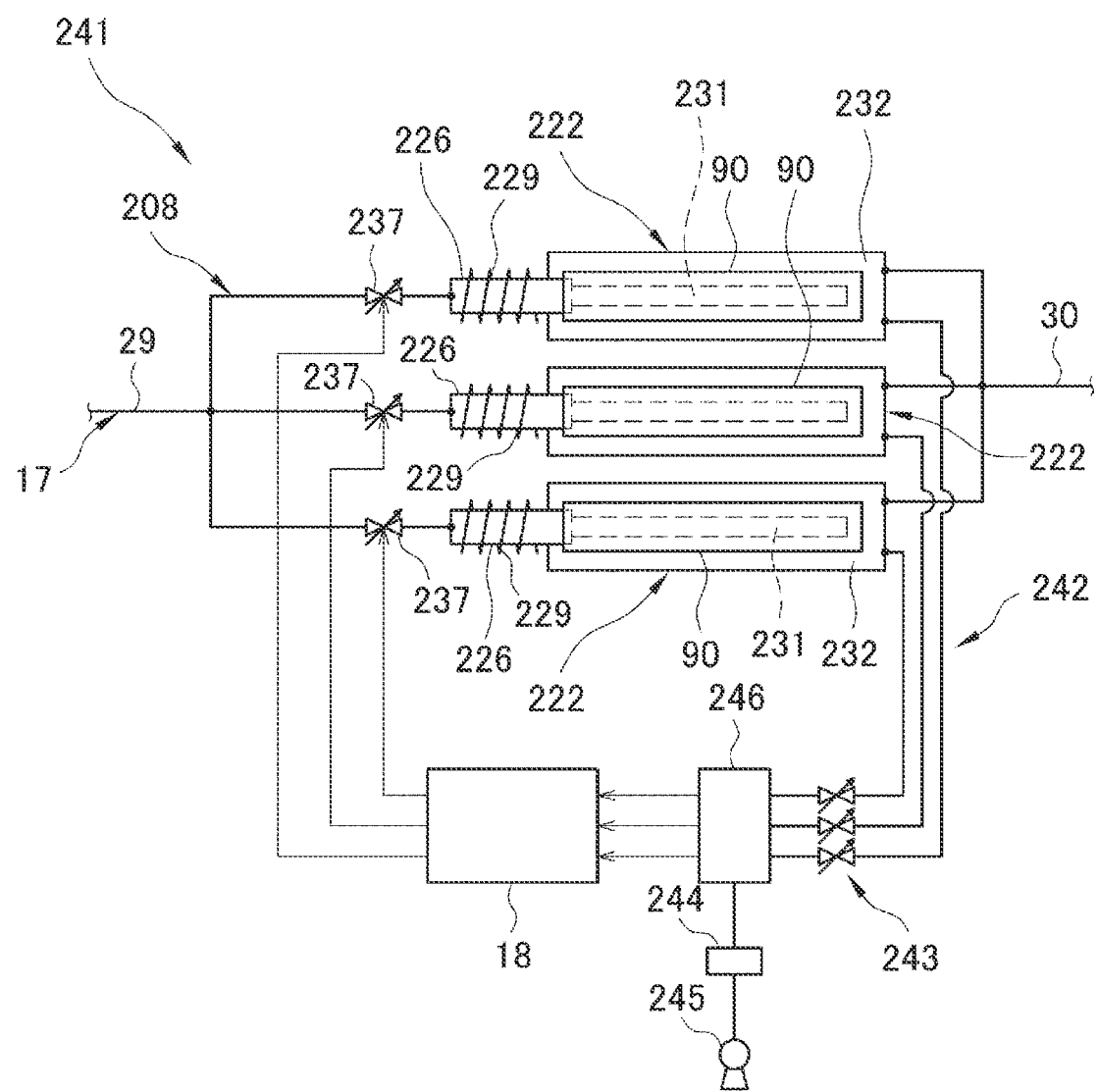
FIG. 39 is a schematic diagram showing a heat generating device according to Modification 23.

In addition to the members of the heat generating device 221 in Modification 21, a heat generating device 241 shown in FIG. 39 further includes a plurality of sampling pipes 242, a plurality of adjustment valves 243, a turbo molecular pump 244, a dry pump 245, and an analysis unit 246.

The plurality of sampling pipes 242 connect the second chambers 232 of the plurality of heat generating cells 222 and the analysis unit 246. The hydrogen-based gas that has permeated through the heat-generating element 90 flows into the sampling pipe 242. The sampling pipe 242 is provided with the adjustment valves 243, the analysis unit 246, the turbo molecular pump 244, and the dry pump 245 in order from a connection side with the second chamber 232. The adjustment valve 243 adjusts a flow rate of the hydrogen-based gas flowing into the sampling pipe 242. The turbo molecular pump 244 and the dry pump 245 exhaust a gas inside the sampling pipe 242, so that the hydrogen-based gas in the second chamber 232 flows into the sampling pipe 242.

For each of the heat generating cells 222, the analysis unit 246 samples the hydrogen-based gas that has permeated through the heat-generating element 90 and analyzes the sampled hydrogen-based gas. By analyzing, the analysis unit 246 specifies whether the hydrogen-based gas contains, for example, a gas uniquely generated by an exothermic reaction in the heat-generating element 90. The analysis unit 246 is electrically connected with the control unit 18, and outputs the analysis result to the control unit 18. Timing when the analysis unit 246 performs the analysis may be set as appropriate.

Based on the analysis result of the analysis unit 246, the control unit 18 performs the heat generation control to maintain the temperature of the heat-generating element 90 at an appropriate temperature for heat generation by adjusting a circulation flow rate of the hydrogen-based gas for each of the heat generating cells 222.

An example in which the heat generation control is performed based on the analysis result of the analysis unit 246 will be described. When an operation of the heat generating device 241 is started, the control unit 18 sets input electric power to the heater 229 and an opening degree of the flow rate adjustment valve 237 to predetermined initial set values. Accordingly, the temperature of the heat-generating element 90 rises up to an appropriate temperature for heat generation.

The control unit 18 acquires the analysis result of the analysis unit 246, that is, a result of specifying whether the hydrogen-based gas contains the generated gas. When the hydrogen-based gas does not contain the generated gas, the control unit 18 determines that no excess heat is generated. When determining that no excess heat is generated, the control unit 18 maintains the input electric power to the heater 229 and the opening degree of the flow rate adjustment valve 237 at the initial set values. Accordingly, it is possible to promote generation of excess heat in the heat-generating element 90 that does not generate excess heat.

On the other hand, when the hydrogen-based gas contains the generated gas, the control unit 18 determines that excess heat is generated. When determining that excess heat is generated, the control unit 18 increases a circulation flow rate of the hydrogen-based gas to be introduced into the heat generating cells 222 by increasing the opening degree of the flow rate adjustment valve 237. The temperature of the heat-generating element 90 that has been increased due to the generation of the excess heat is returned to the appropriate temperature for heat generation by increasing the circulation flow rate of the hydrogen-based gas. Accordingly, an output of the excess heat can be increased in the heat-generating element 90 that generates excess heat. Therefore, since the heat generating device 241 performs the heat generation control for each of the heat generating cells 222, a heat generation amount of the entire device can be stabilized.

Of the heat generating cell 222 in which no excess heat is generated and the heat generating cell 222 in which excess heat is generated, the heat generating device 241 may perform the heat generation control on the heat generating cell 222 in which no excess heat is generated. Accordingly, the number of the heat generating cells 222 in which excess heat is generated can be increased, and therefore an output of excess heat of the entire device can be increased.

The analysis unit 246 may analyze an inhibitor contained in the hydrogen-based gas. The inhibitor is a gas (hereinafter, referred to as an inhibition gas) that inhibits an exothermic reaction of the heat-generating element 90. Examples of the inhibitor include water (including steam) and hydrocarbons. When the inhibitor is analyzed, for example, a mass spectrometer such as a quadrupole mass spectrometer is used as the analysis unit 246. The analysis unit 246 performs a mass analysis on the inhibition gas, and outputs, for example, an ion current or a gas partial pressure of the inhibition gas as the analysis result. The control unit 18 performs the heat generation control based on the analysis result on the inhibitor. The control unit 18 increases or reduces the circulation flow rate of the hydrogen-based gas based on, for example, the ion current of the inhibition gas. Accordingly, the inhibition gas is reliably discharged from an inside of the sealed container 225 and the inside of the sealed container 225 is kept clean. Therefore, an output of excess heat can be increased. In addition, the control unit 18 increases a heating temperature of the heater 229 in order to prevent a reduction in the temperature of the heat-generating element 90 due to an increase in the circulation flow rate of the hydrogen-based gas. Accordingly, since the temperature of the heat-generating element 90 is maintained at the appropriate temperature for heat generation, an output of excess heat can be further increased.

The analysis unit 246 may perform a mass analysis on an adsorptive impurity gas contained in the hydrogen-based gas. The analysis unit 246 outputs, for example, a concentration of the impurity gas as the analysis result. In this case, the control unit 18 increases the circulation flow rate of the hydrogen-based gas when the concentration of the impurity gas is low. Alternatively, the control unit 18 increases the heating temperature of the heater 229 when the concentration of the impurity gas is low. Accordingly, the temperature of the heat-generating element 90 can be maintained at an appropriate temperature for heat generation, and an output of excess heat can be increased.

[Modification 24]

In Modification 24, electric resistance of a hydrogen storage metal or a hydrogen storage alloy is measured and the heat generation control is performed based on a value of the measured electric resistance.

Figure 40:
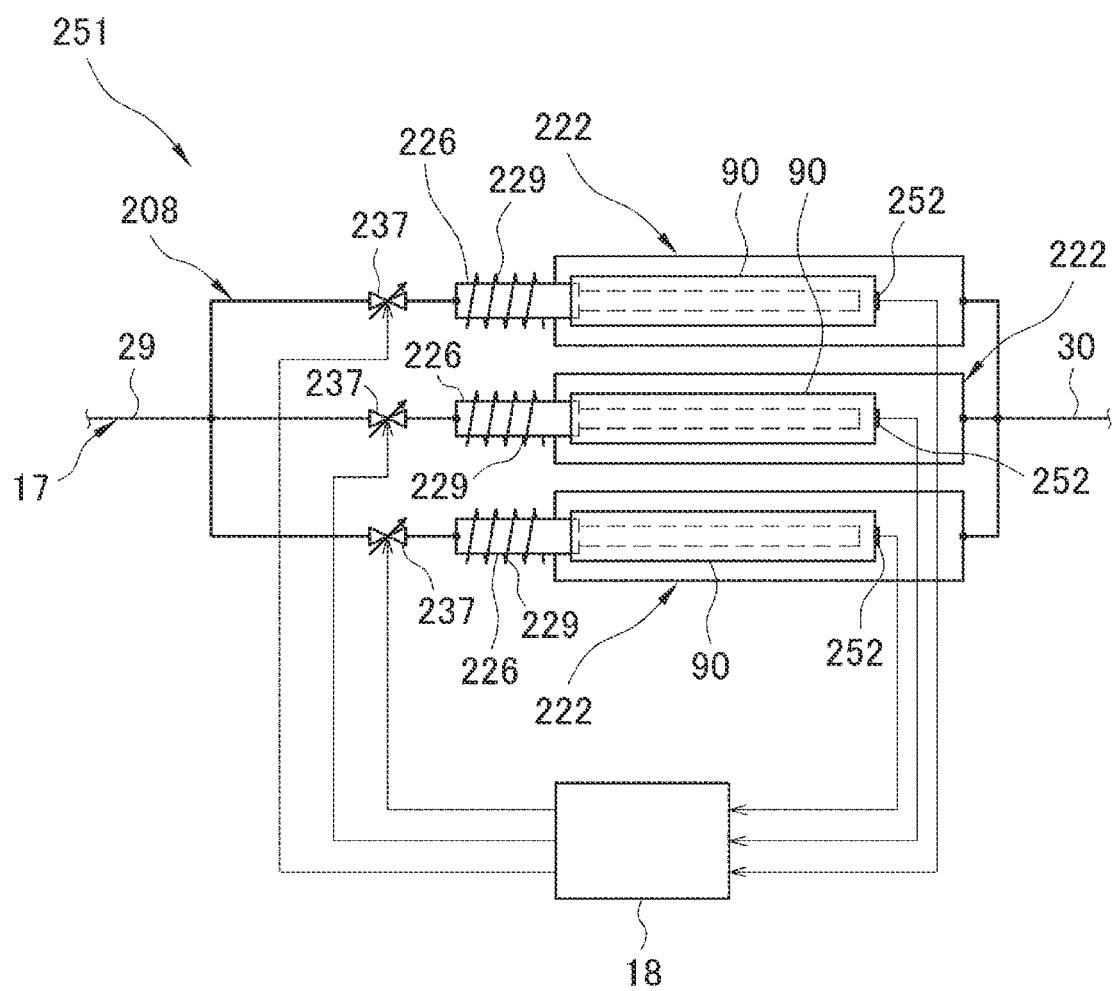
FIG. 40 is a schematic diagram showing a heat generating device according to Modification 24.

In addition to the members of the heat generating device 221 according to Modification 21, a heat generating device 251 shown in FIG. 40 further includes a plurality of electric resistance measurement units 252. In FIG. 40, the temperature sensor 228 is omitted. Each of the heat-generating elements 90 is provided with one electric resistance measurement unit 252. The electric resistance measurement unit 252 measures electric resistance of a hydrogen storage metal or a hydrogen storage alloy of the heat-generating element 90. Here, the larger a hydrogen storage amount of the hydrogen storage metal or the hydrogen storage alloy, the more likely an exothermic reaction occurs in the heat-generating element 90. The larger the hydrogen storage amount of the hydrogen storage metal or the hydrogen storage alloy, the smaller the electric resistance of the heat-generating element 90. Therefore, the hydrogen storage amount can be estimated by measuring the electric resistance of the hydrogen storage metal or the hydrogen storage alloy of the heat-generating element 90. The plurality of electric resistance measurement units 252 are electrically connected with the control unit 18 and output a measurement result of the electric resistance to the control unit 18.

Based on an electric resistance value measured by the electric resistance measurement unit 252, the control unit 18 performs the heat generation control to maintain the temperature of the heat-generating element 90 at an appropriate temperature for heat generation by adjusting the circulation flow rate of the hydrogen-based gas for each of the heat generating cells 222.

An example in which the heat generation control is performed based on the electric resistance value measured by the electric resistance measurement unit 252 will be described. When an operation of the heat generating device 251 is started, the control unit 18 sets input electric power to the heater 229 and an opening degree of the flow rate adjustment valve 237 to predetermined initial set values. Accordingly, the temperature of the heat-generating element 90 rises up to an appropriate temperature for heat generation.

The control unit 18 acquires the measurement result of the electric resistance measurement unit 252, that is, the electric resistance value, and compares the acquired electric resistance value with a predetermined threshold.

When the electric resistance value acquired from the electric resistance measurement unit 252 is equal to or larger than the threshold, the control unit 18 determines that no excess heat is generated. This is because it can be assumed that no excess heat is generated since the hydrogen storage amount in the heat-generating element 90 is small when the electric resistance value is high. When determining that no excess heat is generated, the control unit 18 maintains the input electric power to the heater 229 and the opening degree of the flow rate adjustment valve 237 at the initial set values. Accordingly, it is possible to promote generation of excess heat in the heat-generating element 90 that does not generate excess heat.

On the other hand, when the electric resistance value acquired from the electric resistance measurement unit 252 is smaller than the threshold, the control unit 18 determines that excess heat is generated. This is because it can be assumed that excess heat is generated since the hydrogen storage amount in the heat-generating element 90 is high when the electric resistance value is low. When determining that excess heat is generated, the control unit 18 increases a circulation flow rate of the hydrogen-based gas to be introduced into the heat generating cells 222 by increasing the opening degree of the flow rate adjustment valve 237. The temperature of the heat-generating element 90 that has been increased due to the generation of the excess heat is returned to the appropriate temperature for heat generation by increasing the circulation flow rate of the hydrogen-based gas. When the heat-generating element 90 is maintained at an appropriate temperature for heat generation, the hydrogen storage amount of the hydrogen storage metal or the hydrogen storage alloy increases and an exothermic reaction is promoted. Accordingly, an output of the excess heat can be increased in the heat-generating element that generates excess heat. Therefore, since the heat generating device 251 performs the heat generation control for each of the heat generating cell 222, a heat generation amount of the entire device can be stabilized.

Of the heat generating cell 222 in which no excess heat is generated and the heat generating cell 222 in which excess heat is generated, the heat generating device 251 may perform heat generation control on the heat generating cell 222 in which no excess heat is generated. Accordingly, the number of the heat generating cells 222 in which excess heat is generated can be increased, and therefore an output of excess heat of the entire device can be increased.

[Modification 25]

Figure 41:
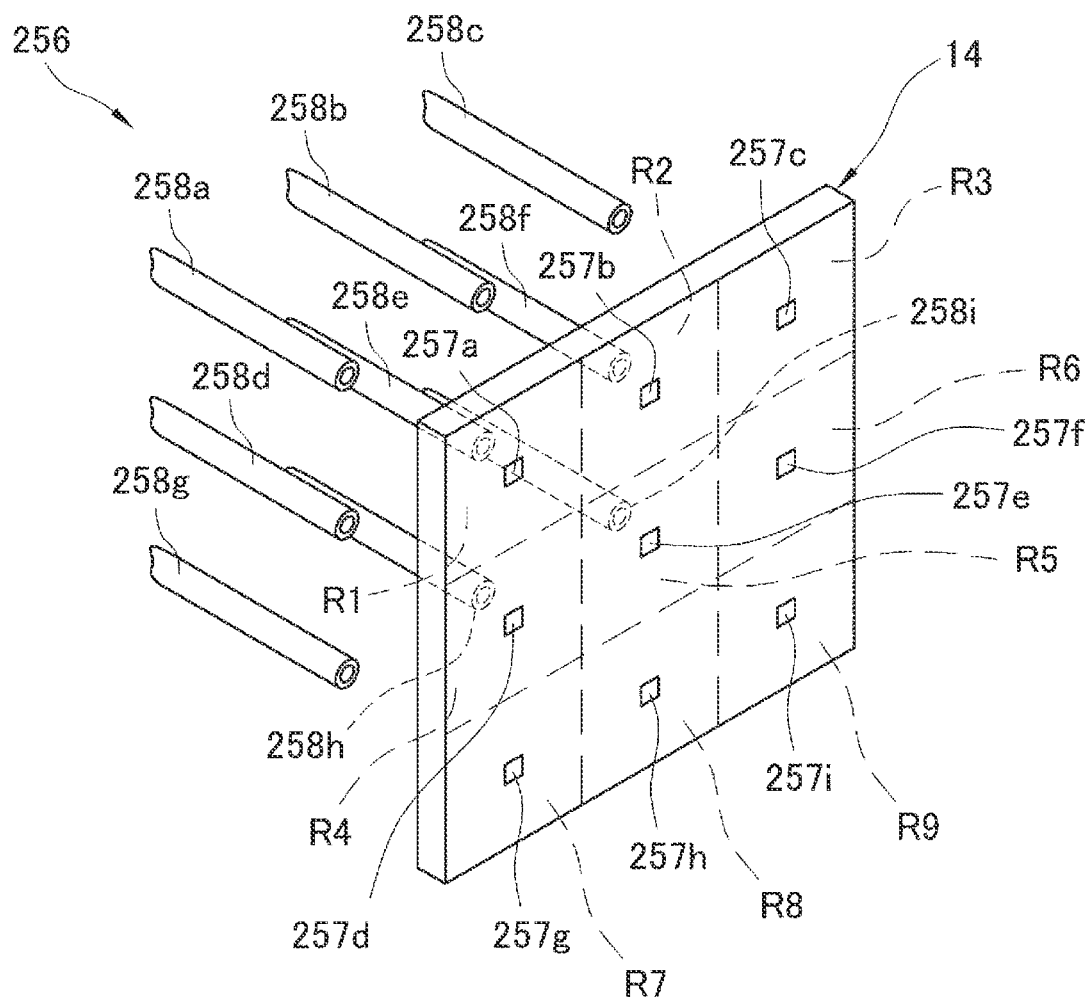
FIG. 41 is a schematic diagram showing a heat generating device according to Modification 25.

As shown in FIG. 41, a heat generating device 256 includes the heat-generating element 14, a plurality of temperature sensors 257a to 257i that detect the temperature of the heat-generating element 14, and a plurality of nozzle portions 258a to 258i that eject the hydrogen-based gas onto the front surface of the heat-generating element 14. In this modification, the hydrogen-based gas is ejected from the plurality of nozzle portions 258a to 258i onto one heat-generating element 14. In FIG. 41, the sealed container 15 is omitted.

The plurality of temperature sensors 257a to 257i are arranged in an array form. In FIG. 41, nine temperature sensors 257a to 257i are two-dimensionally arranged at equal intervals on the back surface of the heat-generating element 14. The plurality of temperature sensors 257a to 257i detect temperatures of a plurality of temperature measurement target regions R1 to R9 formed by dividing the heat-generating element 14. For example, the temperature sensor 257a detects a temperature of the temperature measurement target region R1. The temperature measurement target regions R1 to R9 are divided by boundary lines. A boundary line passes through a middle of adjacent temperature sensors among the temperature sensors 257a to 257i. The boundary line is a conceptual line. In the following description, in the case of not being distinguished from each other, the temperature sensors 257a to 257i are referred to as temperature sensors 257. In the case of not being distinguished from each other, the temperature measurement target regions R1 to R9 are referred to as temperature measurement target regions R.

The plurality of nozzle portions 258a to 258i are respectively provided in the temperature measurement target regions R1 to R9. In FIG. 41, nine nozzle portions 258a to 258i correspond to the temperature measurement target regions R1 to R9. In the following description, in the case of not being distinguished from each other, the nozzle portions 258a to 258i are referred to as nozzle portions 258.

Figure 42:
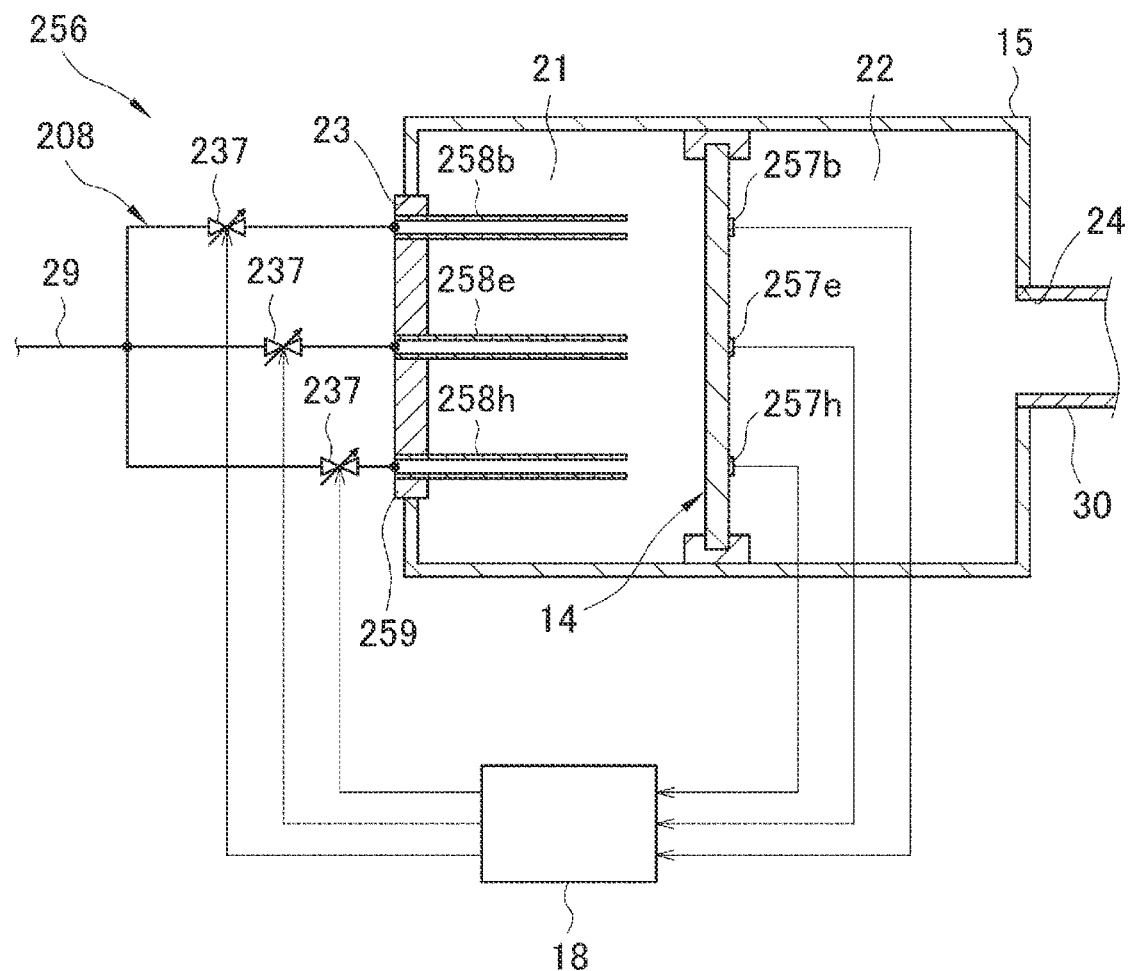
FIG. 42 is a cross-sectional view showing the heat generating device according to Modification 25.

FIG. 42 is a longitudinal cross-sectional view passing through a center of the heat-generating element 14 in FIG. 41. FIG. 42 shows the temperature sensors 257b, 257e, and 257h among the temperature sensors 257a to 257i and the nozzle portions 258b, 258e, and 258h among the nozzle portions 258a to 258i. As shown in FIG. 42, the temperature sensors 257 are electrically connected with the control unit 18, and output signals corresponding to temperatures of the temperature measurement target regions R to the control unit 18. The nozzle portions 258 are mounted to a mounting plate 259 provided at the introduction port 23 of the sealed container 15. The nozzle portions 258 are connected with the introduction line 29 via the introduction port 23, and eject the hydrogen-based gas onto the front surface of the heat-generating element 14.

The heat generating device 256 further includes the control unit 18, the gas introduction branch pipe 208, and a plurality of flow rate adjustment valves 237. One end of the gas introduction branch pipe 208 is connected with the introduction line 29, and the other end thereof is branched and connected with the plurality of nozzle portions 258. The gas introduction branch pipe 208 and the plurality of nozzle portions 258 are detachable from each other. The plurality of flow rate adjustment valves 237 are provided on the gas introduction branch pipe 208. The heat generating device 256 includes one flow rate adjustment valve 237 for one nozzle portion 258, so that the circulation flow rate of the hydrogen-based gas can be controlled for each nozzle portion 258.

Based on temperatures detected by the plurality of temperature sensors 257, the control unit 18 performs change control to change the nozzle portion 258 that ejects the hydrogen-based gas. The change control will be described below.

When an operation of the heat generating device 256 is started, the control unit 18 sets input electric power to a heater (not shown) and an opening degree of all of the flow rate adjustment valves 237 to predetermined initial set values. Accordingly, the temperature of the heat-generating element 14 rises up to an appropriate temperature for heat generation. At the initial set values, the hydrogen-based gas is ejected from all of the nozzle portions 258. The heater (not shown) is provided on the outer periphery of the sealed container 15 as, for example, in the heat generating device 11 according to the above-described embodiment.

The control unit 18 acquires temperatures detected by the temperature sensors 257, and compares each of the acquired temperatures with a reference temperature. The reference temperature is, for example, a temperature at which it can be assumed that no excess heat is generated in the temperature measurement target regions R. The reference temperature is stored in advance in the control unit 18 for each of the temperature measurement target regions R.

When the temperature acquired from the temperature sensor 257 is equal to or lower than the reference temperature, the control unit 18 determines that no excess heat is generated in the temperature measurement target region R in which the temperature is acquired. The control unit 18 maintains, at the initial set values, the input electric power to the heater (not shown) and the opening degree of the flow rate adjustment valve 237 corresponding to the temperature measurement target region R in which it is determined that no excess heat is generated. Accordingly, in the heat-generating element 14, generation of excess heat can be promoted in the temperature measurement target region R in which no excess heat is generated.

On the other hand, when the temperature acquired from the temperature sensor 257 is higher than the reference temperature, the control unit 18 determines that excess heat is generated in the temperature measurement target region R in which the temperature is acquired. The control unit 18 increases the opening degree of the flow rate adjustment valve 237 corresponding to the temperature measurement target region R in which it is determined that excess heat is generated so as to increase a flow rate of the hydrogen-based gas ejected from the nozzle portion 258 to the temperature measurement target region R. The temperature of the temperature measurement target region R that has been increased due to the generation of the excess heat is returned to an appropriate temperature for heat generation by increasing the circulation flow rate of the hydrogen-based gas. Accordingly, an output of excess heat can be increased in the temperature measurement target region R in which excess heat is generated.

The heat generating device 256 performs the change control for each of the plurality of temperature measurement target regions R so as to change the nozzle portions 258 that eject the hydrogen-based gas according to a heat generation state of the heat-generating element 14 that changes over time. Therefore, an output of excess heat of the heat-generating element 14 can be stabilized.

Of the temperature measurement target region R in which no excess heat is generated and the temperature measurement target region R in which excess heat is generated, the heat generating device 256 may perform the heat generation control in the temperature measurement target region R in which no excess heat is generated. Accordingly, the number of the temperature measurement target regions R in which excess heat is generated can be increased, and therefore an output of excess heat of all of the heat-generating elements 14 and the entire device can be increased.

The heat generating device 256 may include a plurality of heat-generating elements 14. An output of excess heat of the entire device can be further increased by performing change control for each of the heat-generating elements 14.

[Modification 26]

Figure 43:
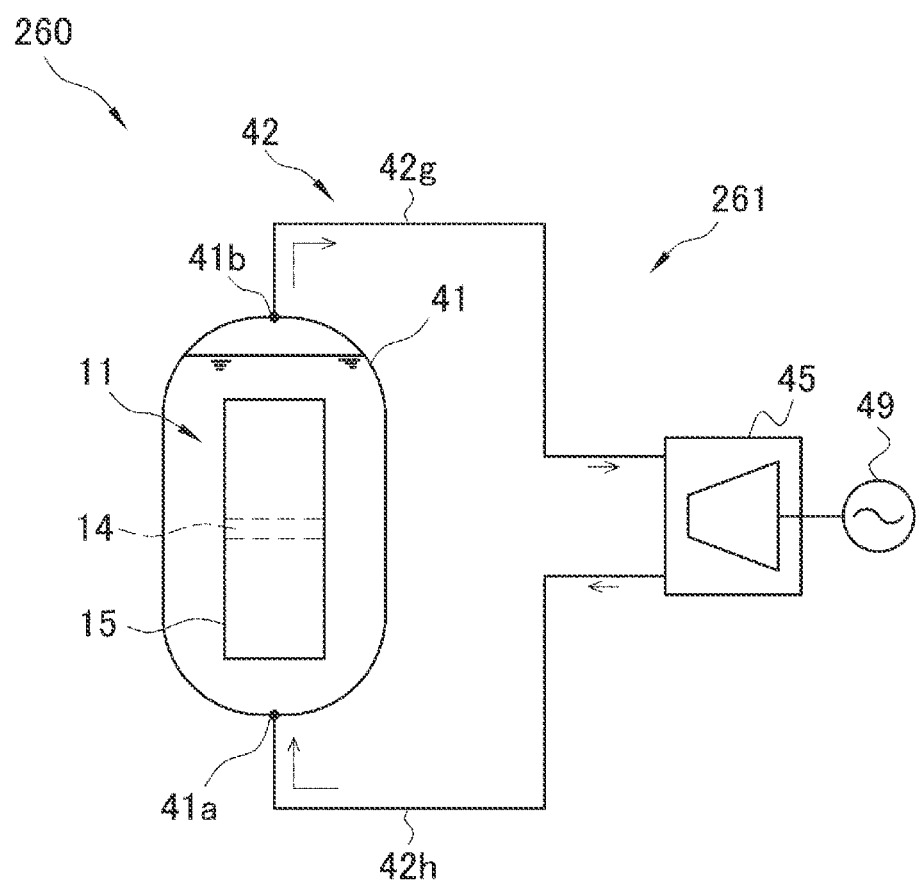
FIG. 43 is a schematic diagram showing a heat utilization system according to Modification 26.

As shown in FIG. 43, a heat utilization system 260 includes the heat generating device 11 and a heat utilization device 261. In FIG. 43, the temperature adjustment unit, the hydrogen circulation line, the control unit, and the like of the heat generating device 11 are omitted. In Modification 26, water is used as a heat medium.

The heat utilization device 261 includes the accommodation container 41, the heat medium circulation unit 42, and the steam turbine 45. Water is supplied into the accommodation container 41. A space is formed above a water surface in the accommodation container 41. In the accommodation container 41, heat exchange is performed between water and the heat-generating element 14, and water is boiled to generate steam. The heat medium circulation unit 42 includes a steam pipe 42g and a water supply pipe 42h instead of the first pipe 42a, the second pipe 42b, the third pipe 42c, the fourth pipe 42d, the pump 42e, and the heat medium flow rate control unit 42f. The steam pipe 42g supplies the steam generated in the accommodation container 41 to the steam turbine 45. The water supply pipe 42h includes a condenser (not shown) and a water supply pump (not shown). The steam discharged from the steam turbine 45 is cooled by the condenser and returned to water, and the water is supplied to the accommodation container 41 via the water supply pump. The steam turbine 45 is connected with the power generator 49 via a rotation shaft. The steam turbine 45 is rotated to generate electric power.

[Experiment]

A part of configurations of the heat generating device 121 (see FIG. 18) according to Modification 9 was changed to prepare an experimental heat generating device. An experiment was performed to evaluate excess heat of a heat-generating element by using the experimental heat generating device. First, the experimental heat generating device will be described, and then an experimental method and an experimental result will be described.

In the heat generating device 121 according to Modification 9, the hydrogen-based gas was circulated by using the hydrogen circulation line 17, while in the experimental heat generating device, instead of the hydrogen circulation line 17, an introduction line and a recovery line were separately provided and the hydrogen-based gas was not circulated.

In the heat generating device 121 according to Modification 9, an electric heating wire as the heater 16b was wound around the outer periphery of the mounting pipe 125, while in the experimental heat generating device, an electric furnace was provided to cover an outer periphery of a sealed container.

In the heat generating device 121 according to Modification 9, the heat-generating element 14 in which the multilayer film 62 was only provided on the front surface of the support element 61 was used, while in the experimental heat generating device, instead of the heat-generating element 14, a heat-generating element in which a multilayer film was provided on two surfaces of a support element was used.

The experimental heat generating device will be described in detail. The experimental heat generating device includes a heat-generating element that generates heat by occluding and discharging hydrogen, a sealed container that has a first chamber and a second chamber partitioned by the heat-generating element, and a temperature adjustment unit that adjusts a temperature of the heat-generating element.

The heat-generating element will be described. Similar to the heat-generating element 74 (see FIG. 5) according to Modification 1, the heat-generating element includes the multilayer film on two surfaces of the support element. Two types of heat-generating elements having different multilayer film configurations were prepared and used as Experimental Example 26 and Experimental Example 27. A substrate made of Ni and having a diameter of 20 mm and a thickness of 0.1 mm was used as the support element. The support element was prepared by performing vacuum annealing at 900° C. for 72 hours in vacuum and then etching two surfaces of the substrate with a concentrated nitric acid.

The multilayer film was formed on two surfaces of the support element by using an ion beam sputtering device. The multilayer film according to Experimental Example 26 has a first layer made of Cu and a second layer made of Ni. The number of stacking configurations (the number of layers) of the first layer and the second layer according to Experimental Example 26 was 6. The multilayer film according to Experimental Example 27 has a first layer made of Cu, a second layer made of Ni, and a third layer made of CaO. The number of stacking configurations (the number of layers) of the first layer, the second layer, and the third layer according to Experimental Example 27 was 6.

The sealed container will be described. The sealed container includes a quartz glass pipe, a vacuum pipe for evacuating an inside of the quartz glass pipe, a mounting pipe for mounting the heat-generating element inside the quartz glass pipe, and the like. A tip end of the quartz glass pipe is sealed and a base end thereof is opened.

The vacuum pipe is connected with the base end of the quartz glass pipe. A recovery line for recovering a gas inside the quartz glass pipe is connected to the vacuum pipe. The recovery line is provided with a vacuum evacuation unit including a turbo molecular pump and a dry pump, a pressure sensor that detects an internal pressure of the quartz glass pipe, and a vacuum gauge that measures a permeation amount (a hydrogen permeation amount) of hydrogen permeating through a heat-generating element. The vacuum evacuation unit is not connected with the mounting pipe. Therefore, an inside of the mounting pipe is not evacuated.

The mounting pipe is inserted into the quartz glass pipe through the vacuum pipe. One end of the mounting pipe is provided outside the vacuum pipe (outside the quartz glass pipe), and the other end of the mounting pipe is provided inside the quartz glass pipe. The mounting pipe is made of SUS.

An introduction line for introducing the hydrogen-based gas into the mounting pipe is connected to the one end of the mounting pipe. The introduction line is provided with a hydrogen cylinder that stores the hydrogen-based gas, a pressure sensor that detects an internal pressure of the mounting pipe, a hydrogen supply valve for supplying and stopping the hydrogen-based gas to the mounting pipe, and a regulator valve for adjusting a pressure.

The other end of the mounting pipe is provided with a VCR joint that allows the heat-generating element to be attached and detached. The VCR joint has two leak holes that pass through an inner circumferential surface and an outer circumferential surface of the VCR joint at positions where the heat-generating element is provided. The heat-generating element is provided inside the VCR joint in a state of being interposed between two SUS gaskets.

In the sealed container, an internal space of the mounting pipe and an internal space of the quartz glass pipe are partitioned by the heat-generating element. The internal space of the mounting pipe is pressurized by introducing the hydrogen-based gas. The internal space of the quartz glass pipe is depressurized by evacuating the gas. Accordingly, a hydrogen pressure in the internal space of the mounting pipe is higher than a hydrogen pressure in the internal space of the quartz glass pipe. The internal space of the mounting pipe functions as the first chamber, and the internal space of the quartz glass pipe functions as the second chamber.

Due to a pressure difference generated between two sides of the heat-generating element, hydrogen permeates from the internal space of the mounting pipe which is a high pressure side to the internal space of the quartz glass pipe which is a low pressure side. As described above, in a hydrogen permeation process, the heat-generating element generates heat by occluding hydrogen from one surface (front surface) at the high pressure side and generates excess heat by discharging hydrogen from the other surface (back surface) at the low pressure side.

The temperature adjustment unit will be described. The temperature adjustment unit includes a temperature sensor that detects a temperature of the heat-generating element, a heater that heats the heat-generating element, and an output control unit that controls an output of the heater based on the temperature detected by the temperature sensor. A thermocouple (a K type sheath thermocouple) was used as the temperature sensor. In the experiment, two thermocouples (a first thermocouple and a second thermocouple) were prepared and inserted into the two leak holes of the VCR joint. The two thermocouples were brought into contact with the heat-generating element, and the temperature of the heat-generating element was measured. An electric furnace was used as the heater. The electric furnace covers an outer periphery of the quartz glass pipe. A control thermocouple is provided in the electric furnace. The output control unit is electrically connected with the control thermocouple and the electric furnace, and drives the electric furnace at a predetermined voltage based on a temperature detected by the control thermocouple. The electric furnace is driven by an alternating current power supply of 100 V. An electric power meter is used to measure input electric power to the electric furnace.

An experimental method and an experimental result will be described. The heat-generating element was interposed between two SUS gaskets, fixed to the other end of the mounting pipe using the VCR joint, and provided inside the quartz glass pipe. The heat-generating element was baked at 300° C. for 3 days before starting the experiment.

The experiment started after the baking described above was completed. The hydrogen supply valve was opened to supply the hydrogen-based gas to the mounting pipe, and the regulator valve was used to adjust a pressure (also referred to as a hydrogen supply pressure) in the first chamber (the internal space of the mounting pipe) to 100 kPa. The quartz glass pipe was evacuated, and a pressure in the second chamber (the internal space of the quartz glass pipe) was adjusted to $1 \times 10^{-4}$ [Pa]. The electric furnace was driven to heat the heat-generating element at a predetermined set temperature. The set temperature was changed every half day and was stepwisely increased within a range of 300° C. to 900° C.

A reference experiment was performed before experiments of Experimental Example 26 and Experimental Example 27. In the reference experiment, reference experiment samples, that is, only the support element (a Ni substrate having a diameter of 20 mm and a thickness of 0.1 mm), were prepared and used. The reference experiment was performed twice by changing the reference experiment samples.

Figure 44:
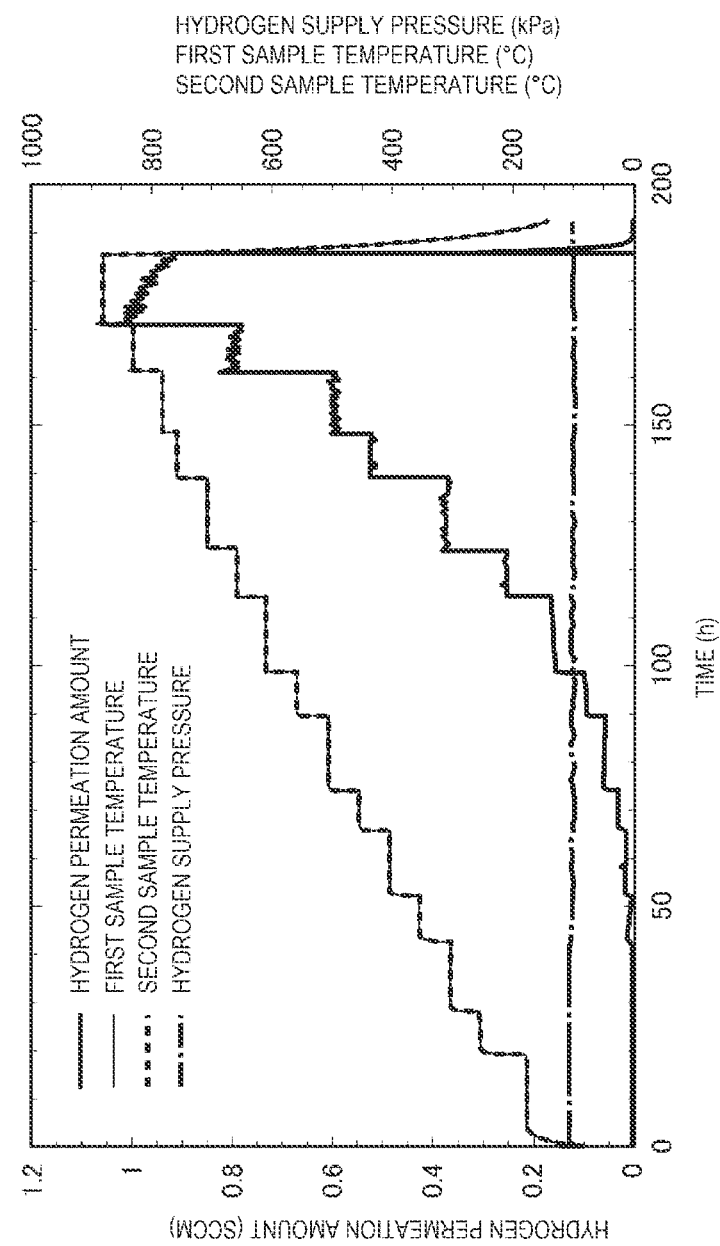
FIG. 44 is a graph showing a relationship among a hydrogen permeation amount, a hydrogen supply pressure, and a sample temperature in a reference experiment.

FIG. 44 is a graph showing a relationship among a hydrogen permeation amount, a hydrogen supply pressure, and a sample temperature in the reference experiment. In FIG. 44, a horizontal axis indicates time (h), a first vertical axis at a left side indicates a hydrogen permeation amount (SCCM), a second vertical axis at a right side indicates a hydrogen supply pressure (kPa), a first sample temperature (° C.), and a second sample temperature (° C.). The hydrogen permeation amount was calculated from a value of the vacuum gauge whose flow rate was calibrated. The first sample temperature is a temperature detected by the first thermocouple and the second sample temperature is a temperature detected by the second thermocouple. From FIG. 44, it was confirmed that the first sample temperature and the second sample temperature substantially coincided with each other, and temperatures of the reference experiment samples were accurately measured. It was also confirmed that the hydrogen permeation amount increased corresponding to temperature rises of the reference experiment examples. FIG. 44 shows results of the reference experiment for the first time. Since results of the reference experiment for the second time is substantially the same as the results of the reference experiment for the first time, description of the results of the reference experiment for the second time will be omitted.

Figure 45:
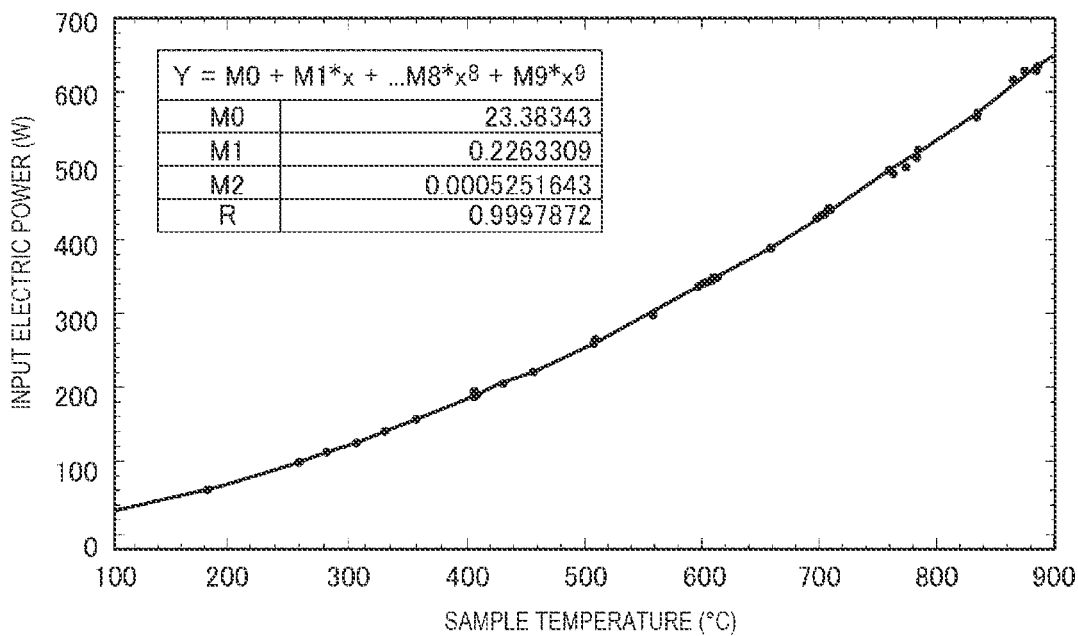
FIG. 45 is a graph showing a relationship between a sample temperature and input electric power in the reference experiment.

FIG. 45 is a graph showing the relationship between a sample temperature and input electric power in the reference experiment. In FIG. 45, a horizontal axis indicates a sample temperature (° C.), and a vertical axis indicates input electric power (W). The input electric power is the input electric power to the electric furnace. Since measurement values of the power meter greatly fluctuated due to ON/OFF control of the alternating current power supply, the measurement values were added at each set temperature, and the input electric power was calculated based on a slope of the addition. The input electric power was calculated for regions in which measurement values of the power meter were stable after a sufficient period of time after the set temperature was changed. An average value of temperatures detected by the first thermocouple and an average value of temperatures detected by the second thermocouple were calculated for each of the regions described above, the two average values were averaged, and the obtained value was used as the sample temperature. FIG. 45 is a graph obtained by plotting results of the reference experiment performed twice and is a calibration curve created using a least squares method. In FIG. 45, Y represents a function representing a calibration curve, M0 represents a constant term, M1 represents a first-order coefficient, M2 represents a second-order coefficient, and R represents a correlation coefficient. Excess heat evaluation for Experimental Example 26 and Experimental Example 27 was performed based on the results of the reference experiment.

Figure 46:
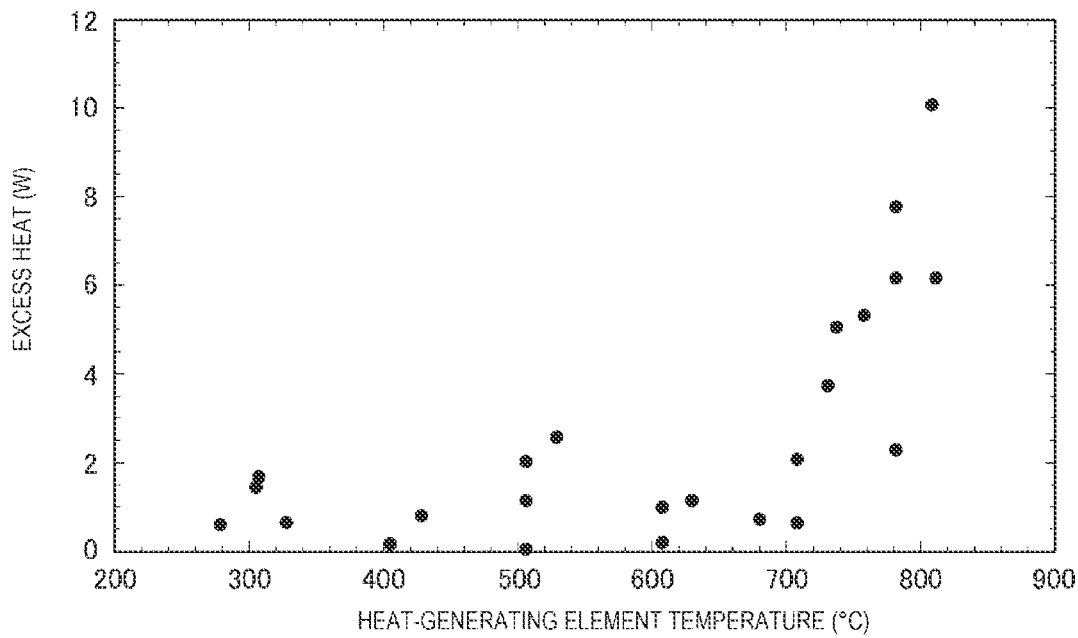
FIG. 46 is a graph showing a relationship between a heat-generating element temperature and excess heat according to Experimental Example 26.

FIG. 46 is a graph showing a relationship between a heat-generating element temperature and excess heat in Experimental Example 26. In FIG. 46, a horizontal axis indicates a heat-generating element temperature (° C.), and a vertical axis indicates excess heat (W). An average value of temperatures detected by the first thermocouple and an average value of temperatures detected by the second thermocouple were calculated, the two average values were averaged, and the obtained value was used as the heat-generating element temperature by using the same method as the method for calculating the sample temperature in the reference experiment. A method for calculating the excess heat will be described. First, the heat-generating element temperature at specific input electric power is measured (referred to as a measured temperature). Next, input electric power (referred to as converted electric power) in the reference experiment corresponding to the measured temperature is calculated by using the calibration curve shown in FIG. 45. Then, a difference between the converted electric power and the specific input electric power was calculated, and the difference was used as electric power of the excess heat. A method for calculating the specific input electric power is the same as the method for calculating the input electric power in the reference experiment. In FIG. 46, the electric power of the excess heat is expressed as "excess heat (W)". From FIG. 46, it was confirmed that excess heat was generated in a range in which the heat-generating element temperature is 300° C. to 900° C. It was confirmed that a maximum value of the excess heat was about 2 W at 600° C. or lower, and the excess heat increased at 700° C. or higher and was about 10 W at about 800° C.

Figure 47:
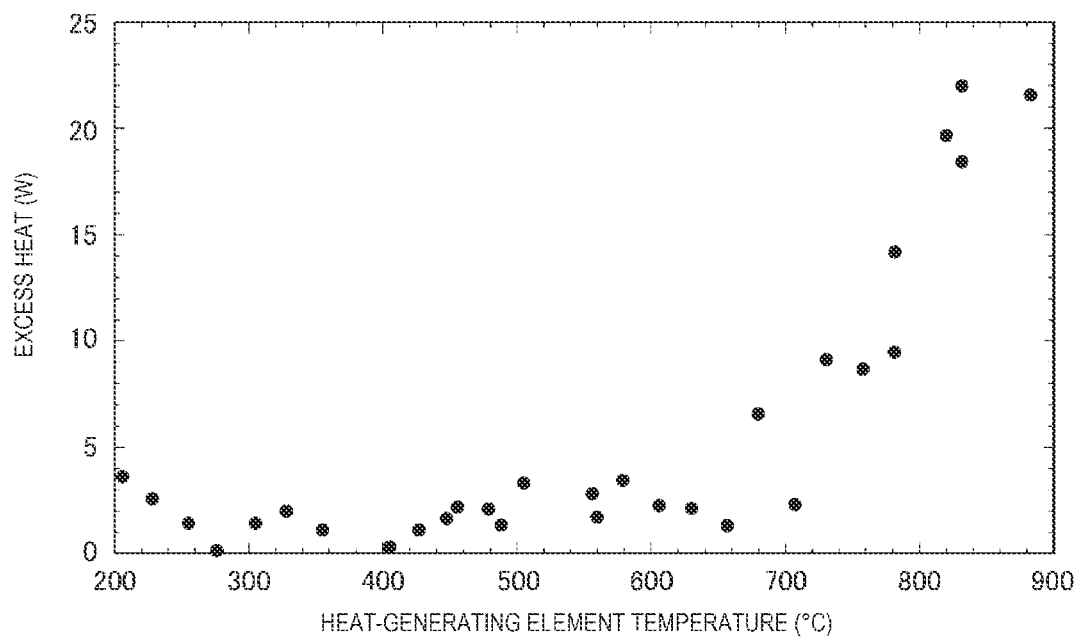
FIG. 47 is a graph showing a relationship between a heat-generating element temperature and excess heat according to Experimental Example 27.

FIG. 47 is a graph showing a relationship between a heat-generating element temperature and excess heat in Experimental Example 27. In FIG. 47, a horizontal axis indicates a heat-generating element temperature (° C.), and a vertical axis indicates excess heat (W). From FIG. 47, it was confirmed that excess heat was generated in a range in which the heat-generating element temperature is 200° C. to 900° C. It was confirmed that a maximum value of the excess heat was about 4 W in a range of 200° C. to 600° C., and the excess heat increased at 700° C. or higher and was larger than 20 W at about 800° C.

When Experimental Example 26 and Experimental Example 27 are compared, it is found that a generation amount of excess heat at 600° C. or lower tends to be larger in Experimental Example 27. It is found that the excess heat at 700° C. or higher tends to increase in both Experimental Example 26 and Experimental Example 27. It is found that at 700° C. or higher, the excess heat in Experimental Example 27 increases by about twice the excess heat in Experimental Example 26.

When excess heat per unit area at about 800° C. was calculated in Experimental Example 11 (see FIG. 9), Experimental Example 26 (see FIG. 46), and Experimental Example 27 (see FIG. 47), the excess heat per unit area in Experimental Example 11 was about 0.5 W/cm$^2$, the excess heat per unit area in Experimental Example 26 was about 5 W/cm$^2$, and the excess heat per unit area in Experimental Example 27 was about 10 W/cm$^2$. Based on the results, it was found that the excess heat generated in Experimental Example 26 was about 10 times that in Experimental Example 11, and the excess heat generated in Experimental Example 27 was about 20 times that in Experimental Example 11.

Second Embodiment

In the second embodiment, a partial pressure of hydrogen in a gas introduced into a first chamber is different from a partial pressure of hydrogen in a gas introduced into a second chamber, and hydrogen permeates through a heat-generating element by using a hydrogen partial pressure difference between the first chamber and the second chamber. In the second embodiment, a "hydrogen pressure" is referred to as a "hydrogen partial pressure".

Figure 48:
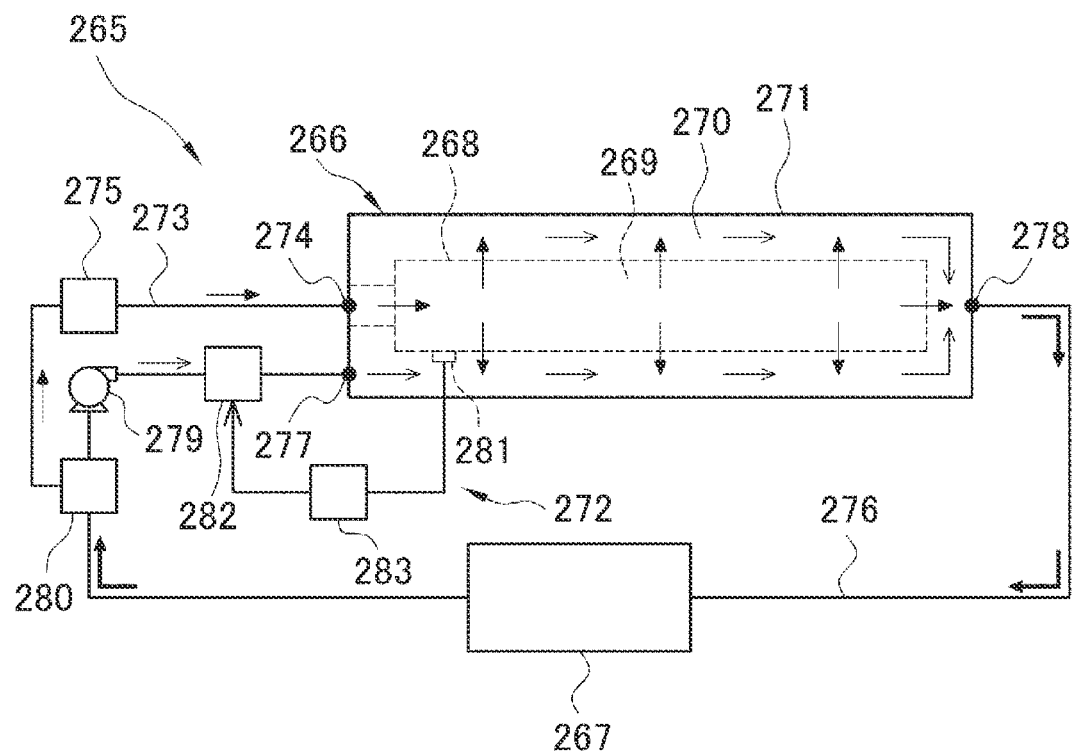
FIG. 48 is a schematic diagram showing a heat utilization system according to a second embodiment.

As shown in FIG. 48, a heat utilization system 265 includes a heat generating device 266 and a heat utilization device 267.

The heat generating device 266 includes a heat-generating element 268 that generates heat by occluding and discharging hydrogen, a sealed container 271 that has a first chamber 269 and a second chamber 270 partitioned by the heat-generating element 268, and a temperature adjustment unit 272 that adjusts a temperature of the heat-generating element 268. A structure that partitions the first chamber 269 and the second chamber 270 is not limited to a structure formed of the heat-generating element 268 only, and may be a structure in which a part of the structure is the heat-generating element 268 and the other part of the structure is a hydrogen shield wall such as a metal or an oxide.

The heat-generating element 268 has a bottomed cylindrical shape. The heat-generating element 268 may have the same configuration as, for example, the heat-generating element 90 (see FIG. 11). That is, the heat-generating element 268 is provided with a multilayer film on an outer surface of a support element having a bottomed cylindrical shape. The multilayer film may be provided on an inner surface of the support element. Alternatively, the multilayer film may be provided on both the inner surface and the outer surface of the support element. A shape of the support element is not limited to a bottomed cylindrical shape, and may be a bottomed polygonal cylindrical shape, a flat plate, or the like. The support element is preferably made of a material that allows permeation of hydrogen and has heat resistance and pressure resistance, and may be made of the same material as, for example, the support element 61. The multilayer film may have the same configuration as, for example, the multilayer film 62. The number of the heat-generating elements 268 is one in this example. Alternatively, the number of the heat-generating elements 268 may be two or more.

An example of a method for manufacturing the heat-generating element 268 will be described. A plate-shaped support element that can be bent is prepared. The multilayer film is formed on one surface of the support element using a sputtering method. Then, the support element is bent to form a cylindrical shape. When the support element is bent so that the one surface (the surface on which the multilayer film is formed) is an inner surface, the other surface (that is, an outer surface) of the support element is preferably provided with fins. The fins are provided, for example, in a spiral manner. When the fins are provided, a contact area between the heat-generating element 268 and a heat medium can be increased, and heat exchange efficiency between the heat-generating element 268 and the heat medium can be improved. A method for forming the multilayer film is not limited to the sputtering method, and may be an evaporation method, a wet method, a thermal spraying method, an electroplating method, and the like. The multilayer film may be formed on the outer surface only or may be formed on both surfaces of the support element.

The sealed container 271 is a hollow container and accommodates the heat-generating element 268 therein. The sealed container 271 is preferably made of a material having heat resistance and pressure resistance. Examples of the material of the sealed container 271 include a metal and ceramics. Examples of the metal include Ni, Cu, Ti, carbon steel, austenitic stainless steel, heat-resistant nonferrous alloy steel, and ceramics. Examples of the ceramics include $Al_2O_3$, $SiO_2$, SiC, and $ZnO_2$. It is desirable to cover an outer periphery of the sealed container 271 with a heat insulation member. The number of the sealed container 271 accommodating the heat-generating element 268 is one in this example. Alternatively, the number of the sealed container 271 may be two or more.

The first chamber 269 is formed by an inner surface of the heat-generating element 268. The first chamber 269 has an introduction port 274 connected with a hydrogen introduction line 273. The hydrogen introduction line 273 is provided with a hydrogen tank 275 that stores a hydrogen-based gas. The hydrogen-based gas circulating through the hydrogen introduction line 273 is introduced into the first chamber 269 via the introduction port 274.

The second chamber 270 is formed by an outer surface of the heat-generating element 268 and an inner surface of the sealed container 271. The second chamber 270 has an inlet port 277 and an outlet port 278 that are connected with a heat medium circulation line 276. The heat medium circulation line 276 circulates a heat medium between an inside and an outside of the second chamber 270 (the sealed container 271) by a circulation blower 279. In the second embodiment, the heat medium is preferably a rare gas among those described above. In FIG. 48, the inlet port 277 is provided at a left side on the paper, and the outlet port 278 is provided at a right side on the paper. Alternatively, positions of the inlet port 277 and outlet port 278 may be changed as appropriate.

A hydrogen partial pressure of a hydrogen-based gas introduced into the first chamber 269 and a hydrogen partial pressure of a heat medium introduced into the second chamber 270 are measured by a hydrogen sensor (not shown). The hydrogen partial pressure in the first chamber 269 is preferably, for example, 10 to 10,000 times the hydrogen partial pressure in the second chamber 270. For example, the hydrogen partial pressure in the first chamber 269 is 10 kPa to 1 MPa, and the hydrogen partial pressure in the second chamber 270 is 1 Pa to 10 kPa. Accordingly, hydrogen in the first chamber 269 permeates through the heat-generating element 268 and moves to the second chamber 270. The heat-generating element 268 generates excess heat by permeation of hydrogen. The heat medium circulates through the second chamber 270, so that excess heat of the heat-generating element 268 can be transferred to the heat medium, and the hydrogen partial pressure in the second chamber 270 can be made lower than the hydrogen partial pressure in the first chamber 269.

The heat medium circulation line 276 is connected with the heat utilization device 267. The heat medium heated by the excess heat of the heat-generating element 268 can be effectively utilized in the heat utilization device 267. The heat utilization device 267 is, for example, a heat exchanger, a power unit, or a thermoelectric element. Examples of the heat exchanger include a device that performs heat exchange between a heat medium and a gas, a device that performs heat exchange between a heat medium and a liquid, and a device that performs heat exchange between a heat medium and a solid. The device that performs heat exchange between a heat medium and a gas is used to pre-heat air and generate hot air for drying or heating, such as an air conditioner, a boiler, and a combustion furnace. The device that performs heat exchange between a heat medium and a liquid is used for a heat source of a boiler, oil heating, a chemical reaction tank, and the like. The device that performs heat exchange between a heat medium and a solid is used in a double pipe rotary heating machine and used to heat a particulate substance in a double pipe. Examples of the power unit include a Stirling engine, an organic Rankine cycle system (ORCS), and a thermoelectric element.

The heat medium circulation line 276 is provided with a hydrogen removal unit 280 that removes hydrogen from the heat medium. The hydrogen removal unit 280 prevents an increase in a concentration of hydrogen in the heat medium. The hydrogen removal unit 280 may be a pipe or a hydrogen permeable film made of a hydrogen storage metal, a hydrogen storage alloy, a hydrogen permeable material, or the like. Examples of the hydrogen permeable material include rubber, plastic, Ti, and Ni. It is preferable to guide the hydrogen removed from the heat medium by the hydrogen removal unit 280 to the hydrogen tank 275 as shown in FIG. 48. The hydrogen removal unit 280 can be operated continuously or intermittently. The hydrogen removal unit 280 may not be provided in the heat medium circulation line 276, and may remove hydrogen from the heat medium extracted from the heat medium circulation line 276.

The temperature adjustment unit 272 includes a temperature sensor 281 that detects the temperature of the heat-generating element 268, a heater 282 that heats the heat-generating element 268, and an output control unit 283 that controls an output of the heater 282 based on the temperature detected by the temperature sensor 281. Although the temperature sensor 281 is provided on an outer surface of the heat-generating element 268 in FIG. 48, the temperature sensor 281 may detect a temperature of a portion of the heat-generating element 268 where a temperature of the heat-generating element 268 can be estimated. The heater 282 is operated when an operation of the heat generating device 266 is started or when the temperature of the heat-generating element 268 is reduced. The heater 282 is provided in the heat medium circulation line 276 in FIG. 48. Alternatively, the heater 282 may be provided on, for example, a pipe (not shown) that is separately provided to supply the heat medium to the heat medium circulation line 276. When the heat medium circulating through the pipe is heated by the heater 282, the heated heat medium is guided to the second chamber 270 via the heat medium circulation line 276, and heats the heat-generating element 268.

The heat generating device 266 includes a control unit (not shown), and controls, by the control unit, the hydrogen partial pressure in the first chamber 269 and the hydrogen partial pressure in the second chamber 270. For example, when a hydrogen partial pressure in the first chamber 269 is increased and a hydrogen partial pressure difference between the first chamber 269 and the second chamber 270 is increased, the hydrogen permeation amount can be increased and generation of excess heat of the heat-generating element 268 can be promoted. Alternatively, when a hydrogen partial pressure in the first chamber 269 is reduced and a hydrogen partial pressure difference between the first chamber 269 and the second chamber 270 is reduced, the hydrogen permeation amount can be reduced and generation of excess heat of the heat-generating element 268 can be prevented. Instead of changing the hydrogen partial pressure in the first chamber 269, the generation of excess heat of the heat-generating element 268 can be promoted or prevented by reducing or increasing the hydrogen partial pressure in the second chamber 270. Both the hydrogen partial pressure in the first chamber 269 and the hydrogen partial pressure in the second chamber 270 may be changed. Alternatively, the generation of excess heat of the heat-generating element 268 can be adjusted by changing a flow rate or a temperature of the heat medium in the inlet port 277.

As described above, the heat generating device 266 is configured such that hydrogen permeates through the heat-generating element 268 due to the hydrogen partial pressure difference between the first chamber 269 and the second chamber 270. Therefore, in the heat generating device 266, it is not necessary to generate an apparent pressure difference acquired by a pressure sensor between the first chamber 269 and the second chamber 270 by, for example, bringing the second chamber 270 into a vacuum state. Therefore, a risk of deforming or breaking the heat generating device 266 is reduced.

Since the heat utilization system 265 and the heat generating device 266 utilize the heat-generating element 268 as a heat energy source, inexpensive, clean, and safe energy can be supplied.

[Modification 1]

Figure 49:
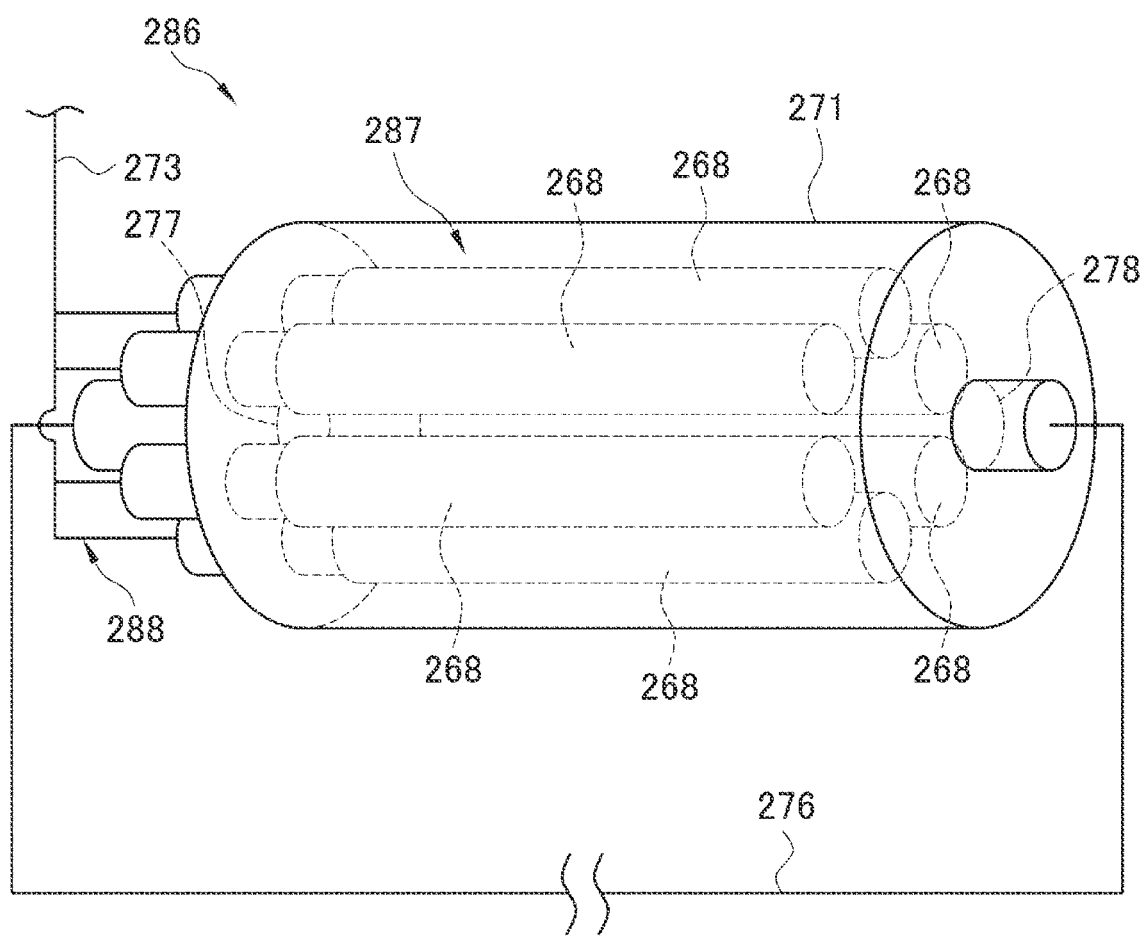
FIG. 49 is a schematic diagram showing a heat generating device according to Modification 1 of the second embodiment.

As shown in FIG. 49, the heat generating device 286 includes a heat-generating element unit 287 formed of a plurality of heat-generating elements 268 inside the sealed container 271. Although the heat-generating element unit 287 is formed of six heat-generating elements 268 in FIG. 49, the number of the heat-generating element units 287 is not particularly limited. Although the plurality of heat-generating elements 268 are connected with the hydrogen introduction line 273 via a header unit 288 in FIG. 49, a plurality of hydrogen introduction lines 273 may be prepared, and the plurality of heat-generating elements 268 may be respectively connected with the plurality of hydrogen introduction lines 273. The heat generating device 286 may have the same configuration as the heat generating device 266 except that the heat-generating element unit 287 is formed of the plurality of heat-generating elements 268 and the plurality of heat-generating elements 268 are connected via the header unit 288. In this manner, since the heat generating device 286 includes the heat-generating element unit 287 formed of the plurality of heat-generating elements 268, a high output of excess heat can be achieved.

The heat generating device 286 preferably includes fins on each of the plurality of heat-generating elements 268. When the fins are provided on each of the plurality of heat-generating elements 268, heat exchange efficiency between the plurality of heat-generating elements 268 and a heat medium can be improved.

Although the heat generating device 286 is configured such that the heat medium circulates along a longitudinal direction of the heat-generating element 268 in FIG. 49, the inlet port 277 and the outlet port 278 may be changed and the heat medium may circulate in a direction orthogonal to the longitudinal direction of the heat-generating element 268.

A plurality of heat generating modules each including the sealed container 271 and the heat-generating element unit 287 may be prepared, and the plurality of heat generating modules may be connected in series or in parallel. The number of the heat generating modules is not particularly limited, and can be appropriately changed according to a desired output.

[Modification 2]

Figure 50:
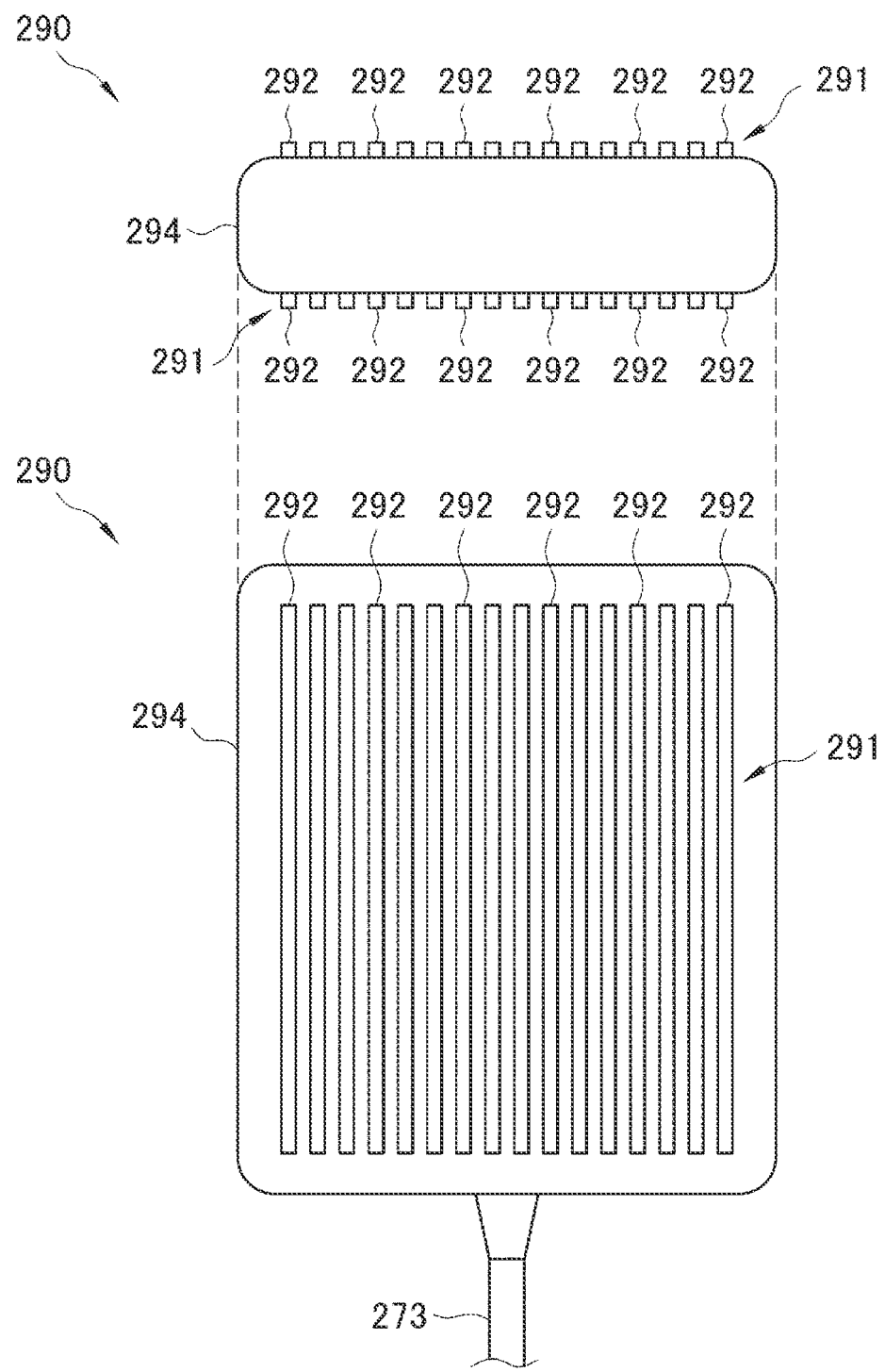
FIG. 50 shows a front view and a plan view of a heat-generating element unit according to Modification 2 of the second embodiment.

As shown in FIG. 50, a heat-generating element unit 290 has a flat plate shape having a space therein. The heat-generating element unit 290 has, for example, a vertical length of 800 mm, a horizontal length of 600 mm, and a thickness of 15 mm. In FIG. 50, an upper side on the paper shows a front view of the heat-generating element unit 290, and a lower side on the paper shows a plan view of the heat-generating element unit 290. The heat-generating element unit 290 is connected with the hydrogen introduction line 273. Although an outer shape of the heat-generating element unit 290 in a plan view is quadrangular in this modification, the outer shape of the heat-generating element unit 290 is not limited thereto, and may be appropriately changed to a polygonal shape, a round shape, or the like.

The heat-generating element unit 290 includes fins 291. The fins 291 are provided on an outer surface of the heat-generating element unit 290. In FIG. 50, the fins 291 are provided on two mutually facing surfaces (a flat surface and a bottom surface) among the outer surface of the heat-generating element unit 290. The fins 291 each include a plurality of ribs 292. The plurality of ribs 292 protrude from the outer surface of the heat-generating element unit 290. A material of the fins 291 is, for example, a metal having a melting point or a Curie temperature of 800° C. or higher. Examples of the material of the fins 291 include Ni, Cu, and W.

Figure 51:
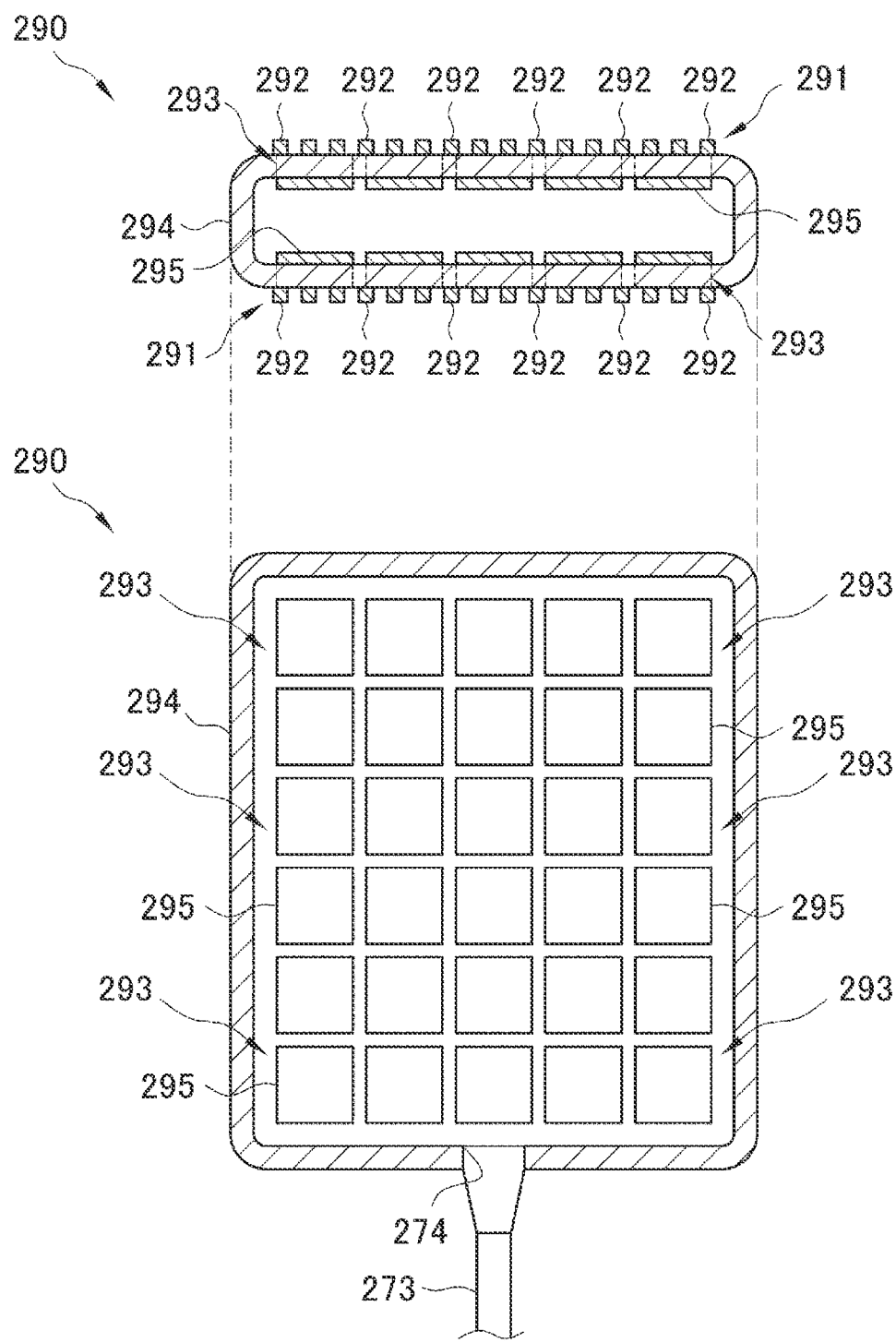
FIG. 51 is a cross-sectional view showing the heat-generating element unit according to Modification 2 of the second embodiment.

As shown in FIG. 51, the heat-generating element unit 290 includes a plurality of heat-generating elements 293. FIG. 51 is a cross-sectional view showing the heat-generating element unit 290 and showing an internal structure of the heat-generating element unit 290. The heat-generating elements 293 include a support element 294 having a box shape and a plurality of multilayer films 295 provided on an inner surface of the support element 294. The heat-generating element 293 includes the multilayer films 295 and a part of the support element 294 corresponding to the multilayer films 295. The support element 294 is made of the same material as, for example, the support element 61. The multilayer film 295 may have the same configuration as, for example, the multilayer film 62. The support element 294 is provided with an introduction port 274 connected with the hydrogen introduction line 273.

An example of a method for manufacturing the heat-generating element unit 290 will be described. Two plate members are prepared, and an edge portion of each of the plate members is bent. In the bending process, the edge portion of each of the plate members is bent at a substantially right angle with respect to a planar direction of each of the plate members. The multilayer film 295 is formed on a surface of each of the plate members facing the edge portion by a sputtering method or the like. Then, edge portions of the plate members are joined together by welding or the like. Two plate members are joined to form the support element 294. The multilayer films 295 and a part of the support element 294 corresponding to the multilayer films 295 form the heat-generating element 293. Then, the heat-generating element unit 290 is formed by providing the fins 291 on the outer surface of the support element 294. The edge portion of the plate member is not limited to being formed by being bent as described above, or may be formed by using another plate-shaped member. The multilayer film 295 is not limited to being directly formed on the plate member by a sputtering method or the like as described above, or may be separately prepared and bonded to the plate member.

The heat-generating element unit 290 can be manufactured easily and thus manufacturing costs can be reduced. Since the heat-generating element unit 290 includes the fins 291, heat exchange efficiency between the heat-generating element 293 and the heat medium can be improved, and thermal deformation is prevented.

A plurality of heat-generating elements in which a multilayer film is provided on at least one of a front surface and a back surface of a support element as the heat-generating element 14 (see FIG. 4) or the heat-generating element 74 (see FIG. 5) are prepared, and the plurality of heat-generating elements are bonded to a container having a box shape, so as to form a heat-generating element unit. In this case, the container is preferably made of the same material as the support element 294.

[Modification 3]

Figure 52:
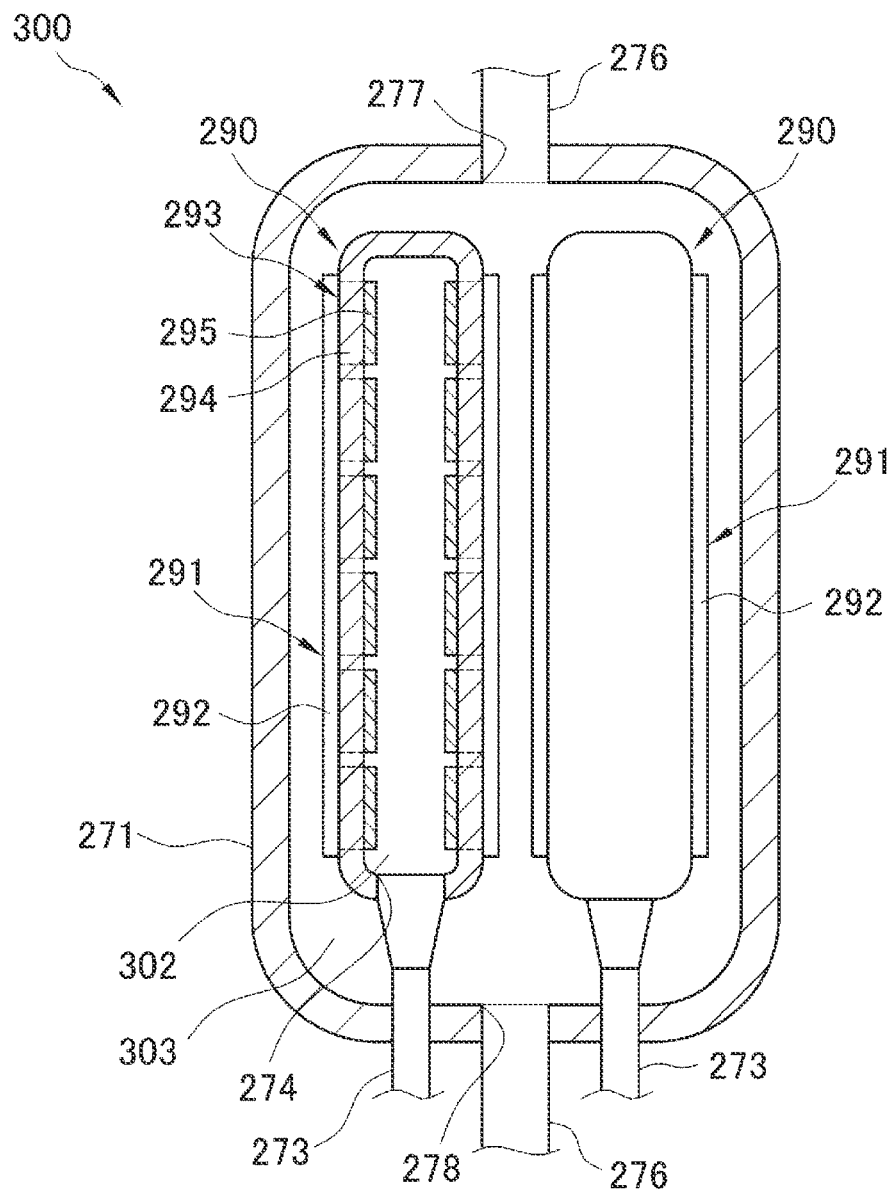
FIG. 52 is a schematic diagram showing a heat generating device according to Modification 3 of the second embodiment.

As shown in FIG. 52, a heat generating device 300 is provided with a plurality of heat-generating element units 290 inside the sealed container 271. Although the number of the heat-generating element units 290 is two in FIG. 52, the number of the heat-generating element units 290 can be changed as appropriate. FIG. 52 is a cross-sectional view showing the heat-generating element unit 290 at a left side on the paper. An internal space of each of the heat-generating element units 290 is a first chamber 302. The first chamber 302 has the introduction port 274 connected with the hydrogen introduction line 273. A space between the sealed container 271 and the heat-generating element unit 290 is a second chamber 303. The second chamber 303 has an inlet port 277 and an outlet port 278 that are connected with the heat medium circulation line 276. A hydrogen partial pressure difference is generated between the first chamber 302 and the second chamber 303 by introducing the hydrogen-based gas into the first chamber 302 and introducing a heat medium into the second chamber 303, and hydrogen in the first chamber 302 permeates through the heat-generating element 293 and moves to the second chamber 303. The heat-generating element 293 generates excess heat by permeation of hydrogen. Since the heat generating device 300 includes the plurality of heat-generating element units 290, a high output of excess heat can be achieved.

[Other Modifications]

The heat utilization device 12 may only include the accommodation container 41 and the heat medium circulation unit 42. The heat medium flowing through the heat medium circulation unit 42 is used for various purposes such as household heating, a household water heater, an automobile heater, an agricultural heating machine, a road heater, a seawater desalination heat source, and a geothermal power generation auxiliary heat source.

The gas turbine 43 may be used as a motor without being connected to the power generator 48. The steam turbine 45 may be used as a motor without being connected to the power generator 49. The Stirling engine 46 may be used as a motor without being connected to the power generator 50.

The heat-generating element is not limited to having a plate shape and a cylindrical shape. For example, the heat-generating element may be made by accommodating a powder made of a hydrogen storage metal or a hydrogen storage alloy in a container made of a hydrogen permeable material (for example, a porous body, a hydrogen permeable film, and a proton conductor).

The heat utilization system is not limited to those described in the above-described embodiments and the above-described modifications, and may be implemented by appropriately combining the heat generating devices and the heat utilization devices according to the above-described embodiments and the above-described modifications.

REFERENCE SIGN LIST 10, 95, 100, 105, 110, 115, 120, 130, 135, 140, 145, 155, 165, 170, 190, 200, 205, 215, 220, 260, 265 heat utilization system
11, 96, 101, 106, 111, 116, 121, 131, 136, 141, 146, 156, 166, 171, 191, 201, 206, 216, 221, 236, 241, 251, 256, 266, 286, 300 heat generating device
12, 122, 147, 192, 261, 267 heat utilization device
14, 74, 75, 80, 90, 98, 160, 268, 293 heat-generating element
15, 123, 173, 193, 202, 207, 225, 271 sealed container
16, 272 temperature adjustment unit
21, 126, 184, 194, 209, 231, 269 first chamber
22, 127, 185, 195, 210, 232, 270 second chamber
61, 91, 99, 161, 294 support element
62, 92, 162, 295 multilayer film
71 first layer
72 second layer
77 third layer
82 fourth layer
222 heat generating cell

The invention claimed is:

1. A heat utilization system comprising:
a heat-generating element configured to generate heat by occluding and discharging hydrogen;
a sealed container having a first chamber and a second chamber partitioned by the heat-generating element;
a temperature adjustment unit configured to adjust a temperature of the heat-generating element; and
a heat utilization device configured to utilize, as a heat source, a heat medium heated by a heat of the heat-generating element, wherein
the first chamber and the second chamber have different hydrogen pressures,
the heat-generating element includes a support element made of at least one of a porous body, a hydrogen permeable film, and a proton conductor, and a multilayer film supported by the support element, and
the multilayer film has a first layer made of a hydrogen storage metal or a hydrogen storage alloy and having a thickness of less than 1000 nm and a second layer made of a hydrogen storage metal different from that of the first layer, a hydrogen storage alloy different from that of the first layer, or ceramics and having a thickness of less than 1000 nm.

2. The heat utilization system according to claim 1, further comprising:
a hydrogen circulation line provided outside the sealed container, configured to connect the first chamber and the second chamber, and configured to circulate a hydrogen-based gas containing the hydrogen between an inside and an outside of the sealed container, wherein
the first chamber has an introduction port connected with the hydrogen circulation line and configured to introduce the hydrogen-based gas,
the second chamber has a recovery port connected with the hydrogen circulation line and configured to recover the hydrogen-based gas, and
a hydrogen pressure in the first chamber is higher than a hydrogen pressure in the second chamber.

3. The heat utilization system according to claim 2, wherein
the hydrogen circulation line includes a filter configured to remove an impurity contained in the hydrogen-based gas.

4. The heat utilization system according to claim 2, wherein
the hydrogen circulation line includes
a buffer tank configured to store the hydrogen-based gas,
an introduction line connecting the buffer tank and the introduction port, and configured to introduce the hydrogen-based gas stored in the buffer tank into the first chamber, and
a recovery line connecting the recovery port and the buffer tank, configured to recover the hydrogen-based gas that has permeated through the heat-generating element from the first chamber to the second chamber, and configured to return the hydrogen-based gas to the buffer tank.

5. The heat utilization system according to claim 4, wherein
the temperature adjustment unit includes
a temperature sensor configured to detect the temperature of the heat-generating element,
a heater configured to heat the heat-generating element, and
an output control unit configured to control an output of the heater based on the temperature detected by the temperature sensor.

6. The heat utilization system according to claim 5, wherein
the heat utilization device includes a heat medium circulation line along which the heat medium circulates.

7. The heat utilization system according to claim 6, wherein
the heat medium circulation line includes a heat medium flow rate control unit configured to control a flow rate of the heat medium based on the temperature detected by the temperature sensor.

8. The heat utilization system according to claim 6, wherein the heat utilization device includes an accommodation container accommodating the sealed container, connected with the heat medium circulation line, and configured to circulate the heat medium through a gap between the accommodation container and the sealed container, wherein
the heat medium heated by the heat of the heat-generating element by being circulated through the gap is discharged into the heat medium circulation line, and the heat medium cooled by being circulated through the heat medium circulation line is introduced into the accommodation container.

9. The heat utilization system according to claim 8, wherein
the recovery line passes through the gap, and configured to return the hydrogen-based gas, whose heat is taken by the heat medium circulating through the gap, to the buffer tank.

10. The heat utilization system according to claim 8, wherein
the introduction line passes through the gap, and configured to introduce the hydrogen-based gas that is preheated by the heat medium circulating through the gap.

11. The heat utilization system according to claim 6, wherein the heat medium circulation line includes a heat transfer pipe provided along an outer periphery of the sealed container, wherein the heat medium circulating through the heat transfer pipe is heated by exchanging heat with the heat-generating element.

12. The heat utilization system according to claim 5, wherein
the heater is provided on the introduction line, and is configured to heat the heat-generating element by heating the hydrogen-based gas circulating through the introduction line.

13. The heat utilization system according to claim 5, wherein
the heat utilization device includes a first heat exchanger provided on the recovery line and configured to exchange heat with the hydrogen-based gas heated by the heat of the heat-generating element and circulating through the recovery line.

14. The heat utilization system according to claim 5, wherein
the heat utilization device includes
a non-permeated gas recovery line connecting the first chamber and the introduction line, configured to recover a non-permeated gas that has not permeated through the heat-generating element among the hydrogen-based gas introduced from the introduction line into the first chamber and return the non-permeated gas into the introduction line, and
a second heat exchanger provided on the non-permeated gas recovery line and configured to exchange heat with the non-permeated gas heated by the heat of the heat-generating element.

15. The heat utilization system according to claim 14, wherein
the non-permeated gas recovery line includes a non-permeated gas flow rate control unit configured to control a flow rate of the non-permeated gas based on the temperature detected by the temperature sensor.

16. The heat utilization system according to claim 14, further comprising:
a nozzle portion provided between the introduction port and the heat-generating element, connected with the introduction line, and configured to eject the hydrogen-based gas circulating through the introduction line onto the heat-generating element.

17. The heat utilization system according to claim 16, wherein
the heat-generating element has a bottomed cylindrical shape, and
the nozzle portion has a plurality of ejection ports arranged in an axial direction of the heat-generating element, and is configured to eject the hydrogen-based gas from the plurality of ejection ports onto an entire inner surface of the heat-generating element.

18. The heat utilization system according to claim 16, wherein
the heat-generating element has a plate shape, and
the nozzle portion is configured to eject the hydrogen-based gas onto an entire one surface of the heat-generating element.

19. The heat utilization system according to claim 16, wherein
the heat-generating element has a cylindrical shape having two open ends, one end of the heat-generating element is connected with the introduction line, and the other end of the heat-generating element is connected with the non-permeated gas recovery line.

20. The heat utilization system according to claim 1, further comprising:
a first hydrogen occluding and discharging unit provided in the first chamber, made of a hydrogen storage metal or a hydrogen storage alloy, and configured to occlude and discharge the hydrogen,
a second hydrogen occluding and discharging unit provided in the second chamber, made of a hydrogen storage metal or a hydrogen storage alloy, and configured to occlude and discharge the hydrogen, and
a hydrogen pressure control unit configured to control to switch between a first mode in which a hydrogen pressure in the first chamber is higher than a hydrogen pressure in the second chamber and a second mode in which a hydrogen pressure in the second chamber is higher than a hydrogen pressure in the first chamber.

21. The heat utilization system according to claim 20, wherein
the hydrogen pressure control unit
heats the first hydrogen occluding and discharging unit and cools the second hydrogen occluding and discharging unit in the first mode, and
heats the second hydrogen occluding and discharging unit and cools the first hydrogen occluding and discharging unit in the second mode.

22. The heat utilization system according to claim 1, wherein
the first layer is made of any one of Ni, Pd, Cu, Mn, Cr, Fe, Mg, Co, and an alloy thereof, and
the second layer is made of any one of Ni, Pd, Cu, Mn, Cr, Fe, Mg, Co, an alloy thereof, and SiC.

23. The heat utilization system according to claim 1, wherein
the multilayer film has a third layer made of a hydrogen storage metal, a hydrogen storage alloy, or ceramics different from those of the first layer and the second layer and having a thickness of less than 1000 nm, in addition to the first layer and the second layer.

24. The heat utilization system according to claim 23, wherein
the third layer is made of any one of CaO, $Y_2O_3$, TiC, $LaB_6$, SrO, and BaO.

25. The heat utilization system according to claim 23, wherein
the multilayer film has a fourth layer made of a hydrogen storage metal or a hydrogen storage alloy different from those of the first layer, the second layer, and the third layer and having a thickness of less than 1000 nm, in addition to the first layer, the second layer, and the third layer.

26. The heat utilization system according to claim 25, wherein
the fourth layer is made of any one of Ni, Cu, Cr, Fe, Mg, Co, an alloy thereof, SiC, CaO, $Y_2O_3$, TiC, $LaB_6$, SrO, and BaO.

27. The heat utilization system according to claim 5, further comprising:
a gas introduction branch pipe having one end connected with the introduction line and the other end branched, wherein
the sealed container accommodates a plurality of heat-generating elements including the heat-generating element and the other heat-generating element,
a plurality of first chambers including the first chamber and the other first chamber are provided inside the sealed container, and each of branched ends of the gas introduction branch pipe is respectively connected with the introduction port provided in each of the plurality of first chambers.

28. The heat utilization system according to claim 27, wherein
the plurality of heat-generating elements each has a plate shape, and are arranged with a gap between each other so as to face each other,
a plurality of second chambers including the second chamber and the other second chamber are provided inside the sealed container, and
the first chambers and the second chambers are alternately arranged in an arrangement direction of the plurality of heat-generating elements.

29. The heat utilization system according to claim 27, wherein
the plurality of heat-generating elements each has a bottomed cylindrical shape,
the first chamber is defined by an inner surface of each of the heat-generating elements, and
the second chamber is defined by an outer surface of each of the plurality of the heat-generating elements and an inner surface of the sealed container.

30. The heat utilization system according to claim 29, wherein
the heater is provided on each of the branched ends of the gas introduction branch pipe.

31. A heat utilization system comprising:
a heat-generating element configured to generate heat by occluding and discharging hydrogen;
a sealed container accommodating the heat-generating element;
a gas introduction unit configured to introduce a hydrogen-based gas into the sealed container;
a gas discharge unit configured to discharge the hydrogen-based gas inside the sealed container to an outside of the sealed container;
a temperature sensor configured to detect a temperature of the heat-generating element;
a heat generating cell provided in the gas introduction unit and including a heater configured to heat the heat-generating element by heating the hydrogen-based gas circulating through the gas introduction unit; and
a control unit configured to control a temperature of the heat-generating element by controlling the heater based on the temperature detected by the temperature sensor, wherein
the sealed container has a first chamber and a second chamber partitioned by the heat-generating element,
the first chamber and the second chamber have different hydrogen pressures,
the heat-generating element includes a support element made of at least one of a porous body, a hydrogen permeable film, and a proton conductor, and a multilayer film supported by the support element, and
the multilayer film has a first layer made of a hydrogen storage metal or a hydrogen storage alloy and having a thickness of less than 1000 nm and a second layer made of a hydrogen storage metal different from that of the first layer, a hydrogen storage alloy different from that of the first layer, or ceramics and having a thickness of less than 1000 nm.

32. A heat generating device comprising:
a heat-generating element configured to generate heat by occluding and discharging hydrogen;
a sealed container having a first chamber and a second chamber partitioned by the heat-generating element; and
a temperature adjustment unit configured to adjust a temperature of the heat-generating element, wherein
the first chamber and the second chamber have different hydrogen pressures,
the heat-generating element includes a support element made of at least one of a porous body, a hydrogen permeable film, and a proton conductor, and a multilayer film supported by the support element, and
the multilayer film has a first layer made of a hydrogen storage metal or a hydrogen storage alloy and having a thickness of less than 1000 nm and a second layer made of a hydrogen storage metal different from that of the first layer, a hydrogen storage alloy different from that of the first layer, or ceramics and having a thickness of less than 1000 nm.

33. The heat generating device according to claim 32, wherein
the hydrogen pressure is a hydrogen partial pressure, wherein
the hydrogen permeates through the heat-generating element due to a hydrogen partial pressure difference between the first chamber and the second chamber.

\* \* \* \* \*